US009703890B2

(12) United States Patent
Kakaraddi et al.

(10) Patent No.: US 9,703,890 B2
(45) Date of Patent: Jul. 11, 2017

(54) METHOD AND SYSTEM THAT DETERMINE WHETHER OR NOT TWO GRAPH-LIKE REPRESENTATIONS OF TWO SYSTEMS DESCRIBE EQUIVALENT SYSTEMS

(71) Applicant: VMware, Inc., Palo Alto, CA (US)

(72) Inventors: Shishir Mahesh Kakaraddi, Mountain View, CA (US); Ravi Soundararajan, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 337 days.

(21) Appl. No.: 14/517,710

(22) Filed: Oct. 17, 2014

(65) Prior Publication Data

US 2016/0110434 A1    Apr. 21, 2016

(51) Int. Cl.
*G06F 17/30* (2006.01)
*G06F 11/36* (2006.01)

(52) U.S. Cl.
CPC .... *G06F 17/30958* (2013.01); *G06F 11/3604* (2013.01)

(58) Field of Classification Search
None
See application file for complete search history.

(56) References Cited

U.S. PATENT DOCUMENTS 8,296,175 B2 * 10/2012  Dey .................... G06Q 30/02
                                                            705/7.29
8,694,712 B2 *  4/2014  Sheu .................. G06F 12/1036
                                                            711/207
8,799,438 B2 *  8/2014  Chen ..................... H04L 41/12
                                                            707/758
9,319,282 B2 *  4/2016  Keane ................. H04L 67/1002
2007/0239694 A1 * 10/2007  Singh ............... G06F 17/30958
2010/0306364 A1 * 12/2010  Terry ..................... H04L 12/66
                                                            709/224
2011/0173189 A1 *  7/2011  Singh ............... G06F 17/30958
                                                            707/722
2012/0124194 A1 *  5/2012  Shouraboura ......... G06F 9/5066
                                                            709/224
2012/0151026 A1 *  6/2012  Chen ..................... H04L 41/12
                                                            709/223
2014/0059083 A1 *  2/2014  Adams ............. G06F 17/30587
                                                            707/798

(Continued)

OTHER PUBLICATIONS

VMware Academic Program (VMAP), 2012 RFP.

*Primary Examiner* — Debbie Le

(57) ABSTRACT

The current document is directed to methods and systems that determine whether or not two graph-like representations of two physically or temporally distinct computer systems or computer-system configurations are equivalent. The currently described methods and systems extract a first and second ordered set of subgraphs from each of a first and second graph-like representation of a first and a second computer system. The ordered sets of subgraphs are logically aligned, forming a set of subgraph pairs. The currently described methods and systems transform the first and second subgraph of each subgraph pair into a corresponding first and second set of trees, label the trees, and then compare labels at each level of the trees to determine whether or not an isomorphic tree can be found in the second set of trees for each tree in the first set of trees.

24 Claims, 56 Drawing Sheets

(56) References Cited

U.S. PATENT DOCUMENTS

2014/0344438 A1* 11/2014 Chen ................... H04L 12/6418
                                                  709/223
2015/0074044 A1*  3/2015 Metreveli ......... G06F 17/30958
                                                  707/609
2016/0110476 A1*  4/2016 Shinkuma ......... G06F 17/30587
                                                  707/741

* cited by examiner select nodes *a* of type "VM"
where
    *a* is 2 edges from node "datastore 1.2" AND
    *a* is 1 edge from node "net 1.2" AND
    *a* is connected to 1 node of type "net"

} 2102 select nodes *a* of type "datastore," num = count(unique b)
where
    *a* is 2 edges from *b* AND
    *b* is a node of type "VM"
order by num

} 2110 select nodes *a* of type "cluster," num = count(*b*)/count(*c*)
where
    *b* is a node of type "VMDK" AND
    count (parents of *b*) > 1 AND
    *b* is 4 edges from *a* AND
    *c* is a node of type "VMDK" AND
    count (parents of *c*) = 1 AND
    *c* is 4 edges from *a*

} 2114

FIG. 21A network trees

METHOD AND SYSTEM THAT DETERMINE WHETHER OR NOT TWO GRAPH-LIKE REPRESENTATIONS OF TWO SYSTEMS DESCRIBE EQUIVALENT SYSTEMS

TECHNICAL FIELD

The current document is directed to system-configuration representation, graph databases, and, in particular, to methods and systems that compare two graph-like system representations to determine whether or not the two systems represented by the two graph-like representations are equivalent.

BACKGROUND

Over the past 60 years, computers have evolved from early standalone, single-processor, vacuum-tube implemented systems that lacked even basic operating systems to today's extremely complex, distributed computer systems that may contain thousands, tens of thousands, or more processors that support large numbers of virtual execution environments and executing processes that intercommunicate with one another through computer networks and that access huge volumes of data stored in hundreds, thousands, or more data-storage devices. Administration and Management of such complex systems represents a significant challenge. System administrators, managers, developers, vendors, and users continue to seek methods and systems to facilitate administration and management of complex, modern computer systems.

SUMMARY

The current document is directed to methods and systems that determine whether or not two graph-like representations of two physically or temporally distinct computer systems or computer-system configurations are equivalent. Determining whether two graphs are isomorphic is well known to be a computationally difficult task and practically intractable for the large graphs used to represent complex computer systems. The currently described methods and systems extract a first and second ordered set of subgraphs from each of a first and second graph-like representation of a first and a second computer system. The ordered sets of subgraphs are logically aligned, forming a set of subgraph pairs, each pair comprising a first subgraph selected from the first ordered set of subgraphs and a second subgraph selected from the second ordered set of subgraphs, the subgraphs of each pair of subgraphs having the same positions within their respective ordered sets. The currently described methods and systems transform the first and second subgraph of each subgraph pair into a corresponding first and second set of trees, label the trees, and then compare labels at each level of the trees to determine whether or not an isomorphic tree can be found in the second set of trees for each tree in the first set of trees. The process carried out by the currently described methods and systems is computationally tractable for even very large graphs.

BRIEF DESCRIPTION OF THE DRAWINGS

In FIG. 9, three different physical data centers 902-904 are shown below planes representing the cloud-director layer of abstraction 906-908.

FIGS. 21A-D illustrate the utility of a graph-like representation of the data center, discussed above with reference to FIGS. 20A-D, for system management and administration.

DETAILED DESCRIPTION OF EMBODIMENTS

Figure 1:
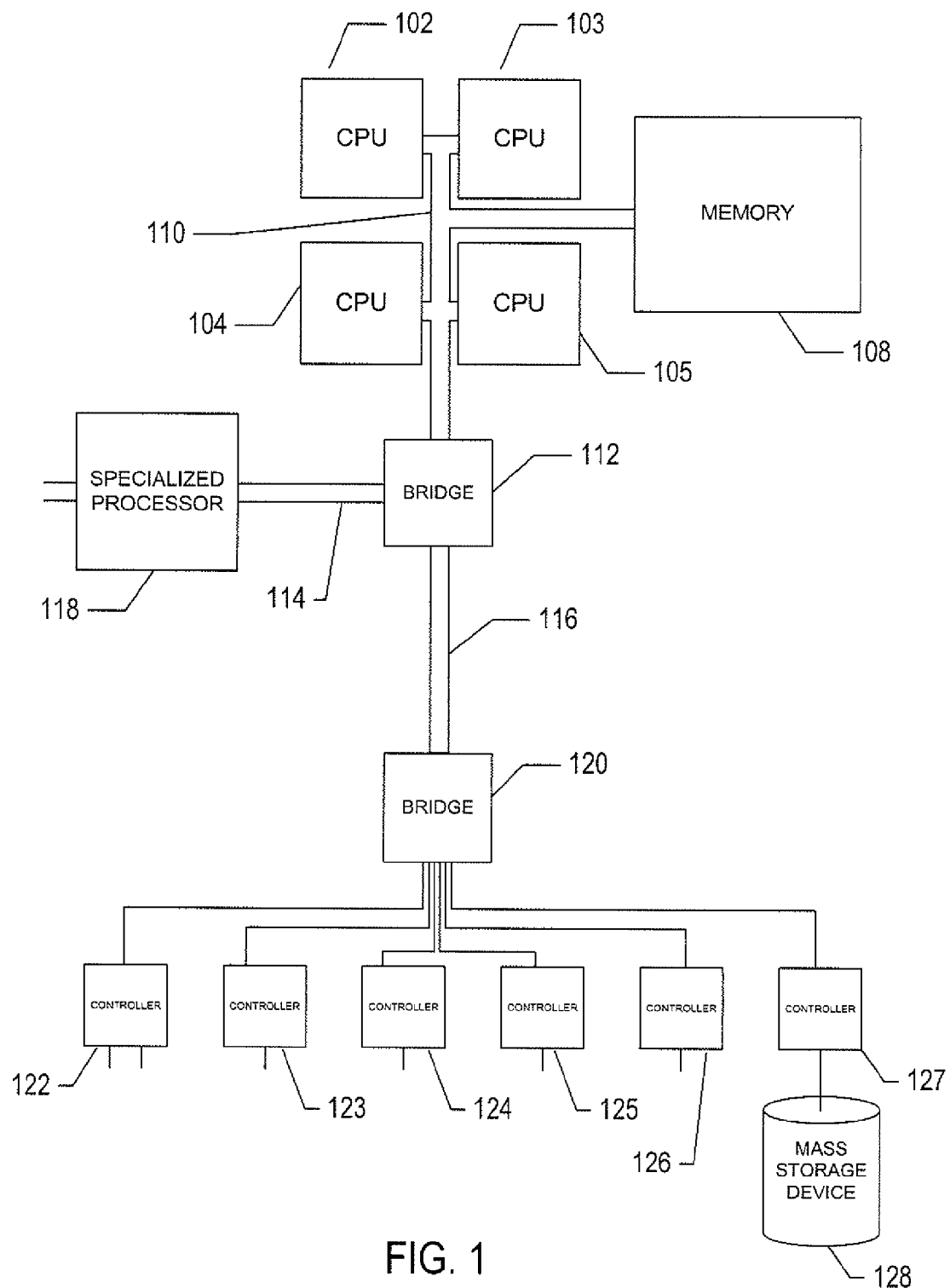
FIG. 1 provides a general architectural diagram for various types of computers.

The current document is direct to methods and systems for representing computer systems as graphs and determining whether or not two such graph-like representations are equivalent. In a first subsection, below, a detailed description of computer hardware, complex computational systems, and virtualization is provided with reference to FIGS. 1-10. In a second subsection, an overview of graph databases is provided. In a third subsection, implementations of the currently disclosed methods and systems that determine whether or not two system-representing graphs are equivalent are discussed.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
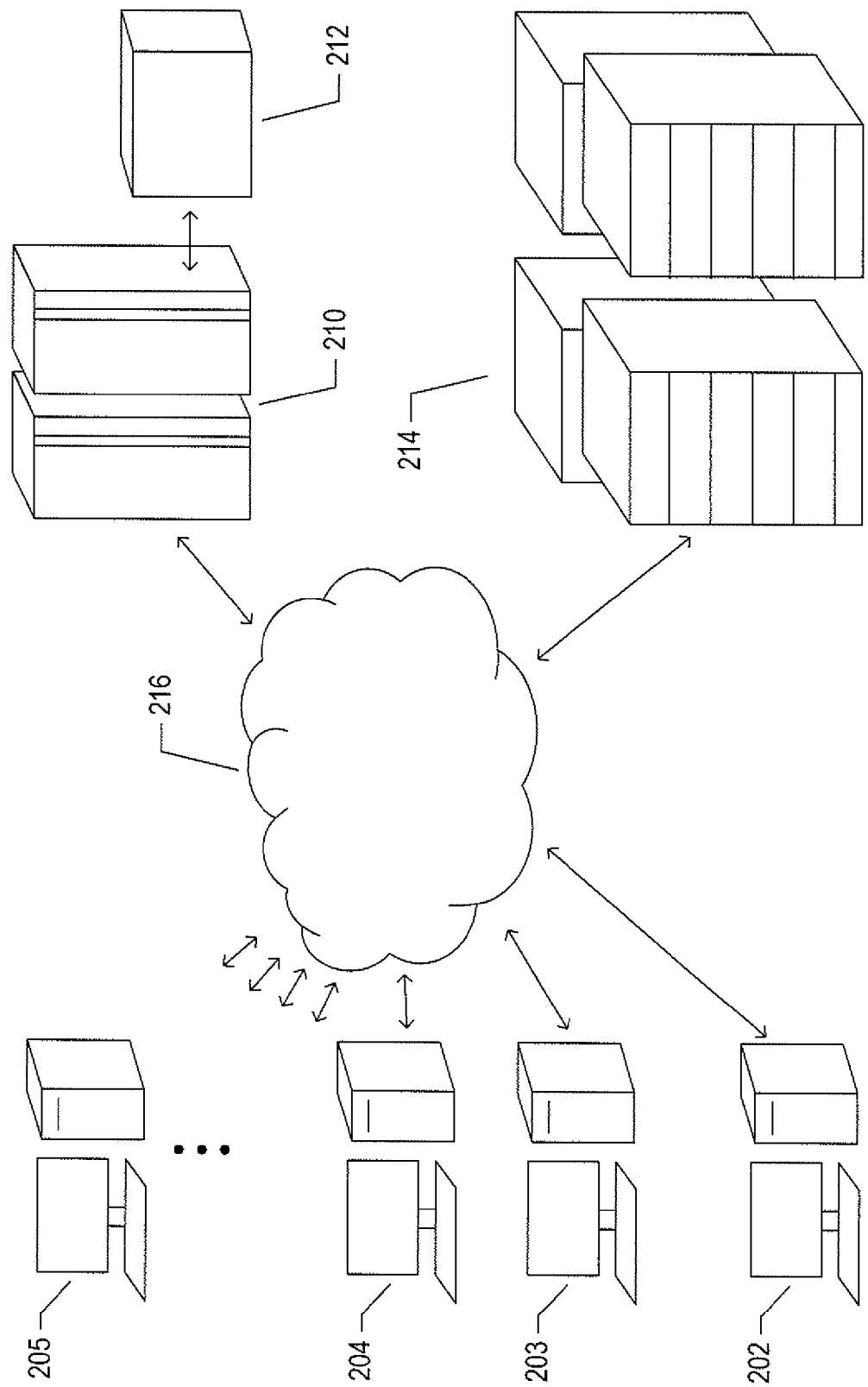
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
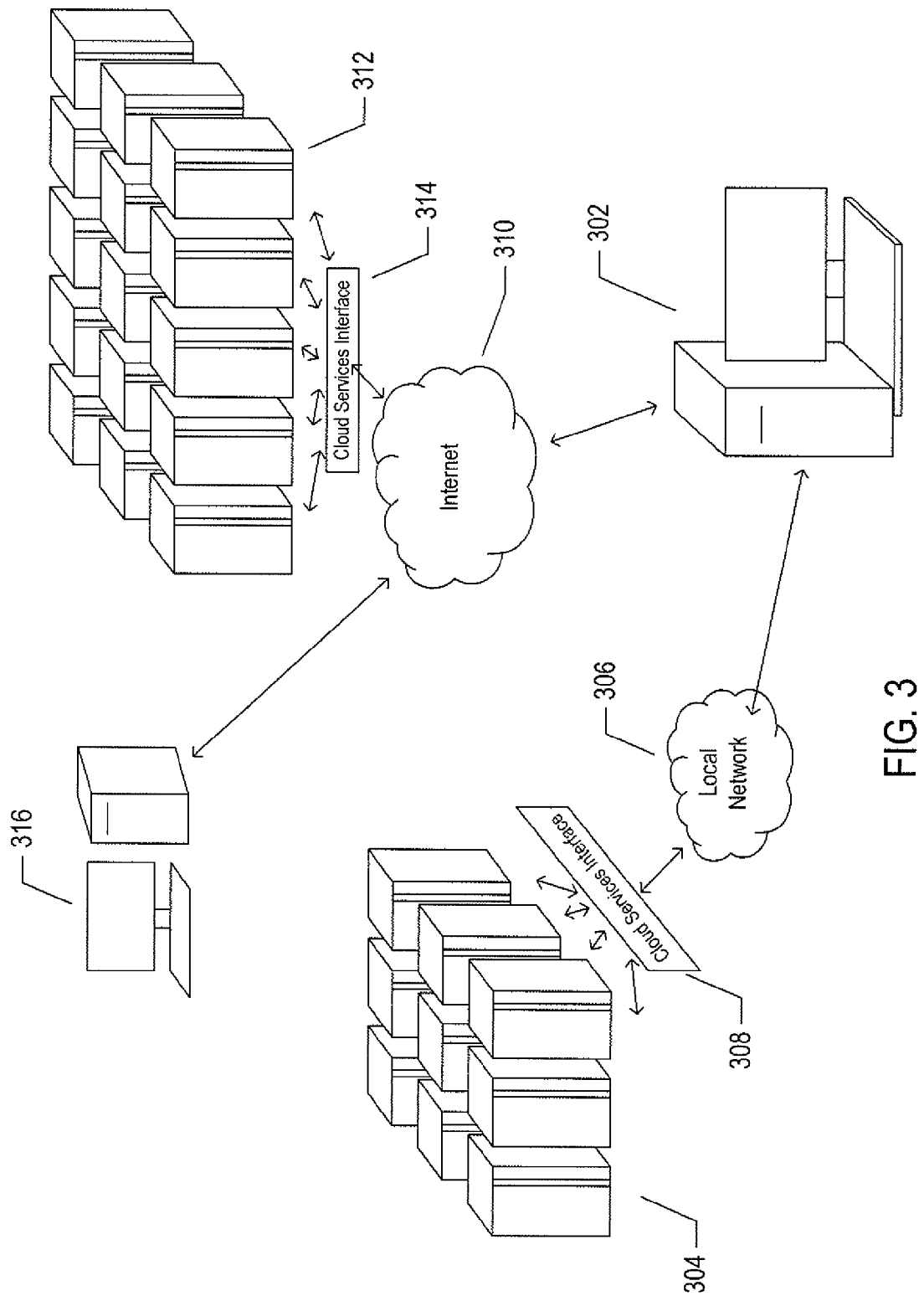
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
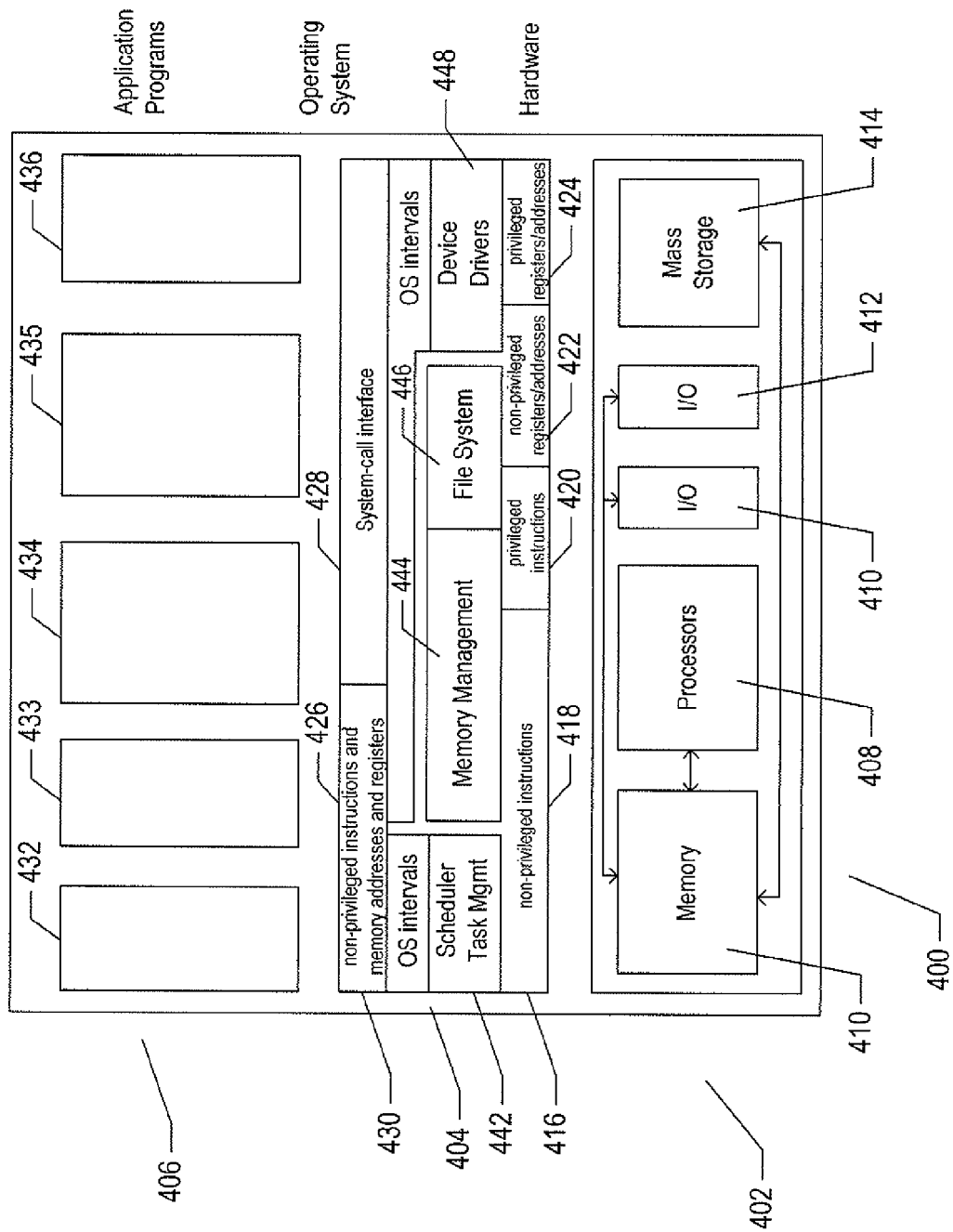
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
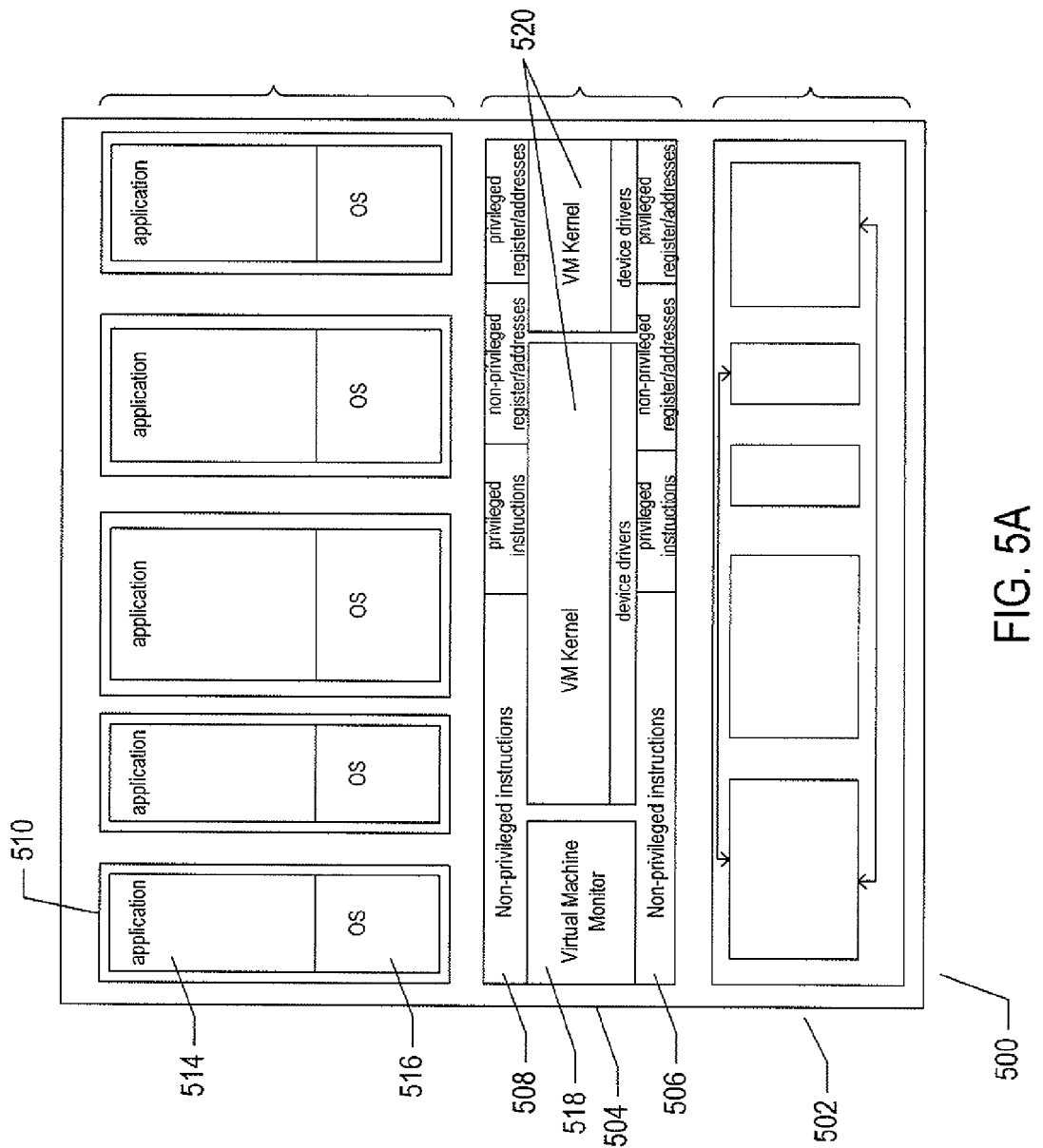
FIGS. 5A-B illustrate two types of virtual machine and virtual-machine execution environments.
Figure 5B:
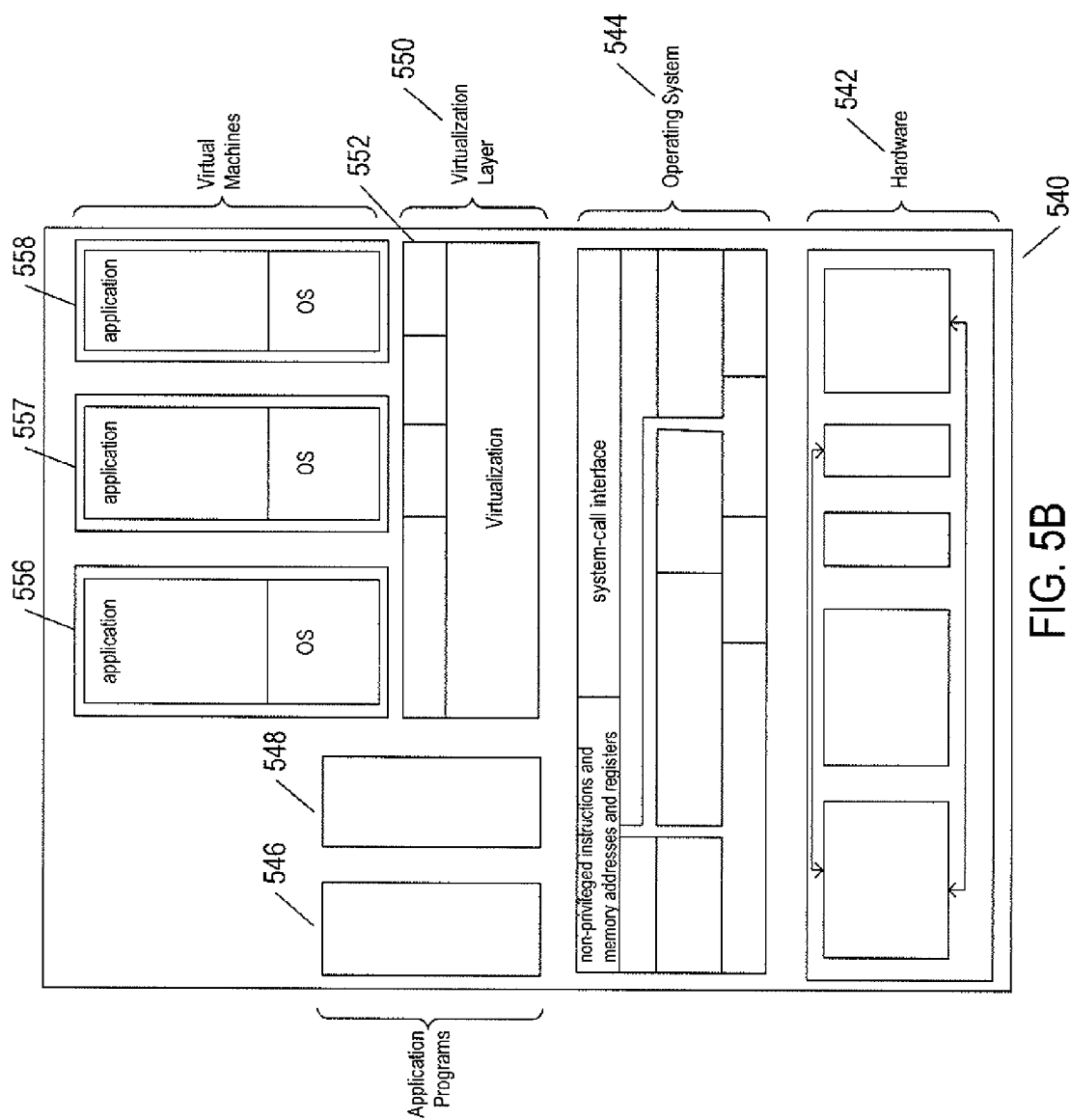

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
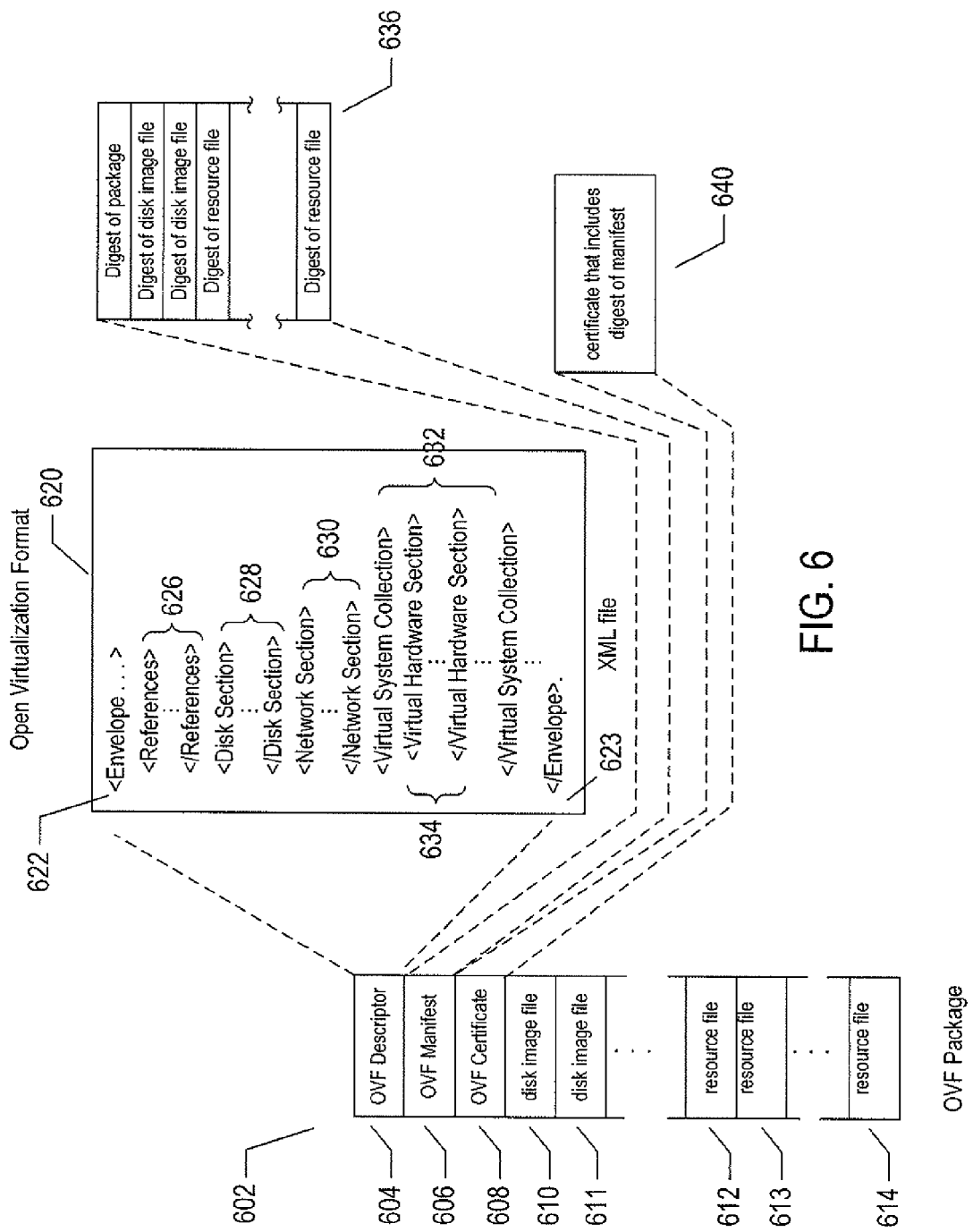
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
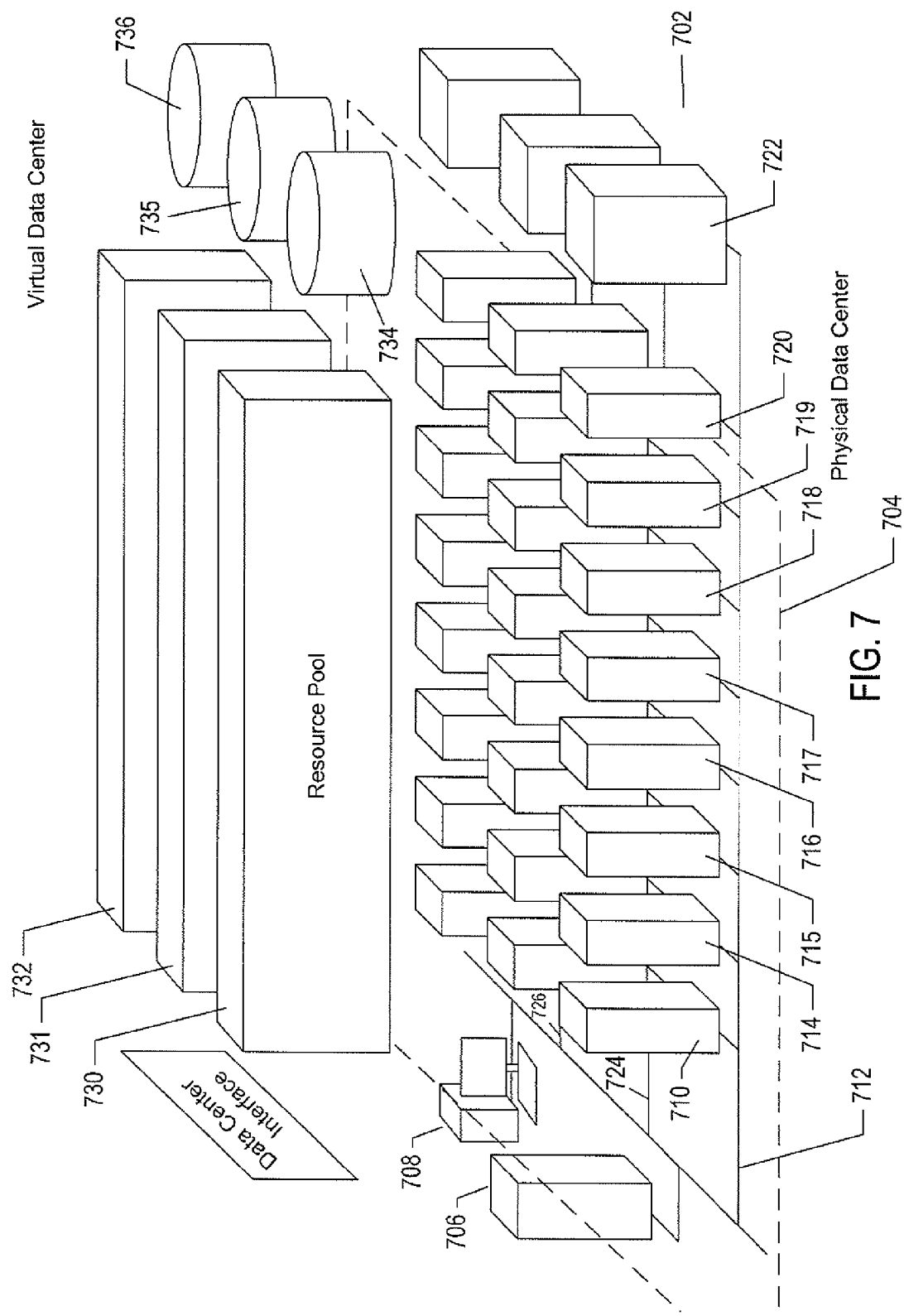
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual datastores, such as virtual datastores 734-736, and one or more virtual networks. In certain implementations, the resource pools abstract banks of physical servers directly interconnected by a local area network.

Figure 8:
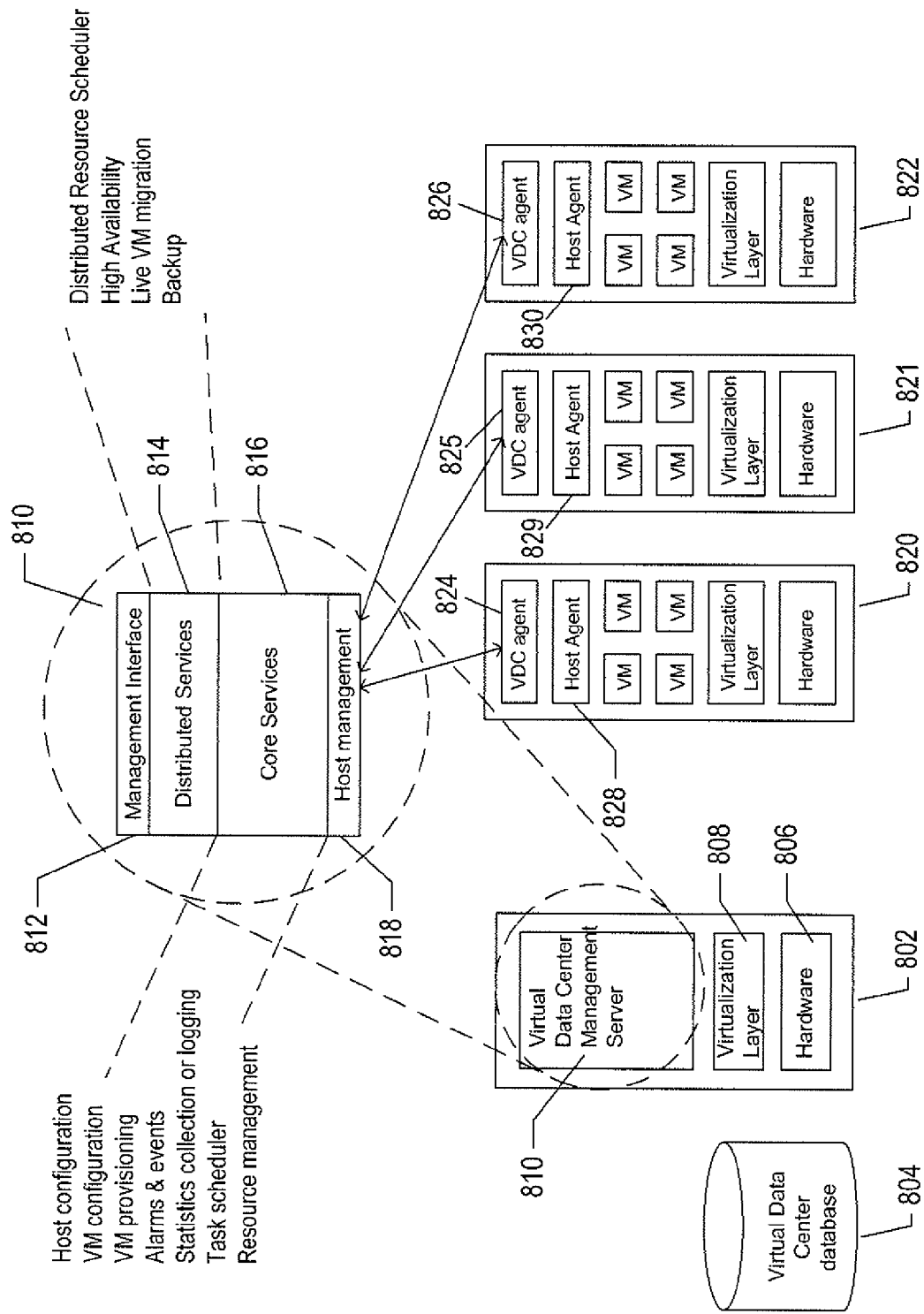
FIG. 8 illustrates virtual-machine components of a virtual-data-center management server and physical servers of a physical data center above which a virtual-data-center interface is provided by the virtual-data-center management server.

The virtual-data-center management interface allows provisioning and launching of virtual machines with respect to resource pools, virtual datastores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability. FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
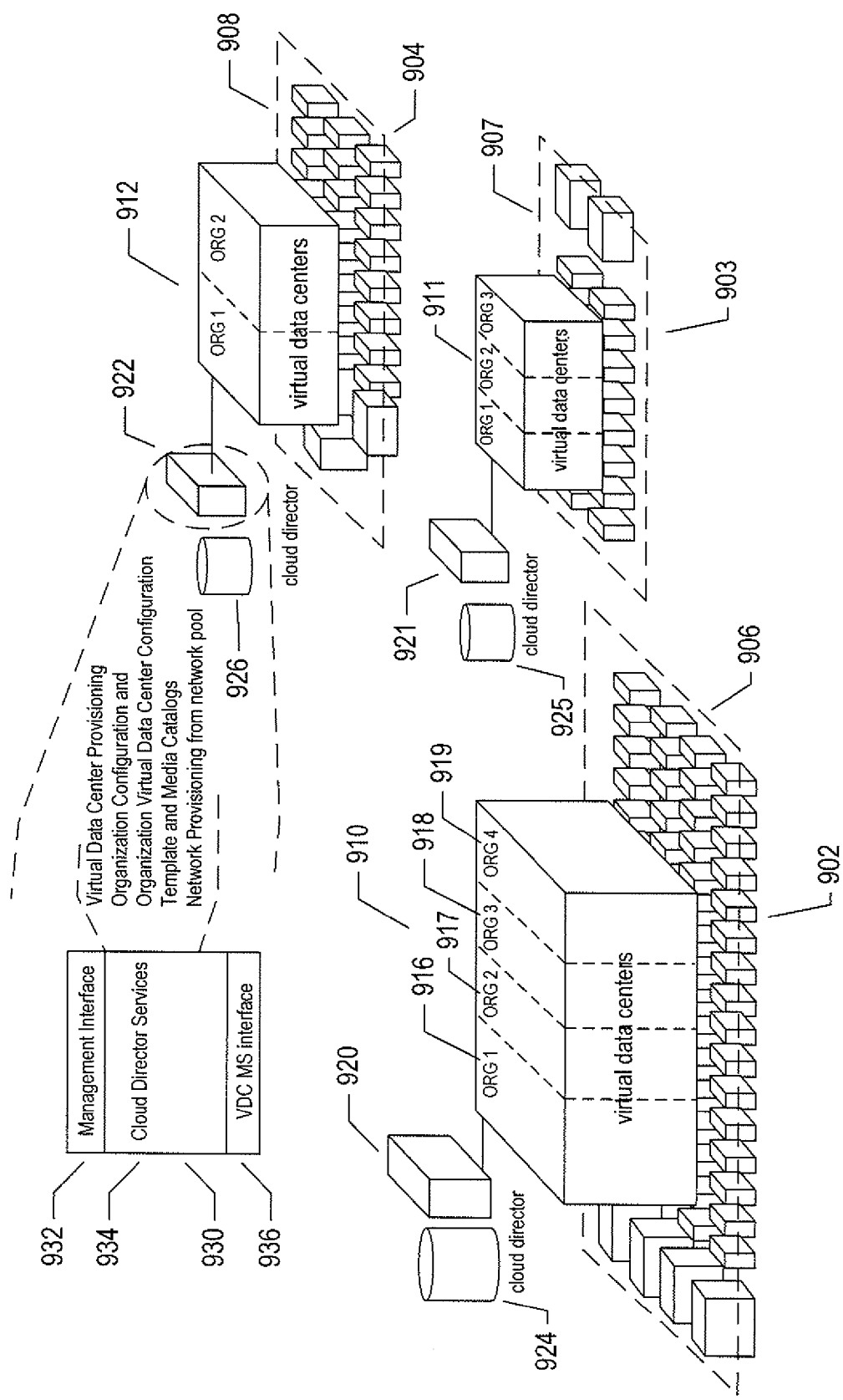
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
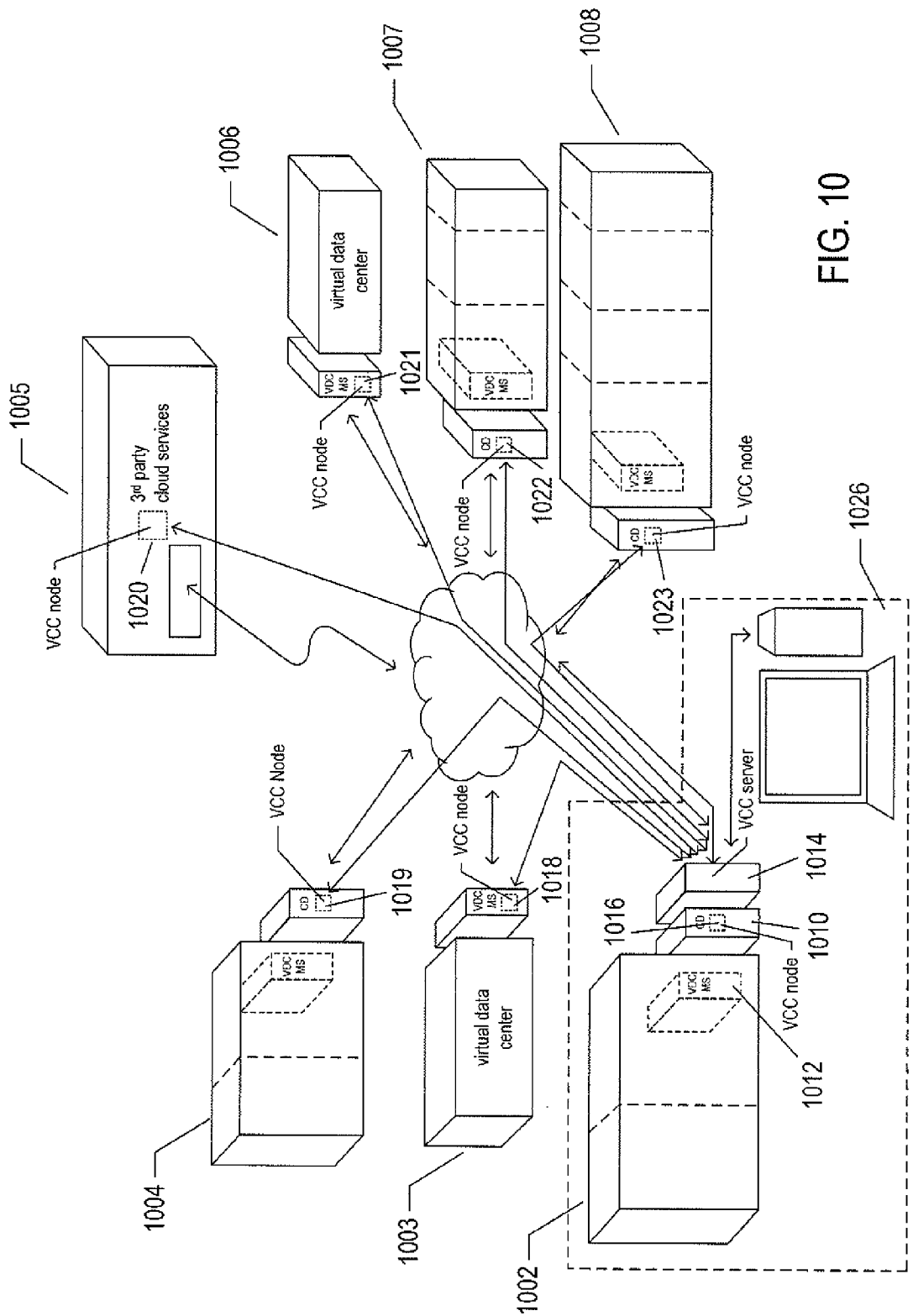
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Graph Databases

Graph databases were initially developed in the 1980s as an alternative data model for database management systems. Many other types of data models had been developed prior to that time and were in common usage, including hierarchical, network, and relational data models. In general, a particular data model may be most efficient for certain types of data that is to be stored and accessed through a database management system. Relational databases, as one example, are particularly effective for storing the types of data amenable to representation as tables of columns and rows, including the often-used parts and suppliers tables that represent parts of various products and the suppliers of the products and parts, respectively. Relational-database query languages, such as the structured query language ("SQL"), are based on the relational algebra, which provides a theoretical foundation for formulating and executing ad hoc queries and for optimizing query execution. Relational databases employ a data schema, consisting of one or more table declarations that specify the structure of the various relational tables stored within the database, that is generally developed prior to receiving and storing data and responding to queries.

In many modern computing environments, including the so-called "big data" computing environments, it may be difficult or impossible to develop a data schema for data storage prior to receiving and processing the data that is to be stored. Furthermore, many types of data that need to be stored in big-data applications, including representations of social networks, are naturally represented as graphs. This type of data consists of entities are connected together in various ways. The connection information is often as important, or more important than, the stored data representing the entities. Many of the types of queries posed to database management systems that store graphs involve traversing graphs or subgraphs according to specified traversal rules in order to find sets of nodes that are connected in particular ways. These types of operations are efficiently carried out by graph database management systems but, in general, would involve many expensive join operations and/or a proliferation of tables in a relational database management system. Graph databases naturally represent, and provide efficient query-based searching of, social-network information, information about distributed computing configurations, info nation related to various types of communications and communication networks, information traffic analysis, and distribution systems.

Figure 11:
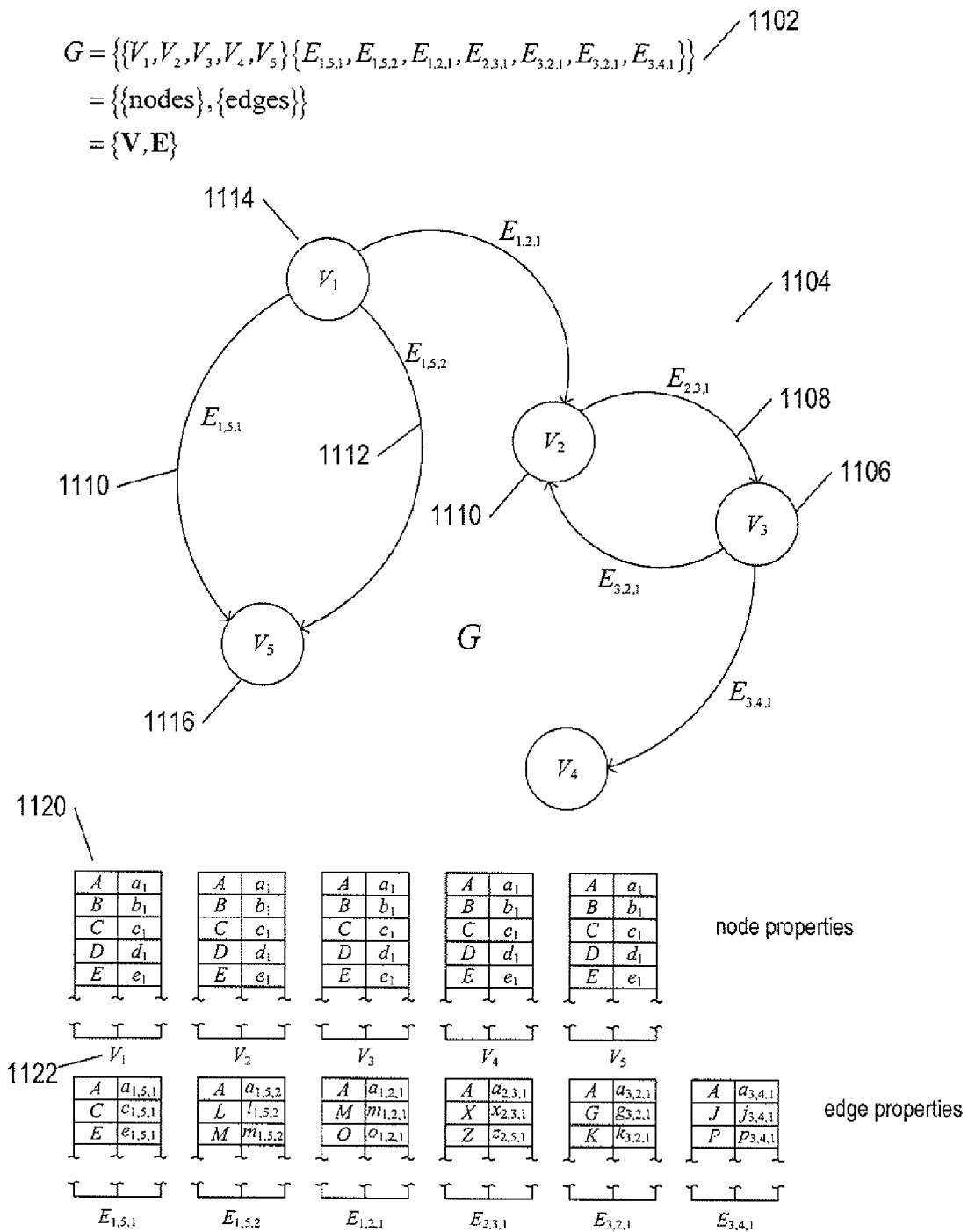
FIG. 11 illustrates a graph data object stored by graph databases.

FIG. 11 illustrates a graph data object stored by graph databases. In FIG. 11, a graph G is specified using several different notational conventions 1102 and is also pictorially represented 1104. A graph is a set of nodes, or vertices, and a set of edges. In the pictorial representation of the graph, the nodes are represented as disks, such as disk 1106 representing a node designated as node $V_3$, and the edges are represented by curved arrows, such as curved arrow 1108 that connects node $V_3$ 1106 to node $V_2$ 1110. In the graph illustrated in FIG. 11, the edges have directions, indicated by the arrow representations. In various other types of graph data models, edges do not have directions, are generally resented as line segments or curves. The notation 1102 used to describe the graph G in FIG. 11 specifies the nodes, or vertices, as $V_x$, where x is a unique integer identifier of a particular node. The edges are specified by a three-subscript notation $E_{x,y,n}$ where x is the identifier of the node from which the edge emerges, y is the identifier for the node that the edge is directed to, and n is a unique integer identifier for a particular edge connecting nodes x and y. For example, in the pictorial representation 1104 of graph G, there are two edges 1110 and 1112 that emanate from node 1114 and connect node 1114 to node 1116. The edge notations $E_{1,5,1}$ and $E_{1,5,2}$ differ in the final subscript n.

In addition to the identifiers of nodes and edges, a graph database may also store properties associated with nodes and edges. In the example shown in FIG. 11, each node and each edge are associated with key/value pairs, such as the key/value pairs in table 1120 associated with node $V_1$ 1122. In general, the keys may be specified by character strings and the values may be specified either by character strings or by another fundamental data type, such as an integer, real, character string, or single character. It is possible for values to be specified by user-defined data types, in certain graph database management systems. For illustration purposes, capital letters are used in FIG. 11 for key names and lower-case, subscripted letters are used for key values. The graph data model illustrated in FIG. 11 also adopts the convention that each node and edge has a key A with a corresponding name value. The value associated with key A is a name for a node or edge that can be used to access the node or edge or to specify the node or edge in a query For example, node $V_1$ 1122 has a name $a_1$ which is the value of the key/value pair with key A. In the data model illustrated in FIG. 11, nodes and edges have unique identifiers symbolically represented by the $V_x$ and $E_{x,y,n}$ notation as well as names. In many cases, the identifier for a node or edge is an integer that uniquely identifies the node or edge within a graph. A further notational convention can be used to represent a particular value or property for a particular node or edge. The name for node $V_1$ is represented as $V_1 \cdot A$, which stands for the value associated with key A associated with node $V_1$.

Figure 12:
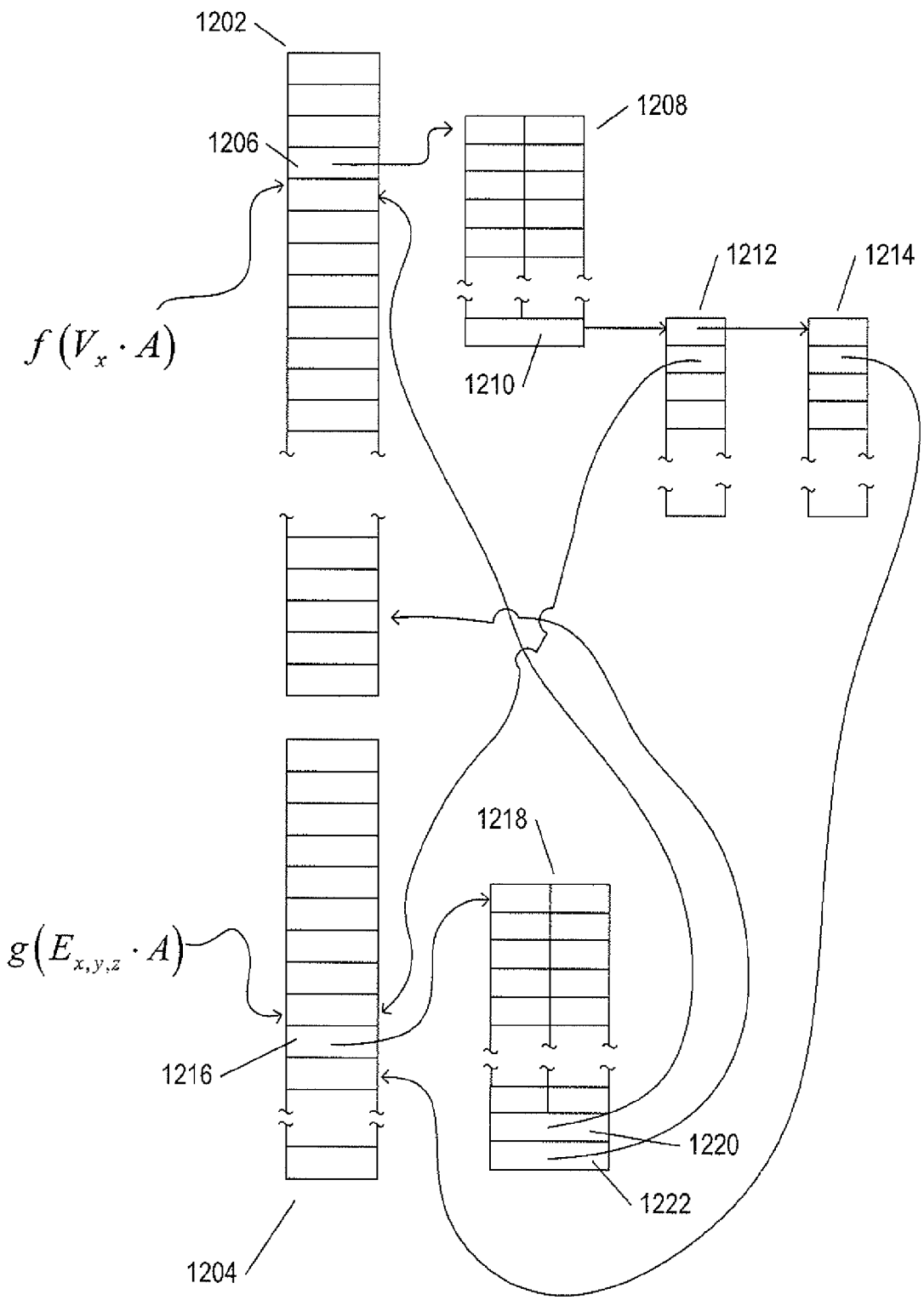
FIG. 12 illustrates one logical data-storage model for a graph database that stores graphs, such as the graph illustrated in FIG. 11.

There are many different possible ways for logically and physically storing graph data within a graph database management system. FIG. 12 illustrates one logical data-storage model for a graph database that stores graphs, such as the graph illustrated in FIG. 11. In the implementation shown in FIG. 12, the graph database management system maintains two large hash tables 1202 and 1204. These two hash tables are essentially integer arrays. The indexes of the entries in the hash tables can be used as the unique numerical identifiers for nodes, in the case of hash table 1202 and edges, in the case of hash table 1204. Thus, the hash table entry for a node with numerical identifier x can be found in the node hash table V at array cell V[x]. In order to find a node by name, a hash function $f( )$ can be applied to the name of the node, $f(V_x \cdot A)$, to generate the index of the cell of the array that is the entry for the node with name $a_1$. Each entry in the node hash table 1202, such as entry 1206, contains a reference, or pointer, to a table 1208 that contains the key/value property pairs for the node represented by the hash-table entry as well as an additional pointer 1210 to a list of associations that include indications of those nodes to which the node represented by the hash-table entry is connected by direct edges, such as the two-entry list of nodes that contain the association data structures 1212 and 1214. The association data structures contain references to one or more edges by which the node represented by the hash-table entry is connected to the nodes represented by association data structures.

Each entry in the edge hash table, such as entry 1216, contains a reference to a table-like data structure 1218 that stores the key/value property pairs for the edge. In addition, the table contains two additional references 1220 and 1222 that point to the entries in the node hash table corresponding to the nodes connected by the edge. Thus, in the implementation shown in FIG. 12, nodes and edges identified by unique identifiers or by names can be easily accessed. Graph traversal from a starting node involves following references from the starting node to connected nodes via the edges that connect the connected notes. In addition, or as an alternative, a two-dimensional binary array can be used to indicate all pairs of nodes that are directly connected by edges. There are many different possible ways for storing data at logical and physical levels corresponding to graphs stored and managed by graph database management systems.

Figure 13:
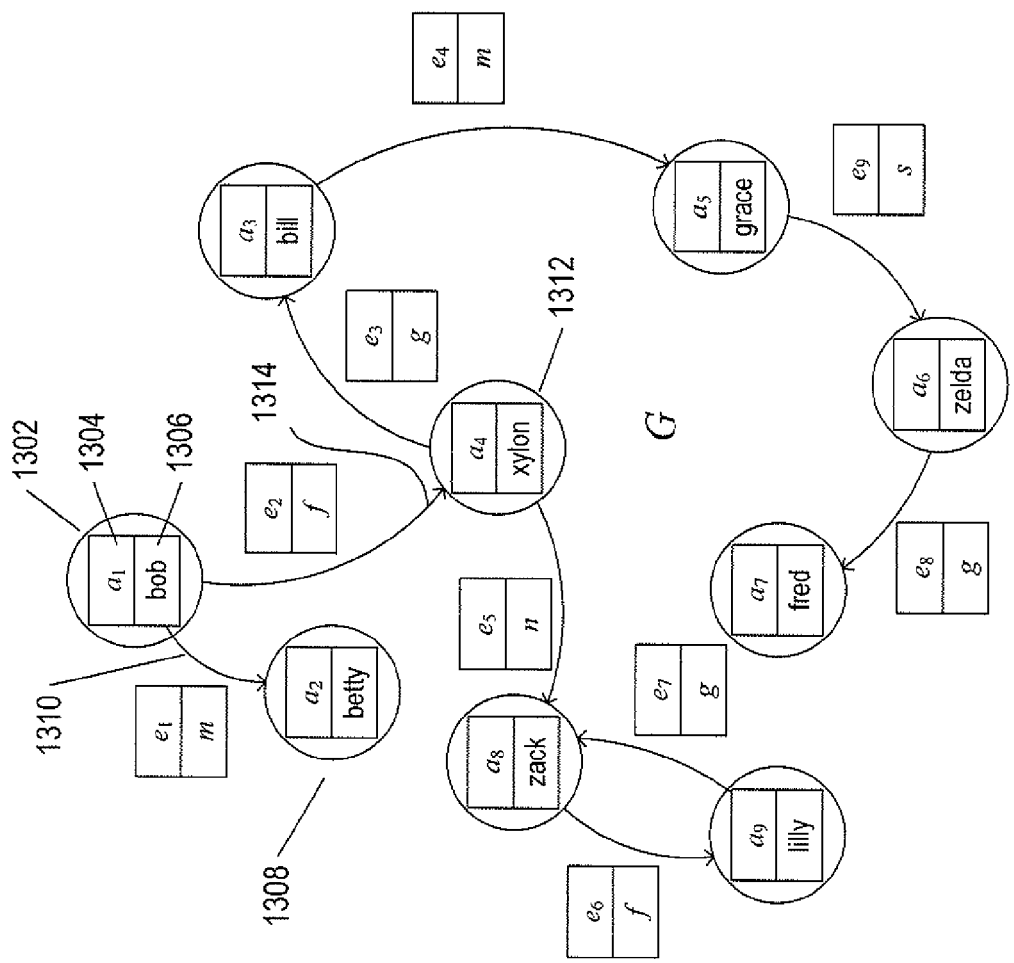
FIG. 13 shows a simple graph G stored in a graph database.

FIG. 13 shows a simple graph G stored in a graph database. The graph G includes nodes that each are associated with a unique numeric identifier as well as a name and edges that each are associated with a unique numeric identifier as well as a type. For example, node 1302 has the unique identifier $a_1$ 1304 and the name "bob" 1306. Node $a_1$ 1302 is connected to node $a_2$ 1308 via edge $e_1$ 1310 with type "m" and is connected to node $a_4$ 1312 via edge $e_2$ 1314 with type "f." The graph G, shown in FIG. 13, is used to illustrate various types of queries in FIGS. 14-17, which are discussed below.

Figure 14:
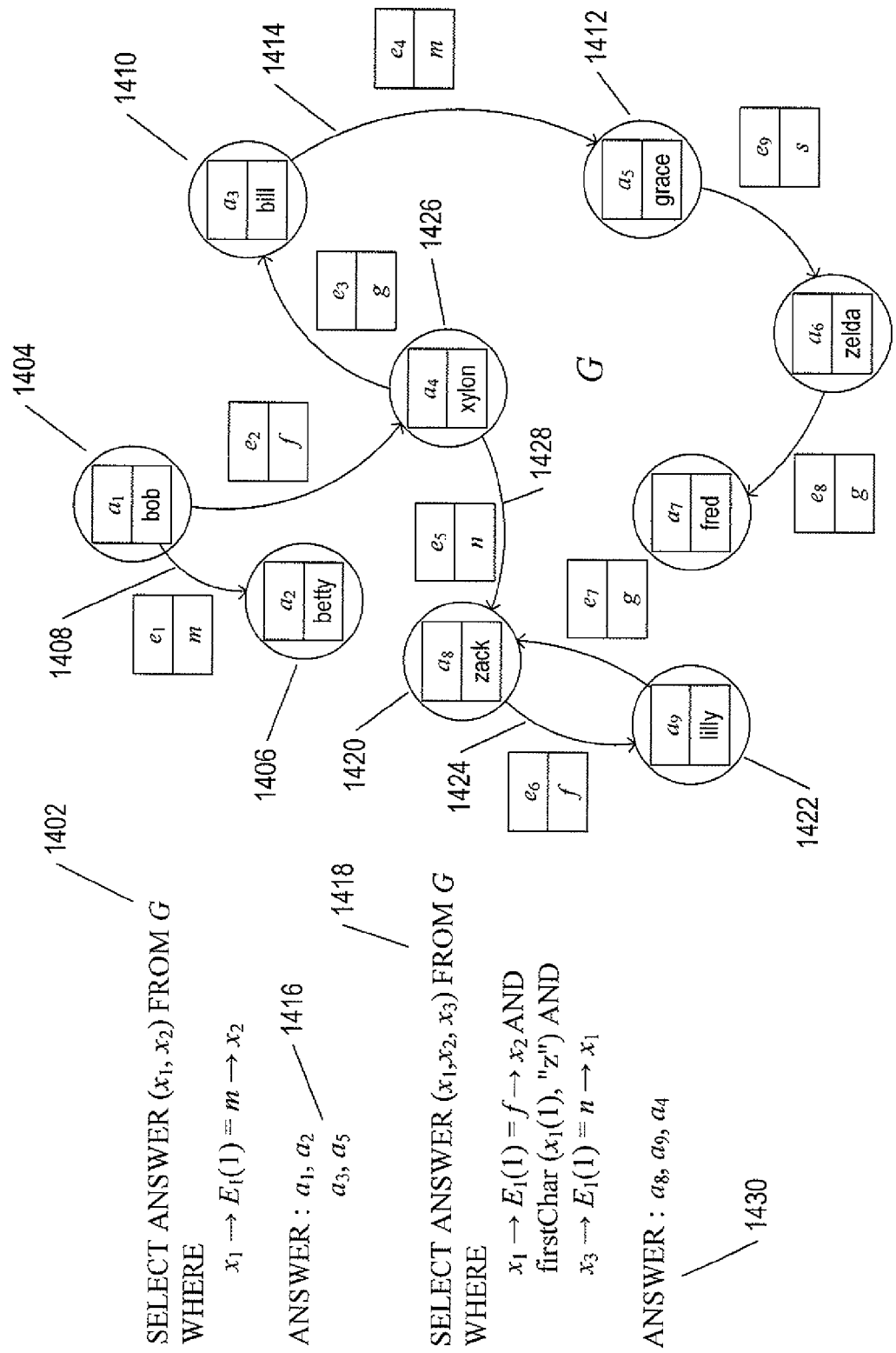
FIG. 14 illustrates several path queries.

FIG. 14 illustrates several path queries. A hypothetical graph query language is used for the path queries in the example of FIGS. 13-17. Many different graph query languages with different syntaxes have been developed but, in the current document, a simple hypothetical graph query language is used for simplicity of illustration. A first query 1402 seeks all pairs of nodes $x_1$, $x_2$, that are connected by a single edge of type m. The notation "$E_1$" refers to any edge in the graph and the notation "$E_1(1)=m$" refers to a single edge of type m, the "1" in parentheses indicating the type attribute of the edge. The type identifier is the second attribute of an edge. The first attribute, $E_1(0)$, is the edge identifier, such as $e_1$ for edge 1310 in FIG. 13. $E_1$ is a query variable as are the variables $x_1$ and $x_2$ that represent any two nodes of the graph. The SELECT statement indicates that an answer containing pairs of nodes is desired and the WHERE clause specifies that each of the desired pair of nodes is connected by a single edge of type m. As can be seen in the representation of graph G in FIG. 14, node $a_1$ 1404 is connected to node $a_2$ 1406 by an edge of type m 1408 and node $a_3$ 1410 is connected to node $a_5$ 1412 by an edge $e_4$ 1414 of type m. Therefore, the answer to the query 1416 includes the two pairs of nodes: ($a_1$, $a_2$) and ($a_3$, $a_5$). A second query 1418 seeks triples of nodes where the first two nodes of the triple are connected by an edge of type f, the first character in the name of the first node is "z," and the first node is connected to the third node by an edge of type n. As can be seen in the graphical representation of graph G, node $a_8$ 1420 is connected to node $a_9$ 1422 by an edge $e_6$ 1424 of type f, the first character in the name of node $a_8$ 1420 is "z," and node $a_8$ 1420 is connected to node $a_4$ 1426 by an edge $e_5$ 1428 of type n. There are no other node triples in the graph that meet the requirements of the WHERE clause of query 1418. Thus, the answer 1430 to the second query 1418 is the triple $a_8$, $a_9$, and $a_4$ corresponding to nodes 1420, 1422, and 1426.

Figure 15:
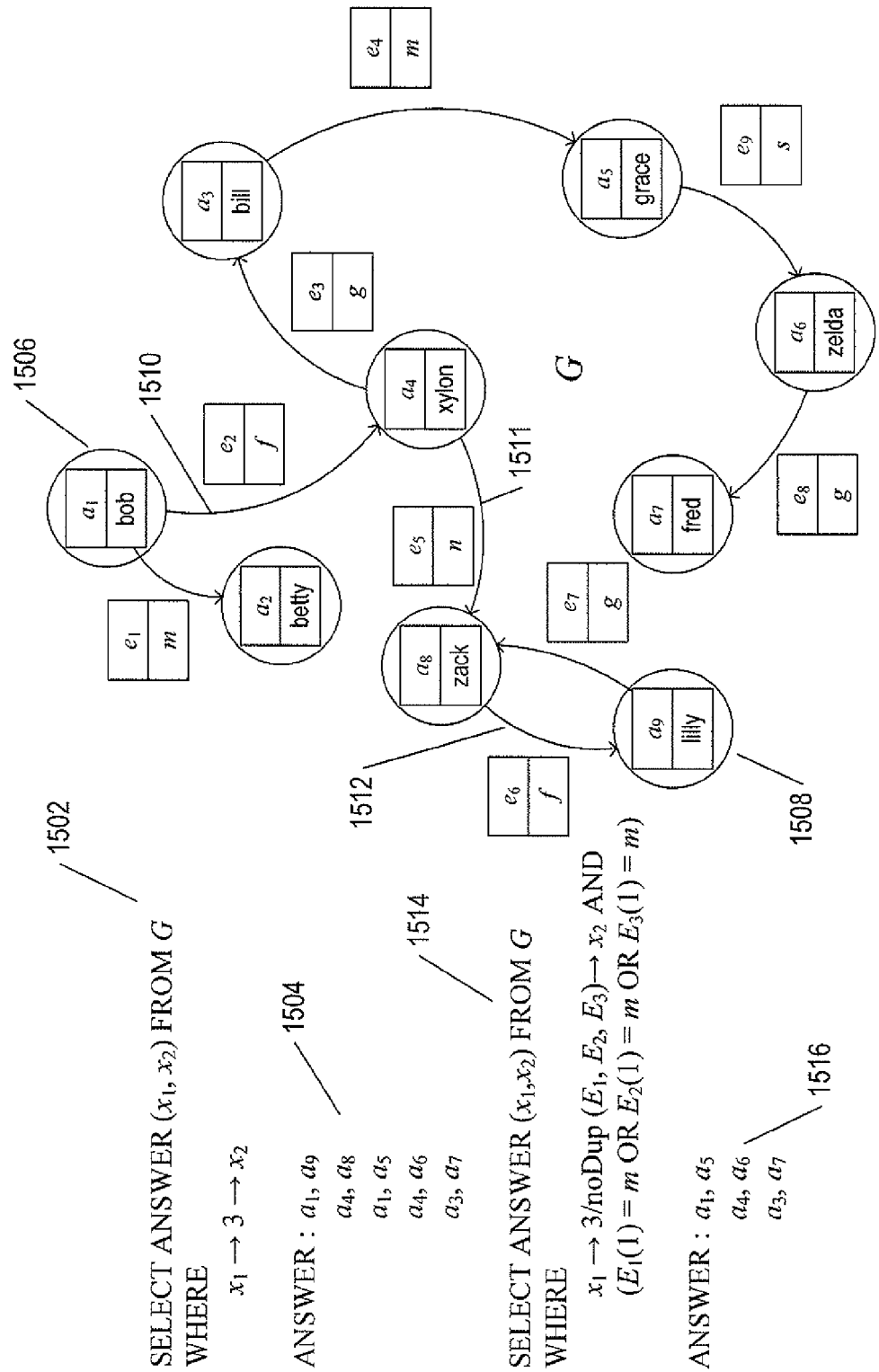
FIG. 15 shows two additional path queries.

FIG. 15 shows two additional path queries. A first query 1502 seeks all pairs of nodes that are connected by three edges. Inspection of the graph G shown in FIG. 15 reveals that there are five sets of nodes 1504 connected by three edges. For example, node $a_1$ 1506 is connected to node $a_9$ 1508 by the three edges 1510-1512. A second query 1514 seeks pairs of nodes connected by three edges and with no duplicate nodes in the path and where at least one of the edges has type m. Inspection of graph G shown in FIG. 15 reveals three pairs of nodes 1516 that are connected by three edges with no duplicate nodes in the path.

Figure 16:
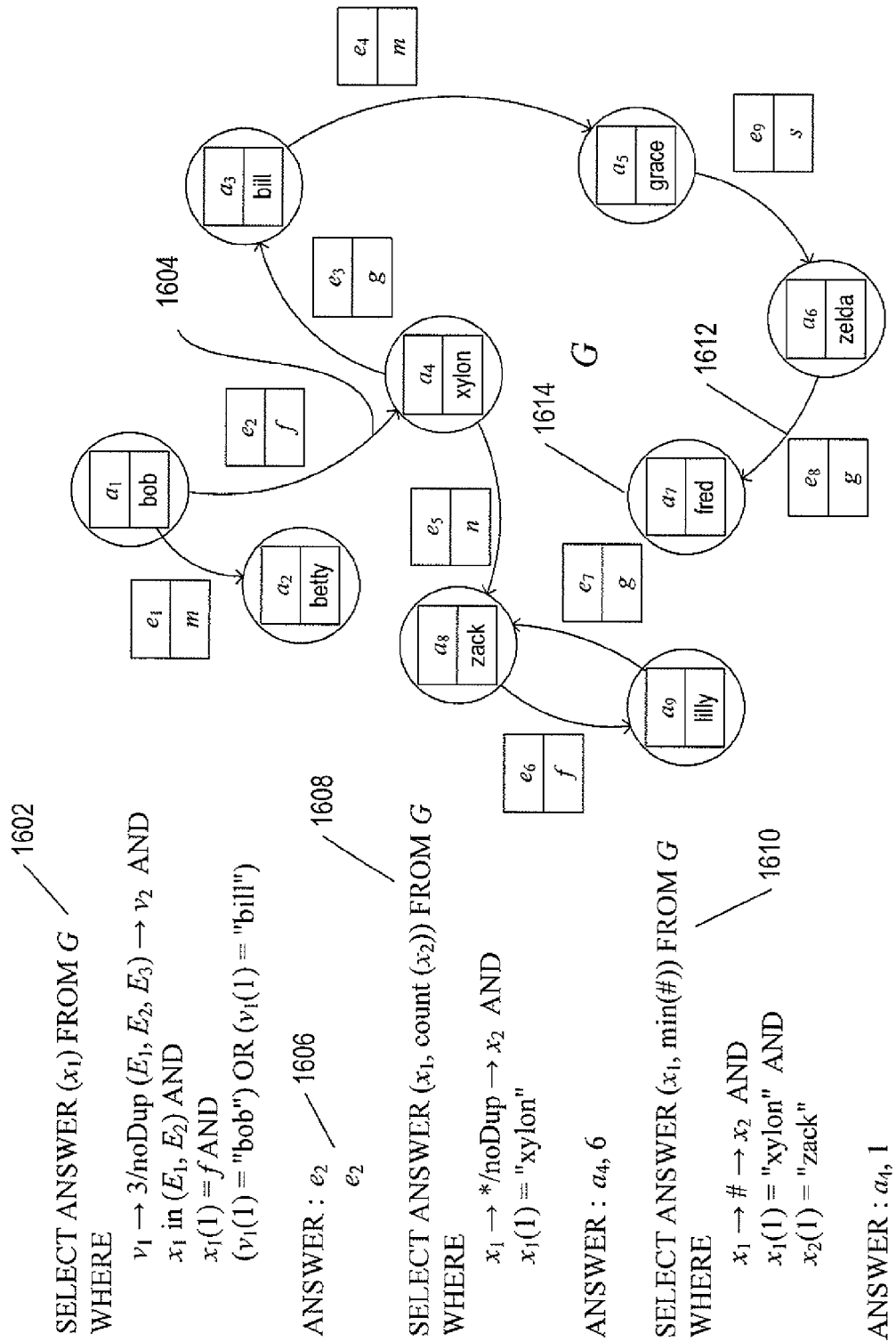
FIG. 16 shows a number of additional, more complex queries.

FIG. 16 shows a number of additional, more complex queries. A first query 1602 seeks those edges that occur in three-edge paths connecting two different nodes, the first of which has the name "bob" or "bill," the sought edges being either the first or second edge in the three-edge path and having type f. Inspection of graph G included in FIG. 16 reveals that edge $e_2$ 1604 occurs in two such three-edge paths, and therefore edge $e_2$ occurs twice in the answer 1606. A second query 1608 seeks the number of nodes connected to a node with name "xylon" by paths of any length. A third query 1610 looks for the minimum path length connecting two nodes with names "xylon" and "zack," respectively. Thus, as shown in FIG. 16, graph database queries may include familiar aggregation operators, such as count( ) and min( ), used in query languages like SQL.

Figure 17:
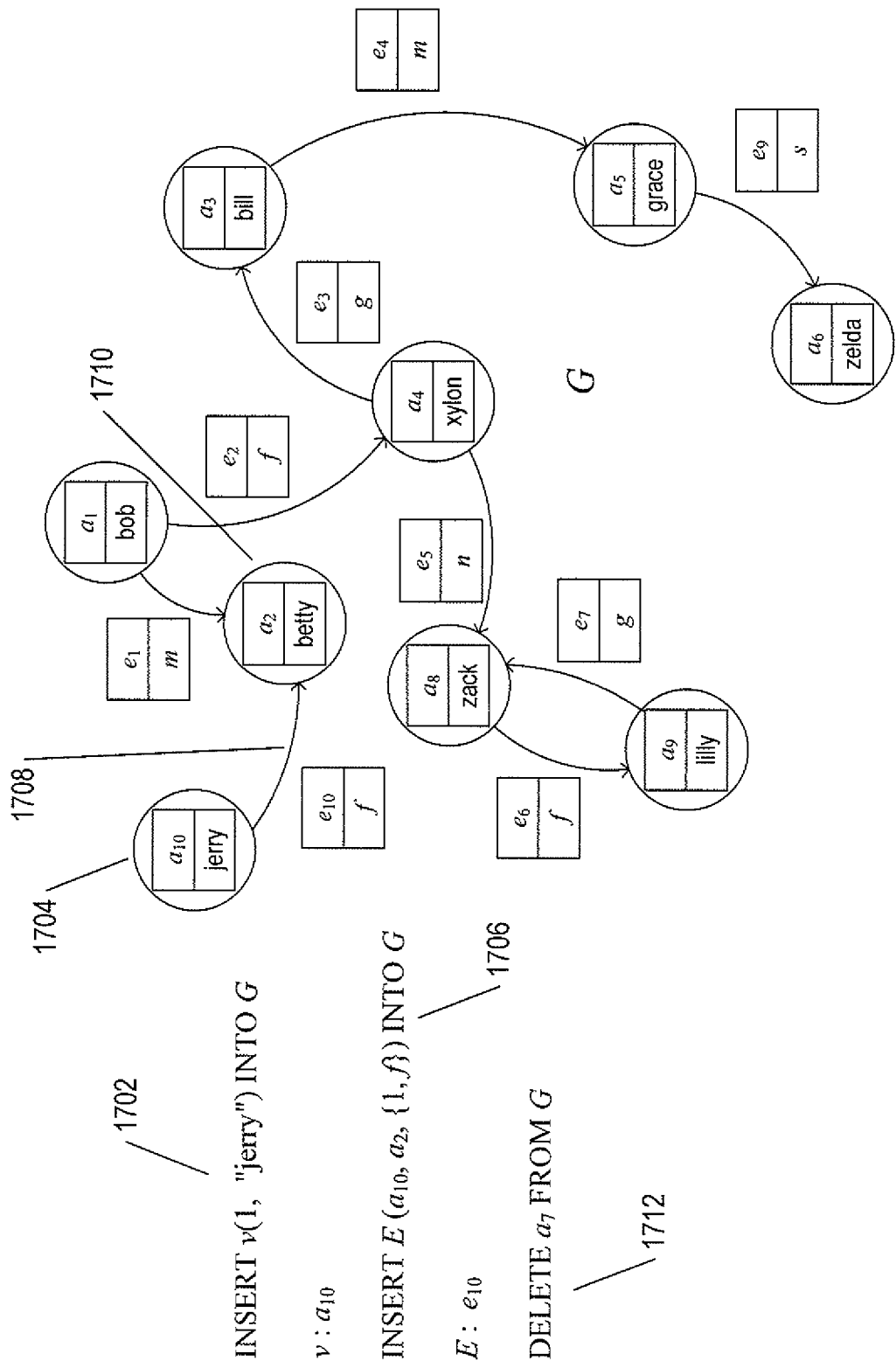
FIG. 17 illustrates insertion and deletion of graph entities.

Finally, FIG. 17 illustrates insertion and deletion of graph entities. The query 1702 inserts a new node, with name "jerry," 1704 into the graph. A second query 1706 inserts a new edge 1708 connecting newly inserted node 1704 to node $a_2$ 1710. Finally, query 1712 deletes node $a_7$ from the graph as well as any edges connecting node $a_7$ to other nodes. By comparing the representation of graph G in FIG. 16 to the representation of graph G in FIG. 17, as it appears following execution of the three queries 1702, 1706, and 1712, it can be seen that execution of query 1712 has removed edge 1612 and node 1614 from the graph G shown in FIG. 16.

These are but a few examples of the types of queries that can be carried out on graphs stored in graph databases by graph database management systems. These types of queries can be used, for example, to identify paths and nodes connected by paths within the graph, to navigate the graph in a variety of different ways, and to select various subgraphs in the graph having specified properties.

Figure 18:
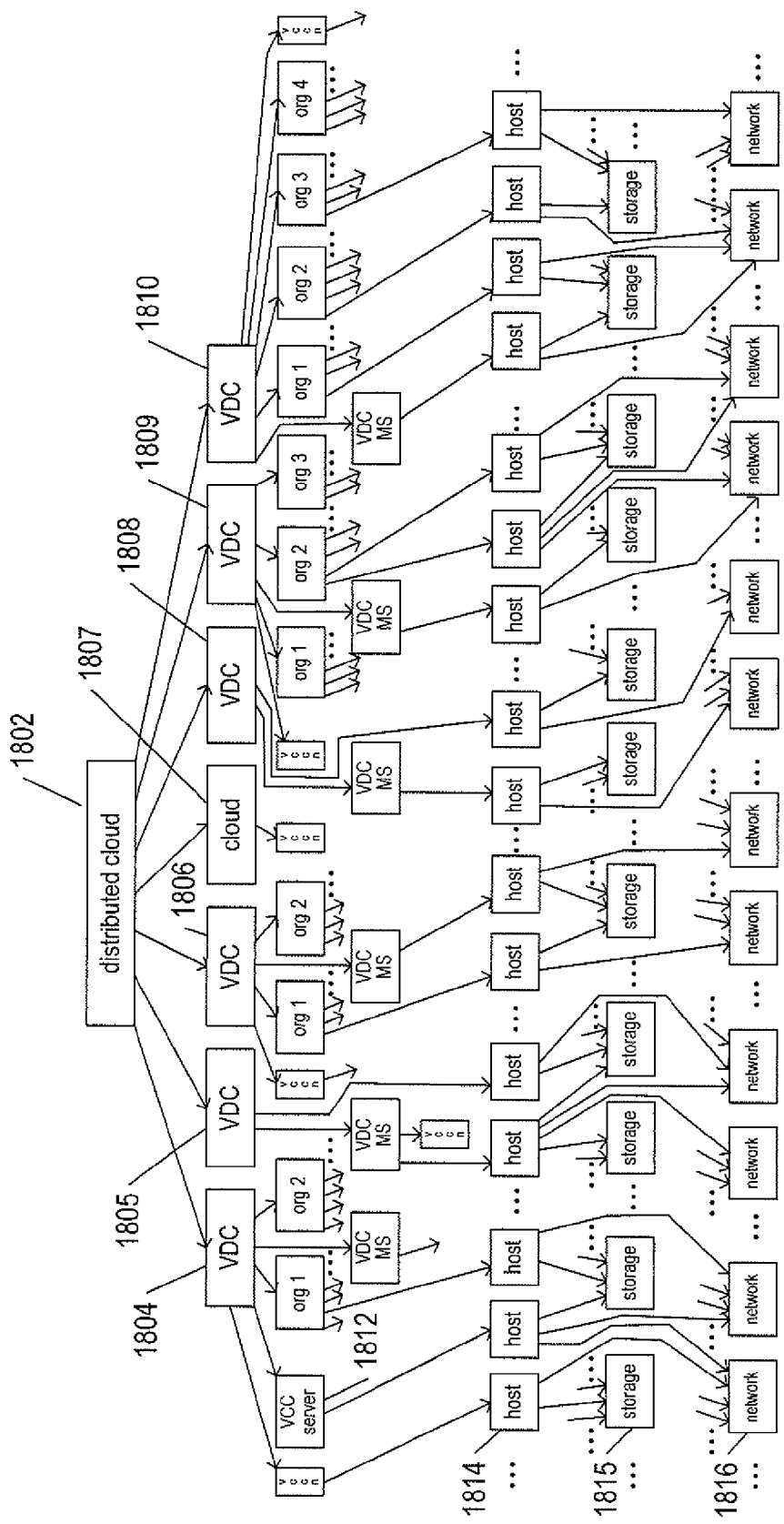
FIG. 18 shows a small portion of a graph-like representation of the distributed cloud-computing facility shown in FIG. 10.

Graph-Like Representation of Systems and Determination of Whether or not Two Graphs are Equivalent Graph databases provide a natural data model for describing complex distributed and virtualized computing systems, such as the distributed cloud-computing facility discussed above with reference to FIG. 10. FIG. 18 shows a small portion of a graph-like representation of the distributed cloud-computing facility shown in FIG. 10. A distributed-cloud node, or vertex, 1802 represents the entire distributed cloud-computing facility. A next level of nodes 1804-1810 represent the six virtual data centers 1002-1004 and 1006-1008 shown in FIG. 10 and the third-party cloud-services facility 1005 in FIG. 10. The virtual data centers, in turn, are linked to next-level nodes, such as node 1812, that represent high-level components and constructs within the virtual data centers, such as VCC servers, VCC nodes, and organizations within multi-tenant virtual data centers. Lower-level nodes, such as nodes 1814-1816, represent lower-level components, including virtual hosts, virtual storage devices and systems, and virtual networks. In a full graph-like representation of the distributed cloud-computing facility, these nodes would, in turn, include links, or edges, to many lower-level components, both virtual and physical. In FIG. 18, only a very small number of nodes are shown, with ellipses and arrows not emanating from particular nodes used to indicate that, in a full graph-like representation, there would be many more edges and nodes. The representation is a graph, rather than a tree, because, as one example, many hosts may access each of a particular virtual storage facility and a particular virtual network. Thus, unlike in a tree, in which, in general, a given node has one incoming edge and one or more outgoing edges, a node in the distributed-cloud-computing-facility representation, shown in FIG. 18, may have multiple, converging input edges as well as multiple outgoing edges. The fact that multiple edges can converge on a particular node results in cycles within the graph, which are not observed in a hierarchical, acyclic tree.

Figure 19:
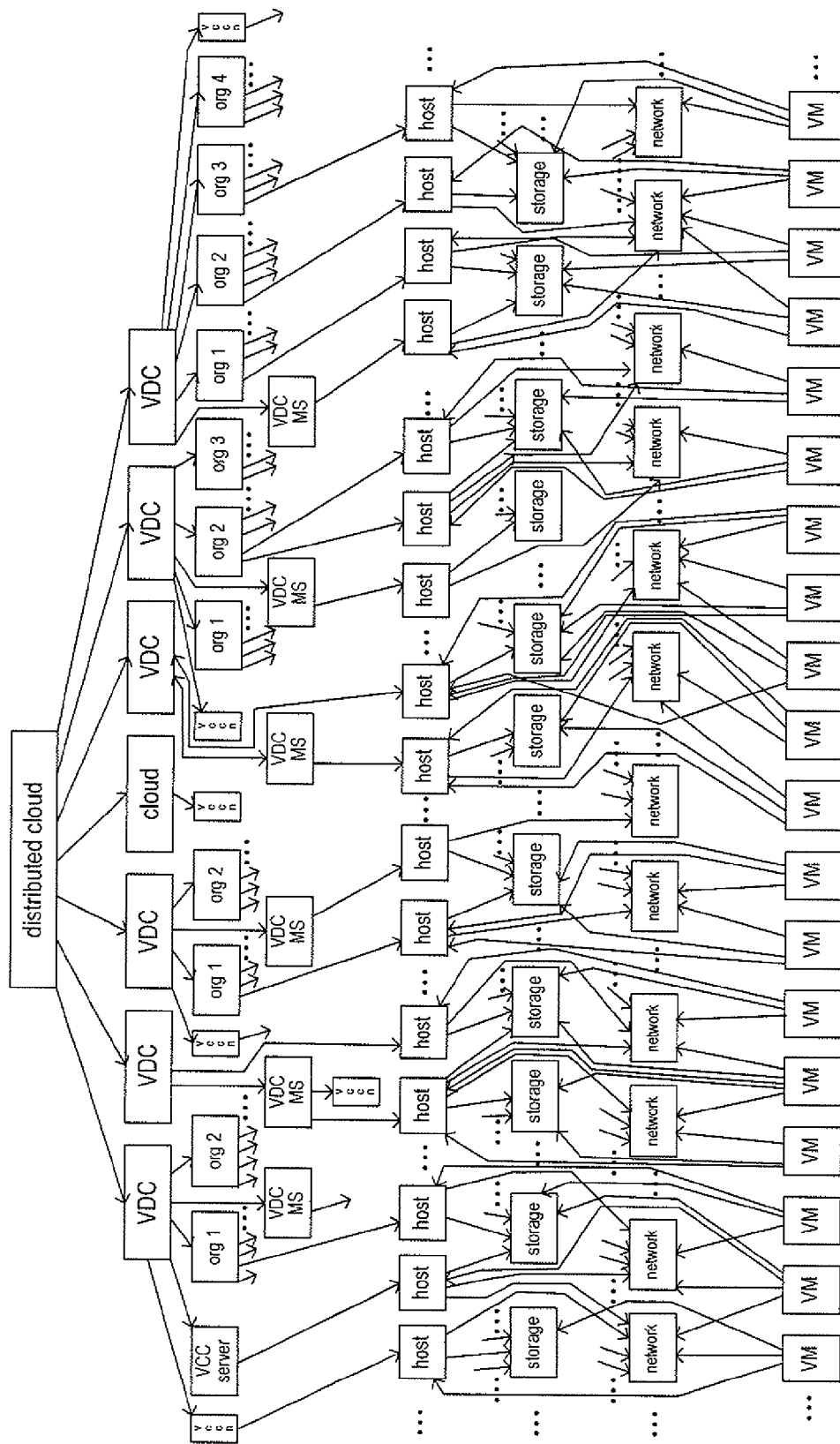
FIG. 19 includes an additional layer of nodes in the graph-like representation of the distributed cloud-computing facility using the same illustration conventions used in FIG. 18.

FIG. 19 includes an additional layer of nodes in the graph-like representation of the distributed cloud-computing facility using the same illustration conventions used in FIG. 18. The additional, lower level of nodes, including node 1902, represents virtual machines executing with the distributed cloud-computing facility. The virtual-machine nodes include directed edges linking the virtual-machine nodes to virtual hosts, virtual storage devices, and virtual networks on which the virtual machines currently execute and which are accessed by the virtual machines. As can be appreciated by comparing FIG. 19 to FIG. 18, as more and more components and subcomponents of the distributed cloud-computing facility are included, the complexity of the graph-like representation of the distributed cloud-computing facility may increase exponentially. Graph-like representations of even modest-sized distributed cloud-computing facilities may easily include thousands, tens of thousands, hundreds of thousands, millions, or more edges and vertices, depending on the level of detail represented by the graph-like representation.

In order to clearly illustrate the methods and systems to which the current document is directed, a simple graph-like representation of a data center is employed in the following discussion. FIGS. 20A-D illustrate the graph-like representation of the data center that is used as a basis for subsequent discussion and descriptions. Because computer systems are often logically and broadly decomposed into processing, data-storage, and communications subsystems, the graph-like representation of the data center, shown in FIG. 20D, is composed of subgraphs representing processing components and relationships, illustrated in FIG. 20A, data-storage components and relationships, illustrated in FIG. 20B, and communications components and relationships, illustrated in FIG. 20C.

Figure 20A:
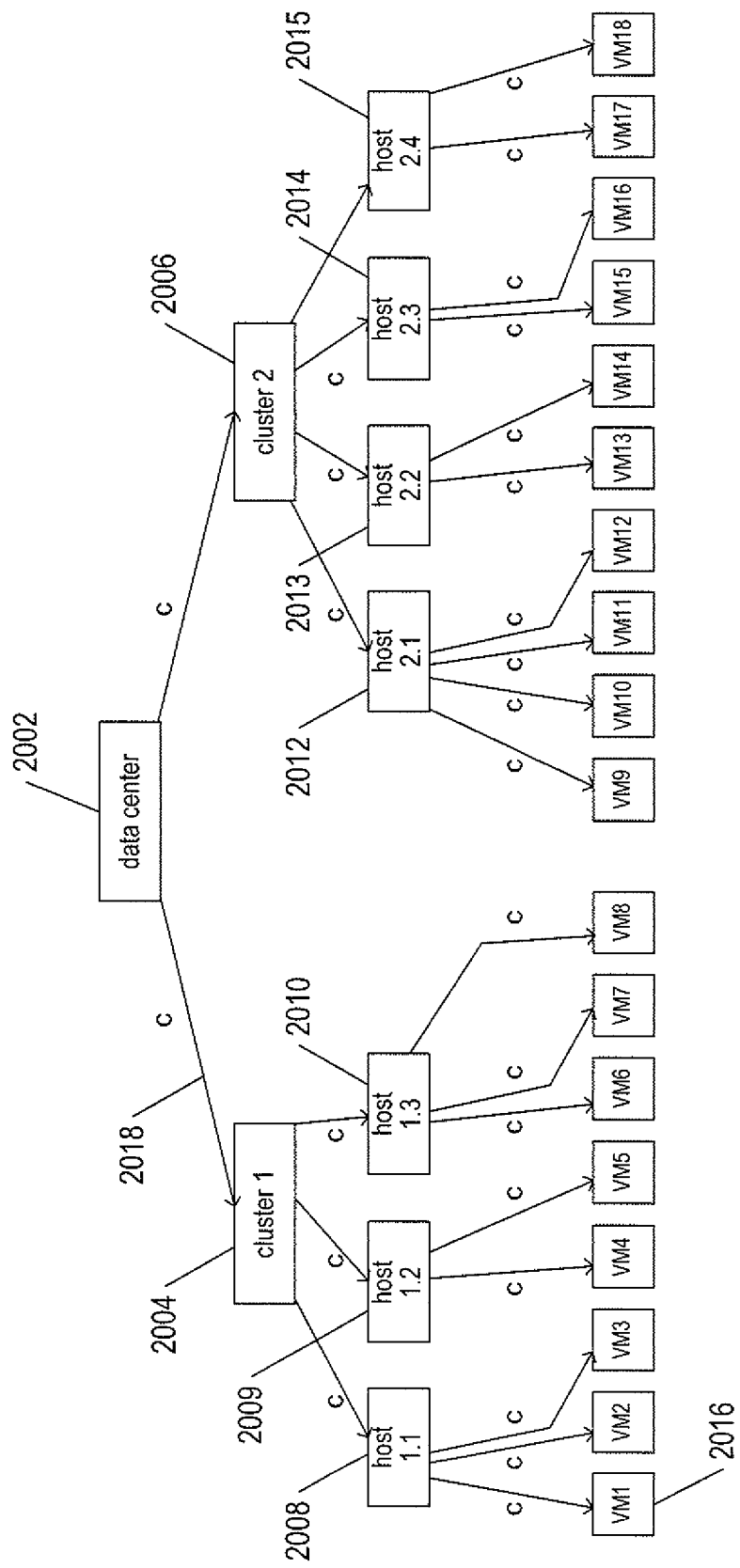
FIGS. 20A-D illustrate the graph-like representation of the data center that is used as a basis for subsequent discussion and descriptions.

FIG. 20A shows a portion of the nodes describing the data center that are connected by edges representing a computational relationship between the nodes. The entire data center is represented by node 2002. The data center includes two clusters of physical host computers. A first cluster is represented by node 2004 and a second cluster is represented by node 2006. The first cluster includes three host computers, represented by nodes 2008-2010. The second cluster includes four host computers represented by nodes 2012-2015. One or more VMs may execute on a given host computer at a particular point in time. These VMs are represented by a lower level of nodes, including node 2016 that represents a VM executing on the host computer represented by node 2008. In the model illustrated in FIG. 20A, the clusters are associated with integer numbers, the host computers are associated with numeric labels that include two integers separated by a period, and the VMs are associated with integers. These integers and numeric labels are used to uniquely name each of the clusters, host computers, and VMs. All of the edges in the graph shown in FIG. 20A, including edge 2018, are labeled with the letter "C" to indicate that the edges stand for a computational relationship between the nodes. The data center 2002 provides an overall computational bandwidth or capacity via one or more clusters. Each cluster provides a computational capacity or bandwidth via one or more host computers. The host computers provide a physical computational environment for execution of VMs. In general, there is a one-to-many relationship between the data center and the clusters within the data center, a one-to-many relationship between the clusters and the physical host computers within the clusters, and a one-to-many relationship between each host computer and the VMs that execute on the host computer at a particular point in time. Each VM executes on one host computer, each physical host computer resides within a single cluster, and each cluster resides within the single data center represented by the graph shown in FIG. 20A.

Figure 20B:
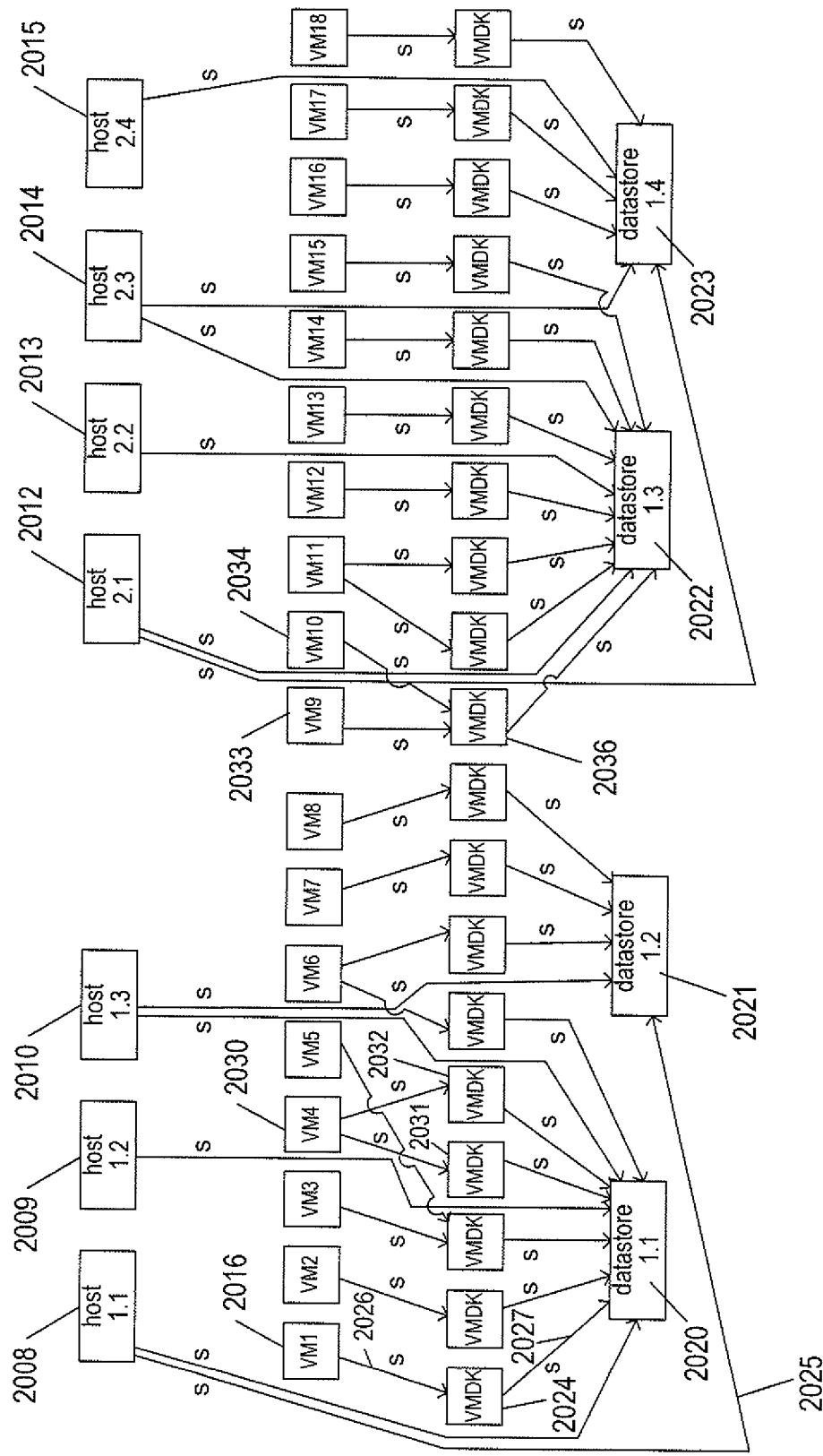

FIG. 20B shows additional nodes and edges in a representation of the data-center used for illustration purposes in subsequent discussions. The graph shown in FIG. 20B represents a set of storage relations between datastores and the host computers and virtual machines that access the datastores. In FIG. 20B, the nodes representing physical host computers 2008-2010 and 2012-2015 are again included in the graph. Similarly, the nodes representing VMs, including node 2016, are also included in the graph. New nodes that appear in the graph shown in FIG. 20B include four datastore nodes 2020-2023 and a large number of virtual machine disk ("VMDK") files that each store all or a portion of the computational state of a virtual machine within a datastore, including the VMDK file represented by VDMK node 2024. The edges in the graph shown in FIG. 20B, such as edge 2025, are labeled with the character "S" to indicate a storage relationship. Edge 2025 represents the fact that host computer 2008 stores data on datastore 2021. Edge 2026 represents the fact that VM1, represented by VM node 2016, stores its state within the VMDK file represented by VDMK node 2024. Edge 2027 represents the fact that the VMDK file represented by VDMK node 2024 is stored on data-store 1.1 represented by data-store node 2020. There is a general one-to-many relationship between host computers and datastores and a one-to-one relationship between VMDK nodes and data-store nodes. However, in the case of VMs and VMDK files, the relationship is, in general, many-to-many. In a normal case, a VM maintains state information in a single VMDK file that is stored on a single datastore. However, in some cases, such as the case of VM4, represented by VM node 2030, and the VMDK files represented by VMDK nodes 2031 and 2032, a particular VM may store state information in two or more VMDK files. An additional complexity is related to the VM linked-cloning operation. VM linked cloning involves creating a clone VM based on a currently executing original VM. As a result of the linked-cloning operation, the linked-clone VM shares one or more VMDK files with the original VM. Subsequent diversions in the states of the linked-cloned VM from the original VM and are stored in separate redo log files. For example, VM9, represented by VM node 2033, is cloned to produce linked-clone VM10, represented by node 2034. VM10 shares the VMDK file represented by VMDK node 2036 with original VM9.

Figure 20C:
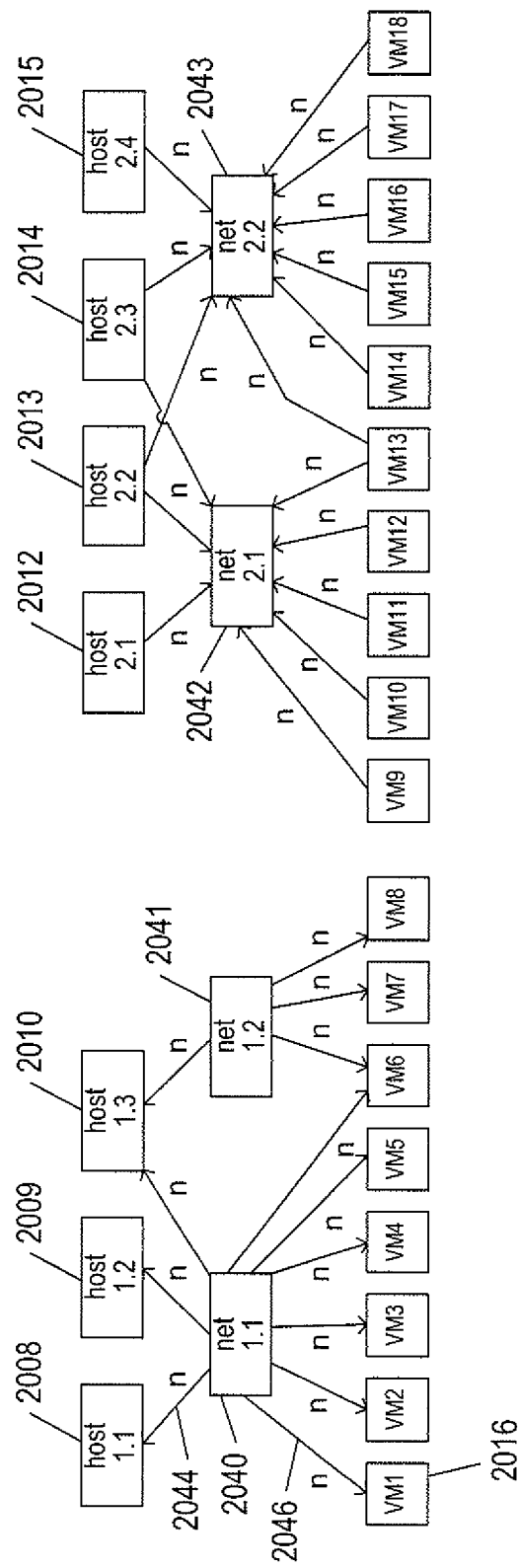
Figure 20D:
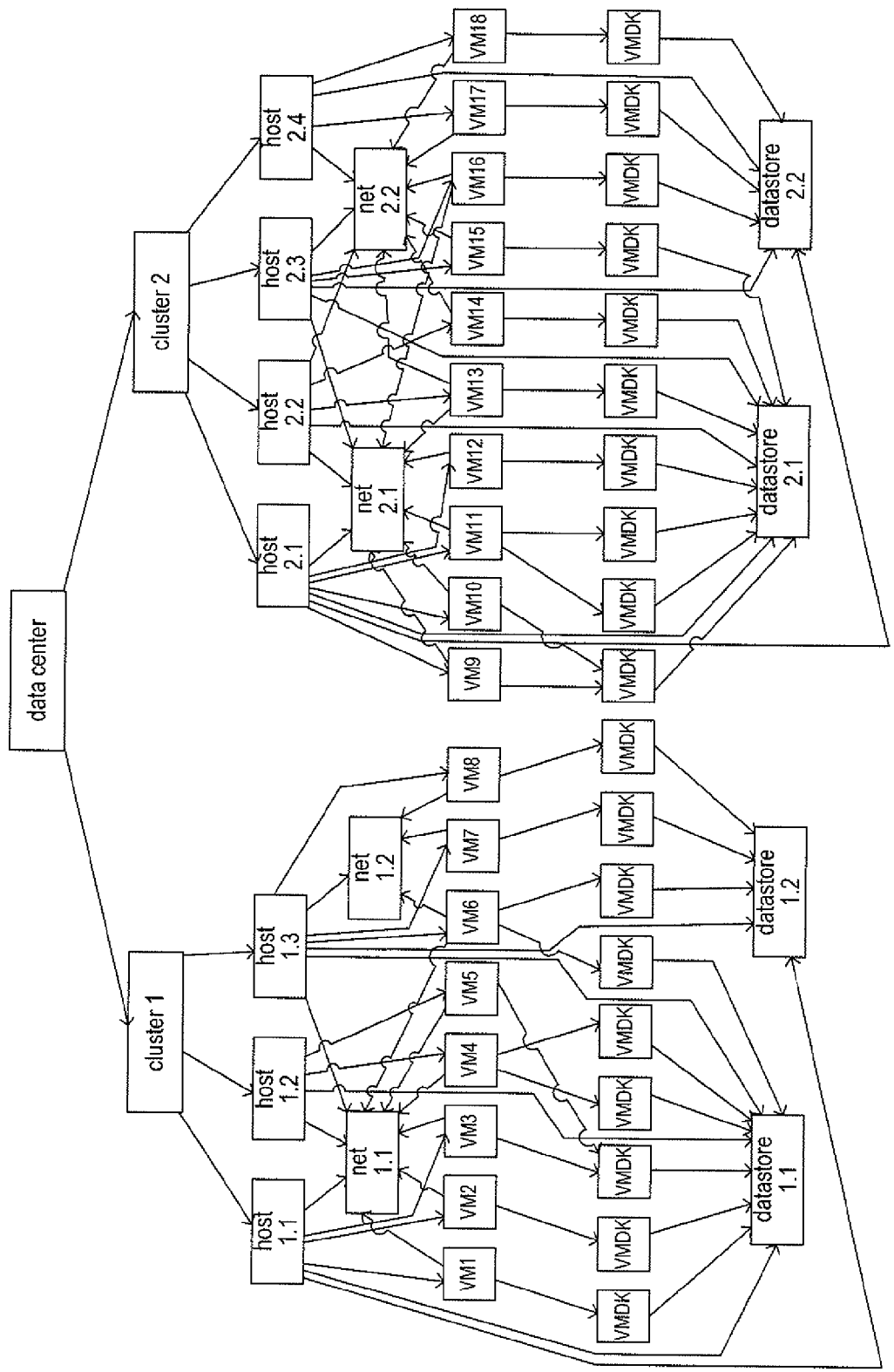

FIG. 20C shows several graphs that represent a networking relationship between certain types of nodes of the data-center model. Physical host computer nodes 2008-2010 and 2012-2015 and the VM nodes, such as node 2016 that represents VM1 again appear in the graphs shown in FIG. 20C. These graphs include four new nodes 2040-2043 that each represents a network that interconnects various host computers and virtual machines within the data center. The edges in the graph shown in FIG. 20C, such as edge 2044, are labeled with the letter "N" to indicate a networking relationship. Edge 2044 represents the fact that network 1.1, represented by node 2040, is accessed by host 1.1, represented by host node 2008. Similarly, edge 2046 represents the fact that network 1.1, represented by node 2040, is accessed by VM1, represented by node 2016. There is, in general, a many-to-many relationship between networks and hosts and between networks and VMs. In other words, a particular host may access one or more networks and a particular VM may access one or more networks and multiple hosts and VMs may access a particular network. Of course, a particular VM may access only those networks to which the host computer on which the VM executes is connected.

To recapitulate, the graph shown in FIG. 20A represents a computational relationship between the data center as a whole, clusters of physical hosts within the data center, individual host computers, and VMs that execute on the host computers. The graphs shown in FIG. 20B represent a storage relationship between hosts, VMs, and datastores, with each VM maintaining state information in one or more VMDK files that are each stored on a particular datastore. The graphs shown in FIG. 20C represent a networking relationship between networks, hosts, and VMs. These three different types of relationships can be combined to generate a graph representing the data center. FIG. 20D shows a graph that represents the data center and that includes data-center, cluster, host, VM, VMDK, and data-store nodes and edges that represent computational, storage, and networking relationships.

As with the case of the generalized graph databases discussed above, the nodes and edges within the graph shown in FIG. 20D may be associated with one or more attributes. The nodes have names, for example, that uniquely identify components of the data center or the data center itself. The edges are associated with at least one attribute that specifies the relationships represented by the edges, which include computational, storage, and networking relationships. All of the edges are directed but, in general, the direction is, to some degree, arbitrary. For example, in the graph shown in FIG. 20C for the networking relationships, the edges could alternatively point from host computers and VMs to networks.

Figure 21B:
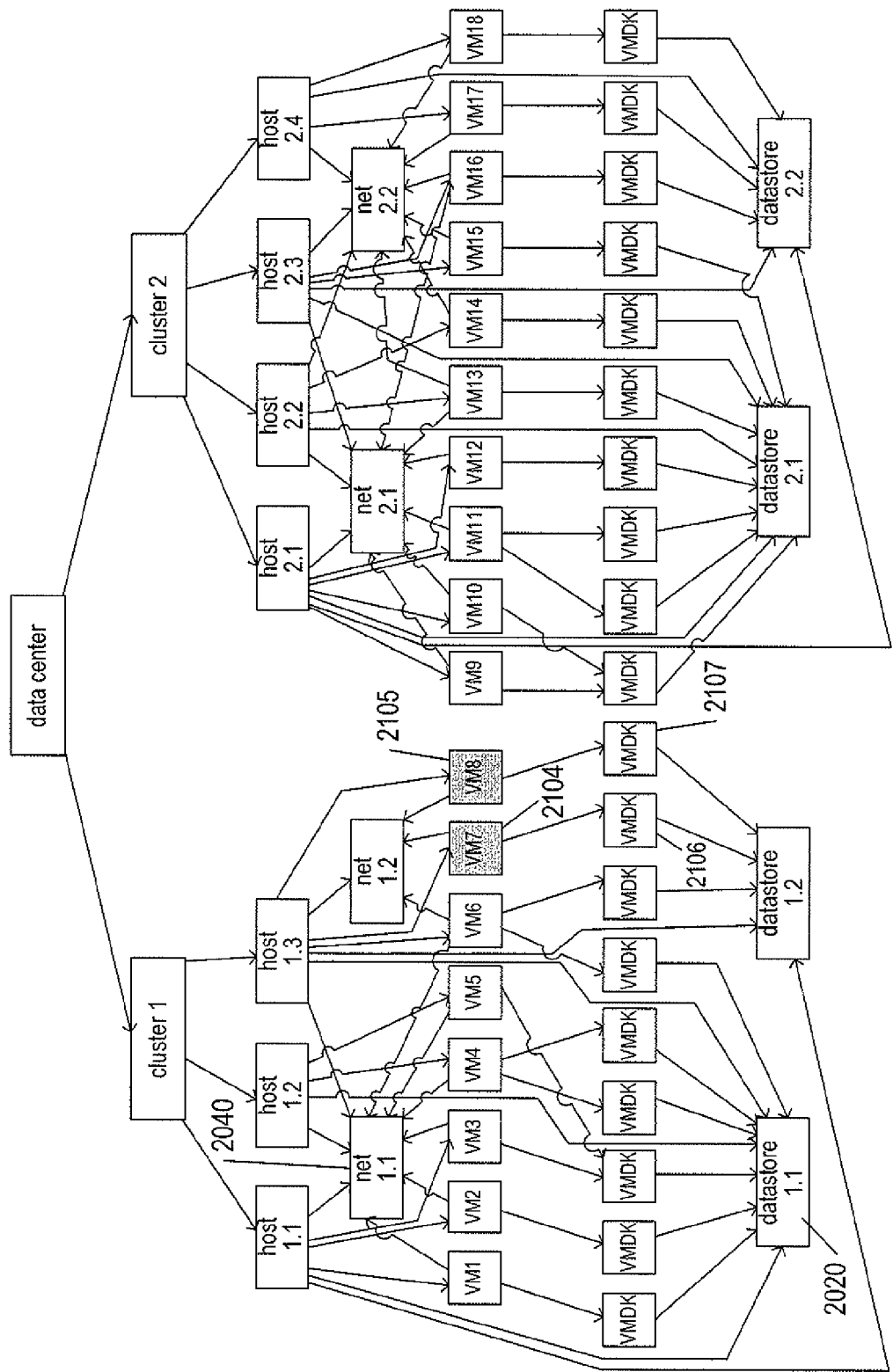

FIGS. 21A-D illustrate the utility of a graph-like representation of the data center, discussed above with reference to FIGS. 20A-D, for system management and administration. FIG. 21A shows three different graph-database queries used to identify particular features with a model data center. The first graph-database query 2102 seeks a list of the nodes representing VMs that store a VMDK file on datastore 1.2 and that are connected only to network 1.2. This query may be motivated by knowledge that datastore 1.2 is showing intermittent signs of an impending failure. Moreover, network 1.2 is showing indications of unreliability. As a result, a system administrator may wish to identify those VMs, execution of which might terminate should datastore 1.2 fail prior to copying or relocating critical information to another datastore. Query 2102 employs the domain knowledge that, in the graph-like representation of the data center, a total of two links connect a VM through a VDMK to a datastore node and that VM nodes are directly connected to network nodes. When different graph-like representations with different topologies and node types are used to represent data centers, the number of edges used in Query 2102 may differ.

FIG. 21B shows, using shading, the two VMs 2104-2105 identified by query 2102 in FIG. 21A. The system administrator may, in response to obtaining this information, choose to connect VM7 and VM8 to network 1.1 2040 and relocate VMDK files represented by nodes 2106-2107 to datastore 1.1, represented by node 2020.

Figure 21C:
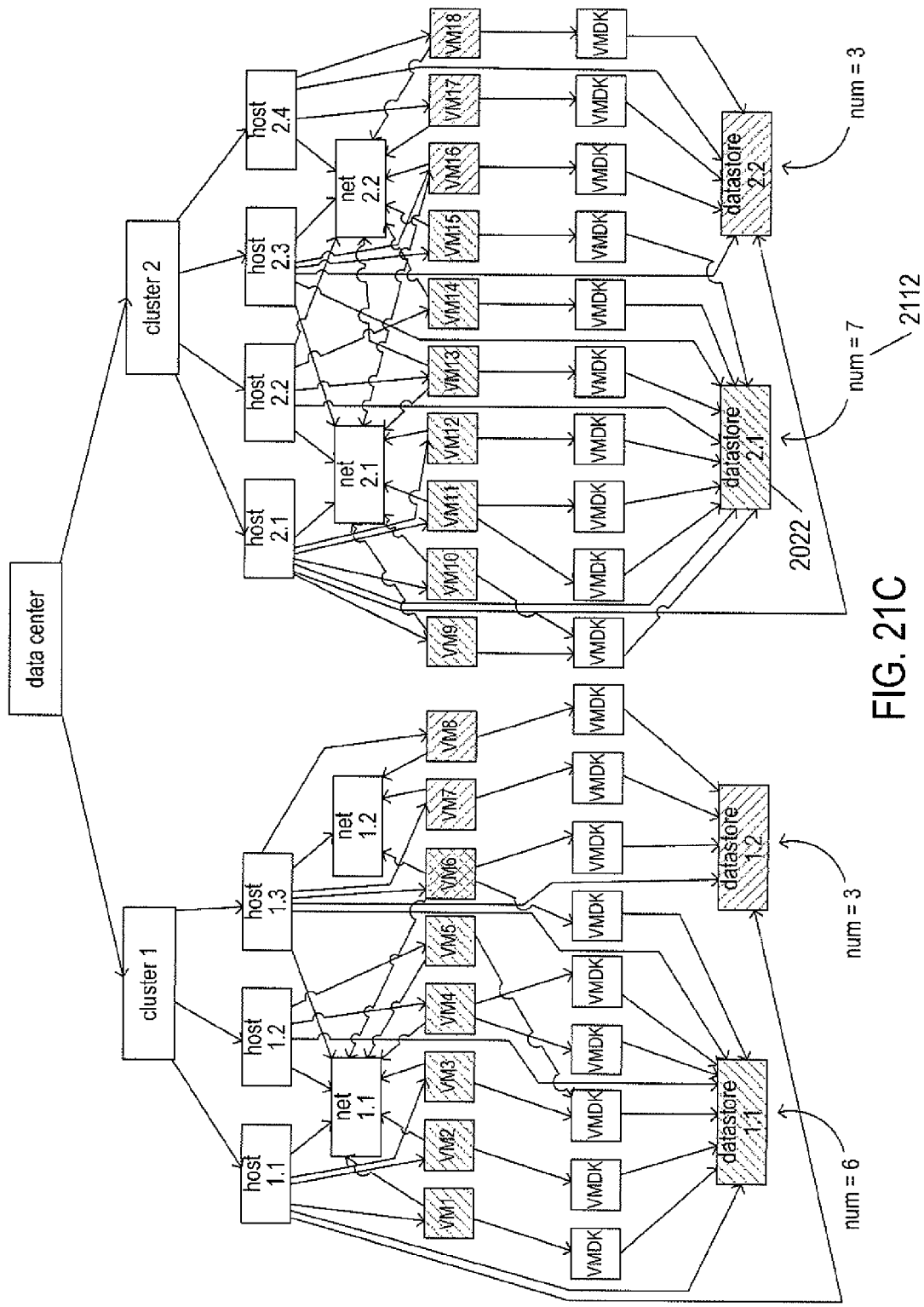
Figure 21D:
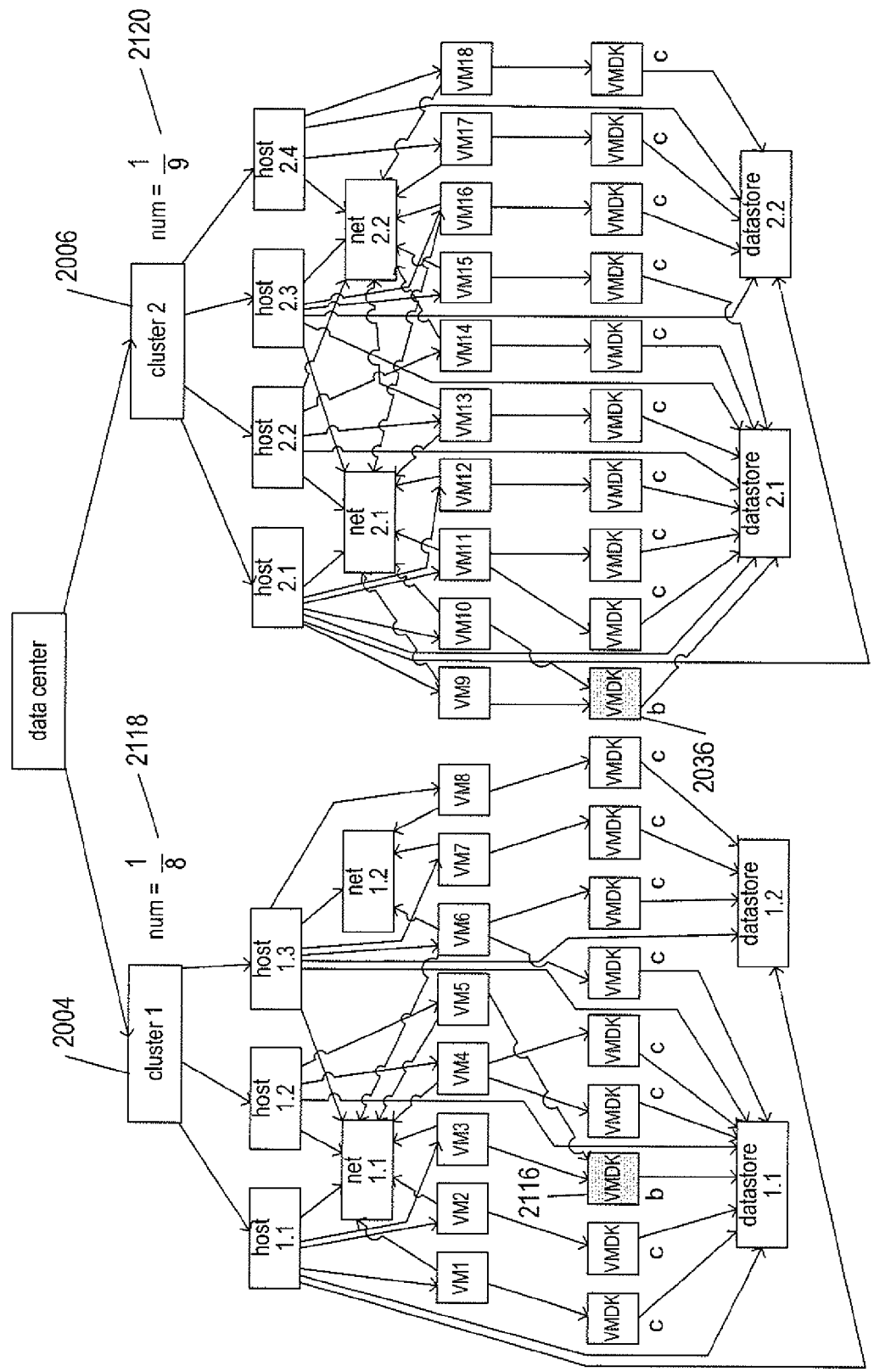

As another example, query 2110 in FIG. 21A seeks a list of datastores in the model data center, each datastore associated with the number of VMs storing VMDK files on the datastore and the list ordered in descending order by the number of VMs storing VMDK files on the datastores. The qualifier "unique" is used to avoid doubly counting VMs linked through multiple VDMKs to a particular datastore. FIG. 21C illustrates results of query 2110 in FIG. 21A, where cross-hatching is used to indicate the VMs storing VMDK files on particular datastores. In addition, the number of VMs storing VMDK files on each datastore is shown at the bottom of the figure, such as the indication 2112 that datastore represented by a node 2022 stores VMDK files for seven different VMs. This information may be useful to a system administrator trying to determine which of the datastores within the model data center are most heavily used. This information may, in turn, allow the system administrator to determine to which physical hosts to connect a new datastore or to develop a plan for redistributing VMDK files in order to better balance VMDK-file storage among the datastores of each cluster.

Query 2114 in FIG. 21A seeks the ratio of VMDK files shared between two or more VMs to the number of VMDK files associated with only a single VM for each cluster in the model data center. As indicated by shading in FIG. 21D, a single VMDK file, represented by node 2116, is shared by two or more VMs in the first cluster, represented by node 2004, and a single VMDK file, represented by node 2036, is shared by two or more VMs in the second cluster represented by node 2006. The ratio of shared VMDK files to unshared VMDK files is therefore $$\frac{1}{8} 2118$$

for the first cluster and is $$\frac{1}{9} 2120$$

for the second cluster. The ratio represents an indication of the ratio of VDMKs shared by linked-clone VMs to VDMKs not shared by linked-clone VMs. This ratio may indicate the degree to which the linked-clone functionality is used within clusters. Those clusters that do not exhibit linked clones or have very low ratios may be candidates for discontinuation of linked-clone-functionality licensing. The example queries illustrated in FIGS. 21A-D provide three examples of the many different types of information useful to system administrators and other individuals involved with the management and maintenance of a data center that can be obtained by querying a graph-database representation of the model data center.

Figure 22A:
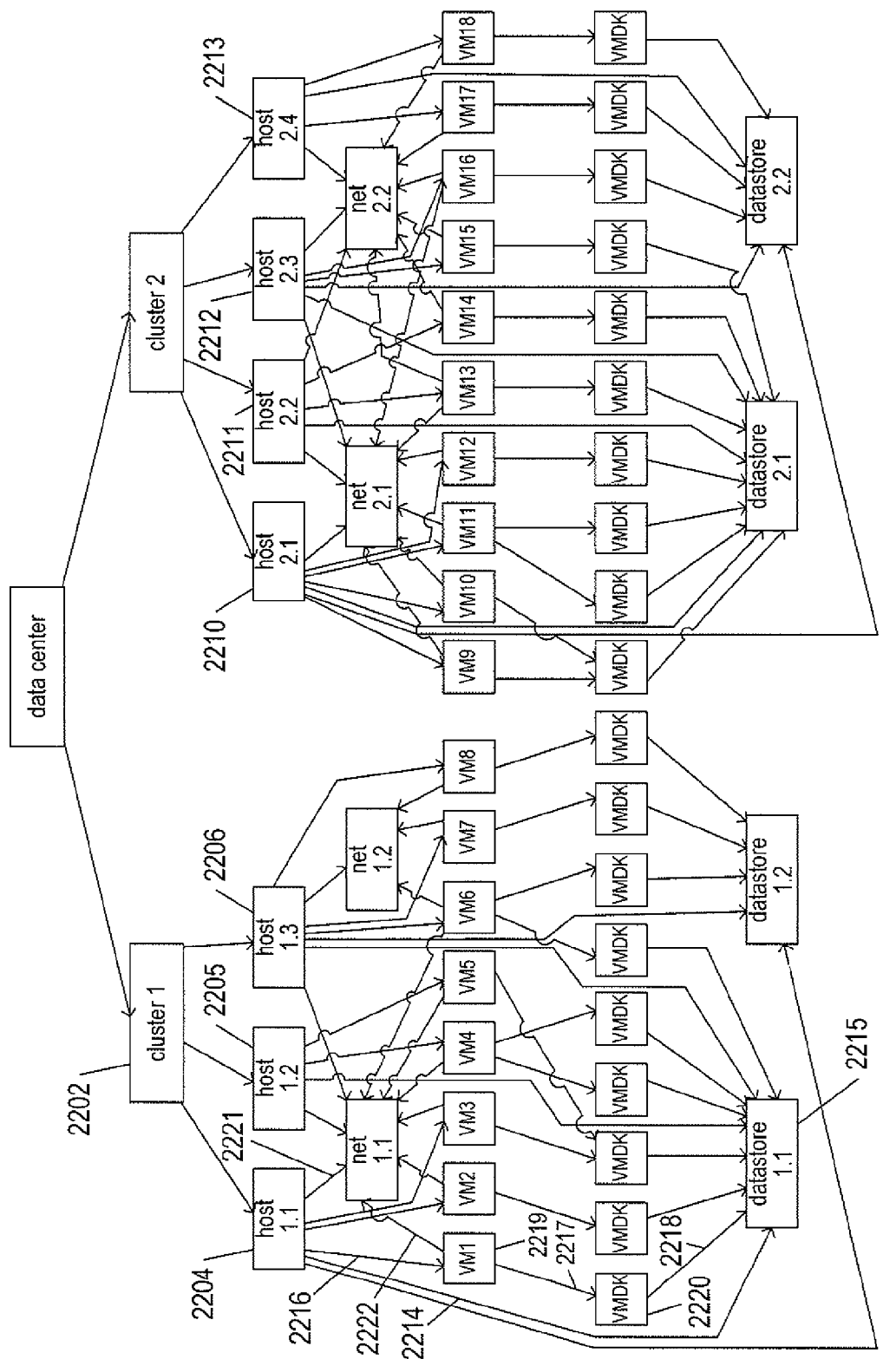
FIGS. 22A-N illustrate another type of query that a system administrator may wish to issue with respect to graphs stored in a graph database representing a data center.
Figure 22B:
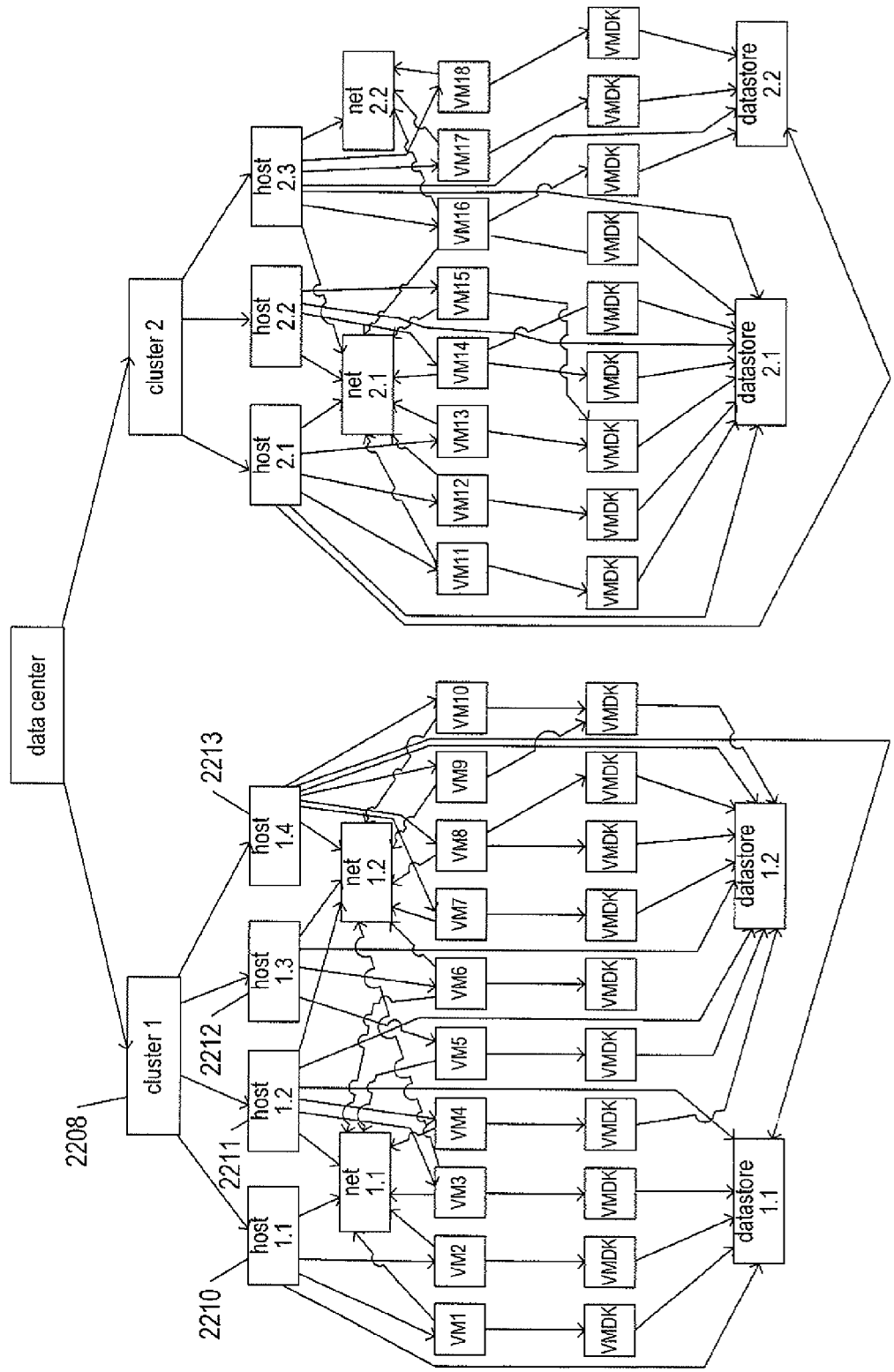
Figure 22C:
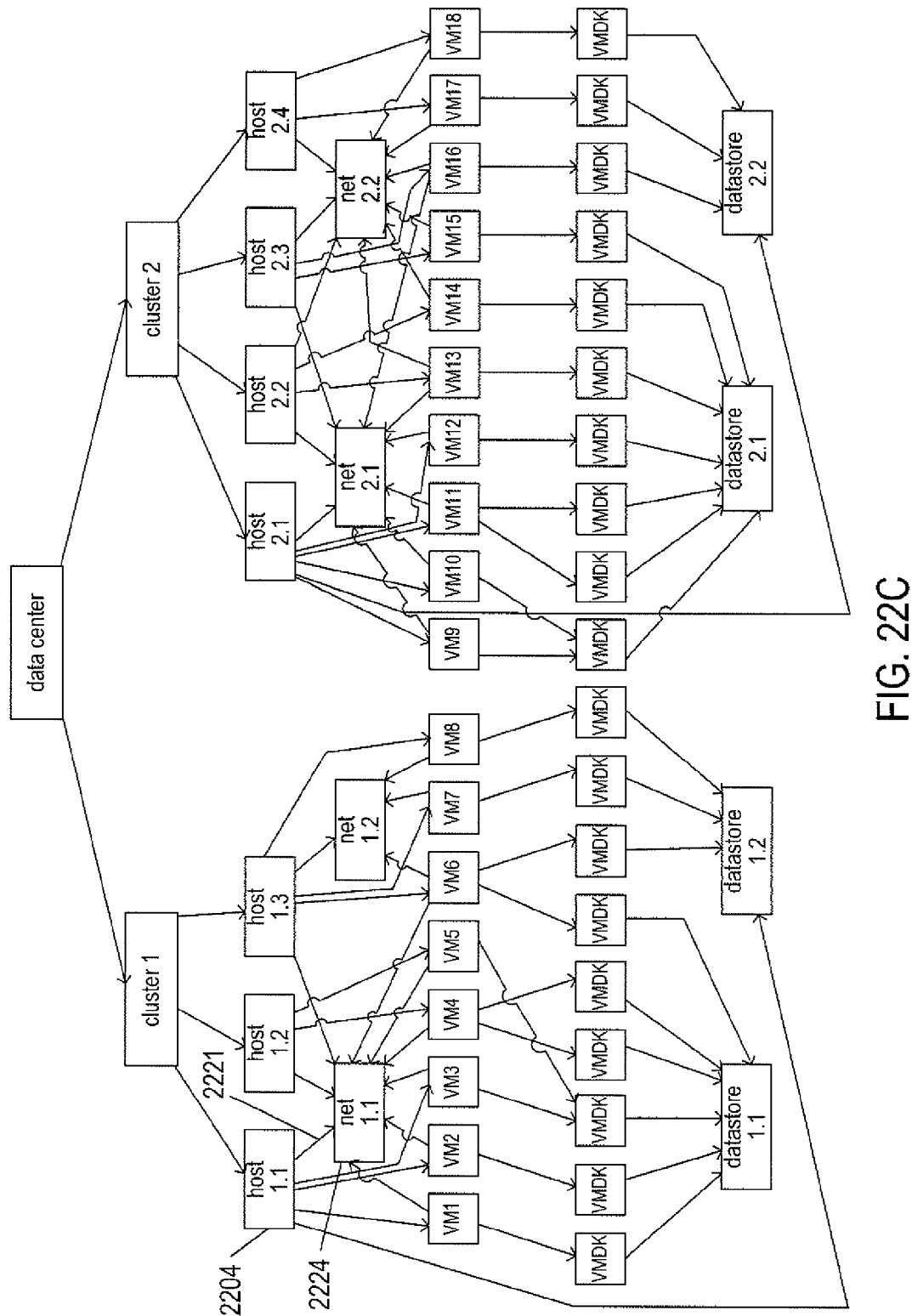
Figure 22D:
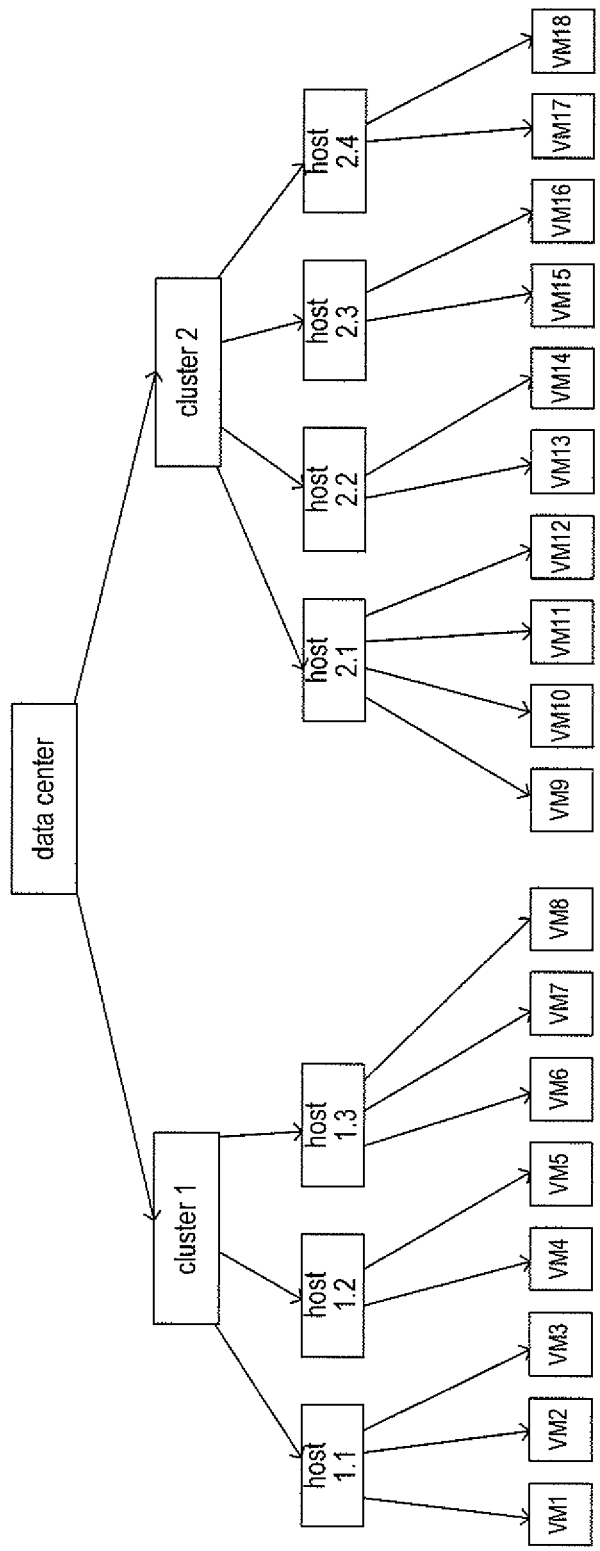
Figure 22E:
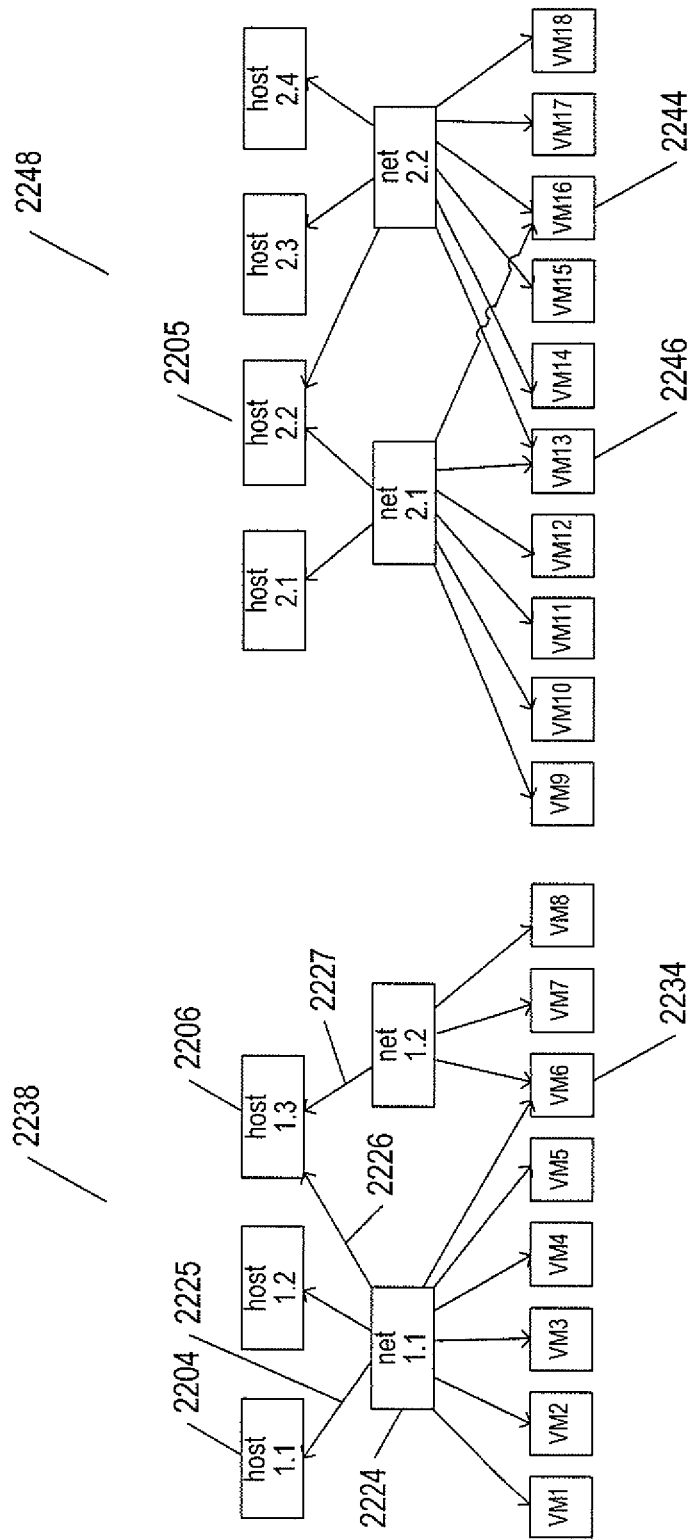
Figure 22F:
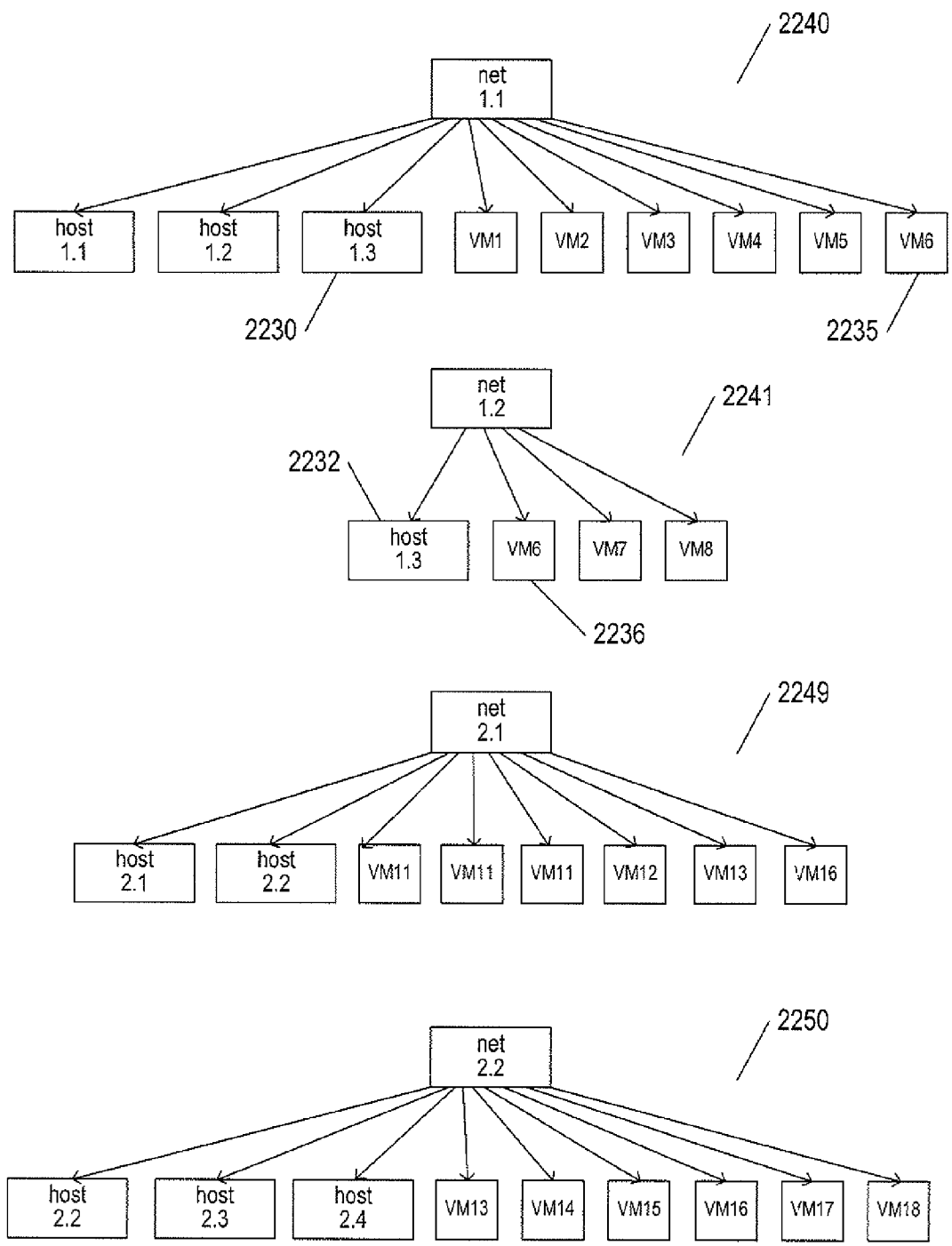
Figure 22G:
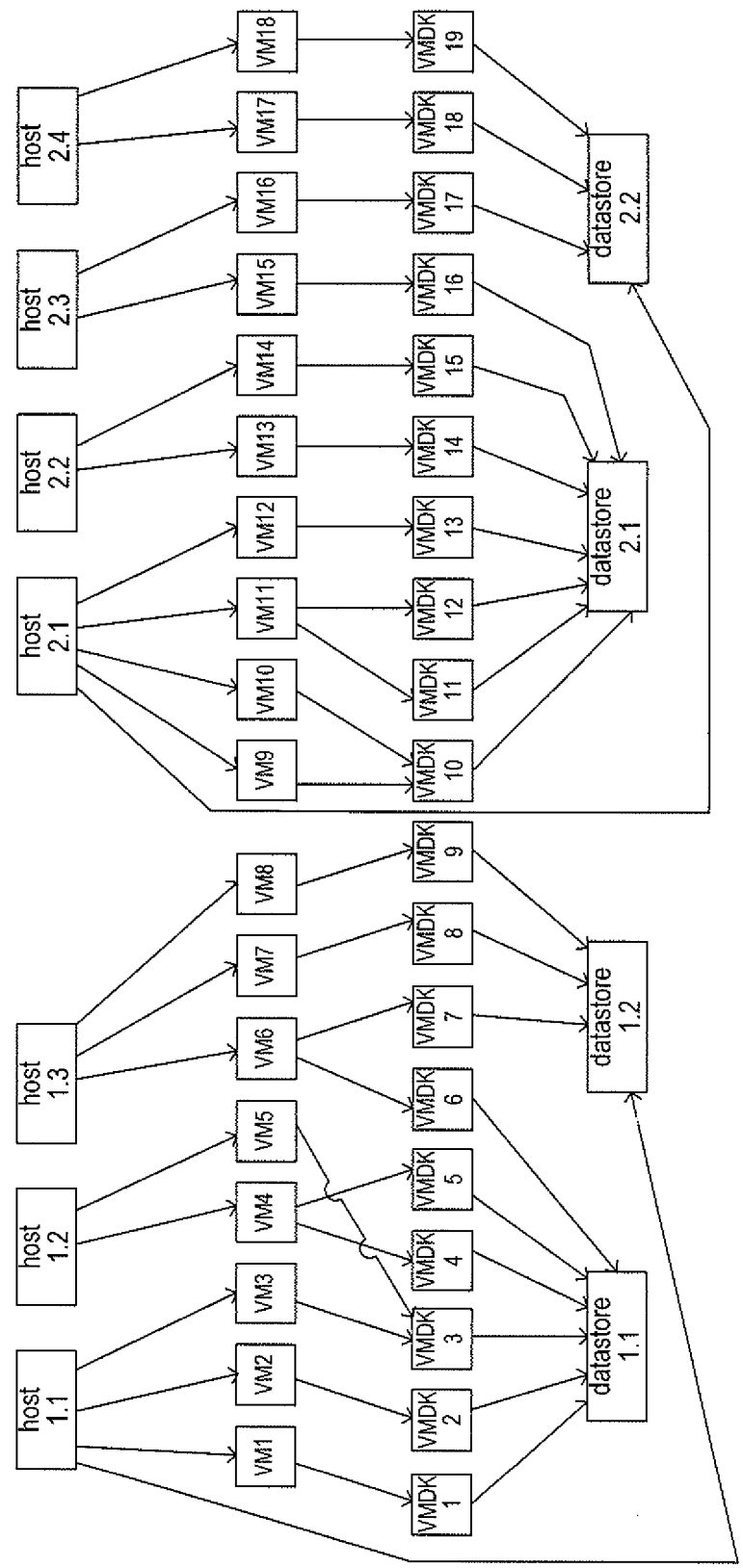
Figure 22H:
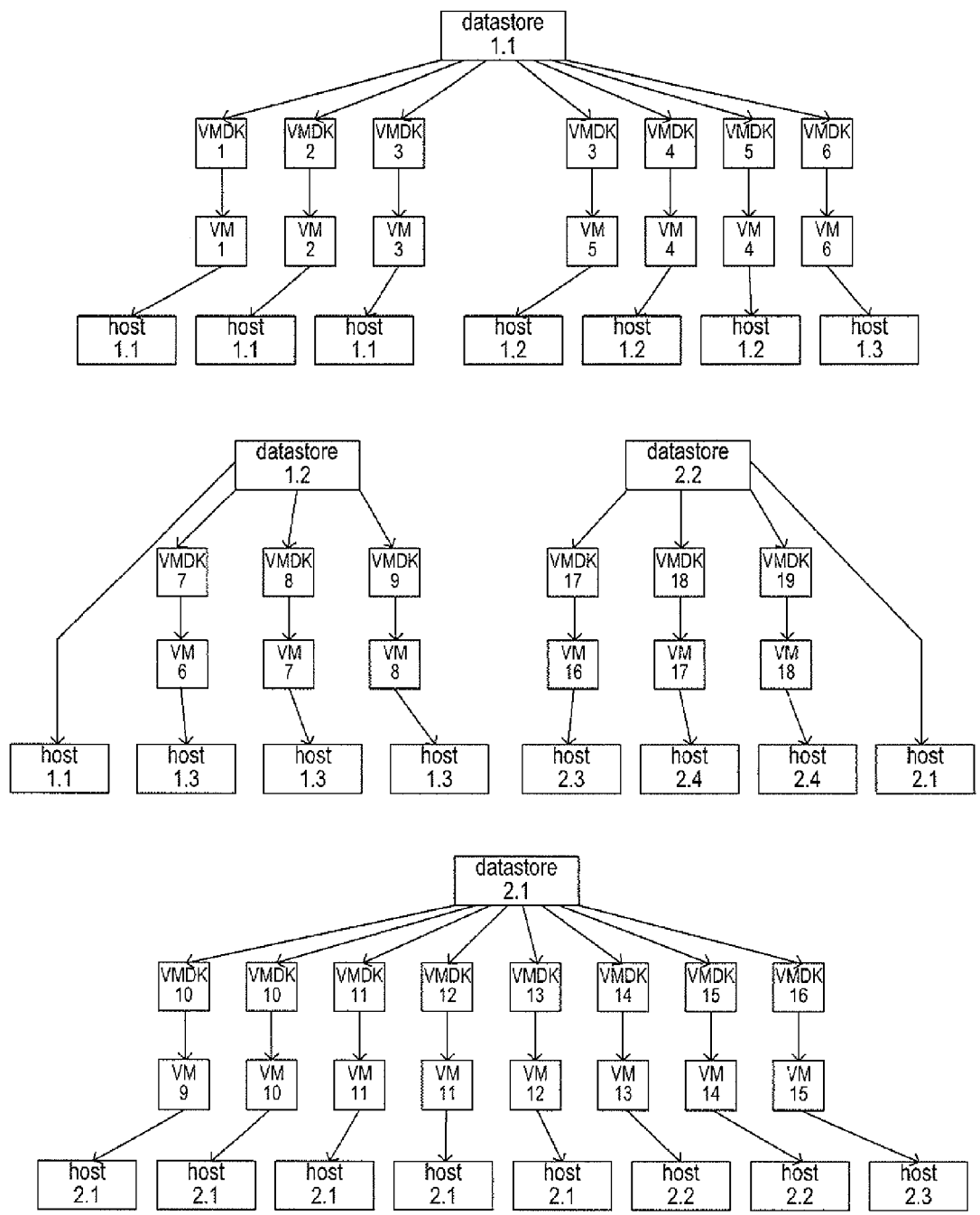
Figure 22I:
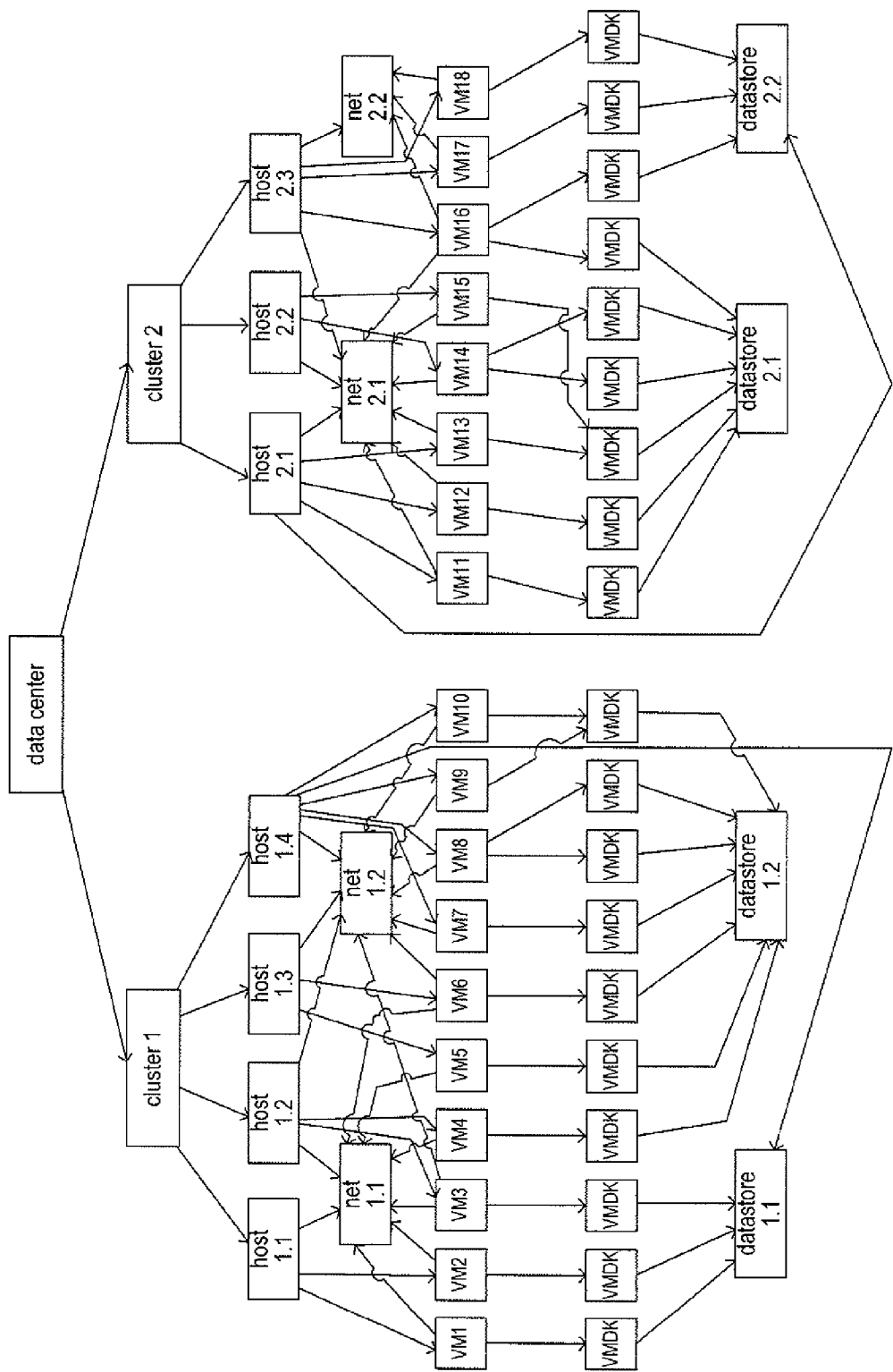
Figure 22J:
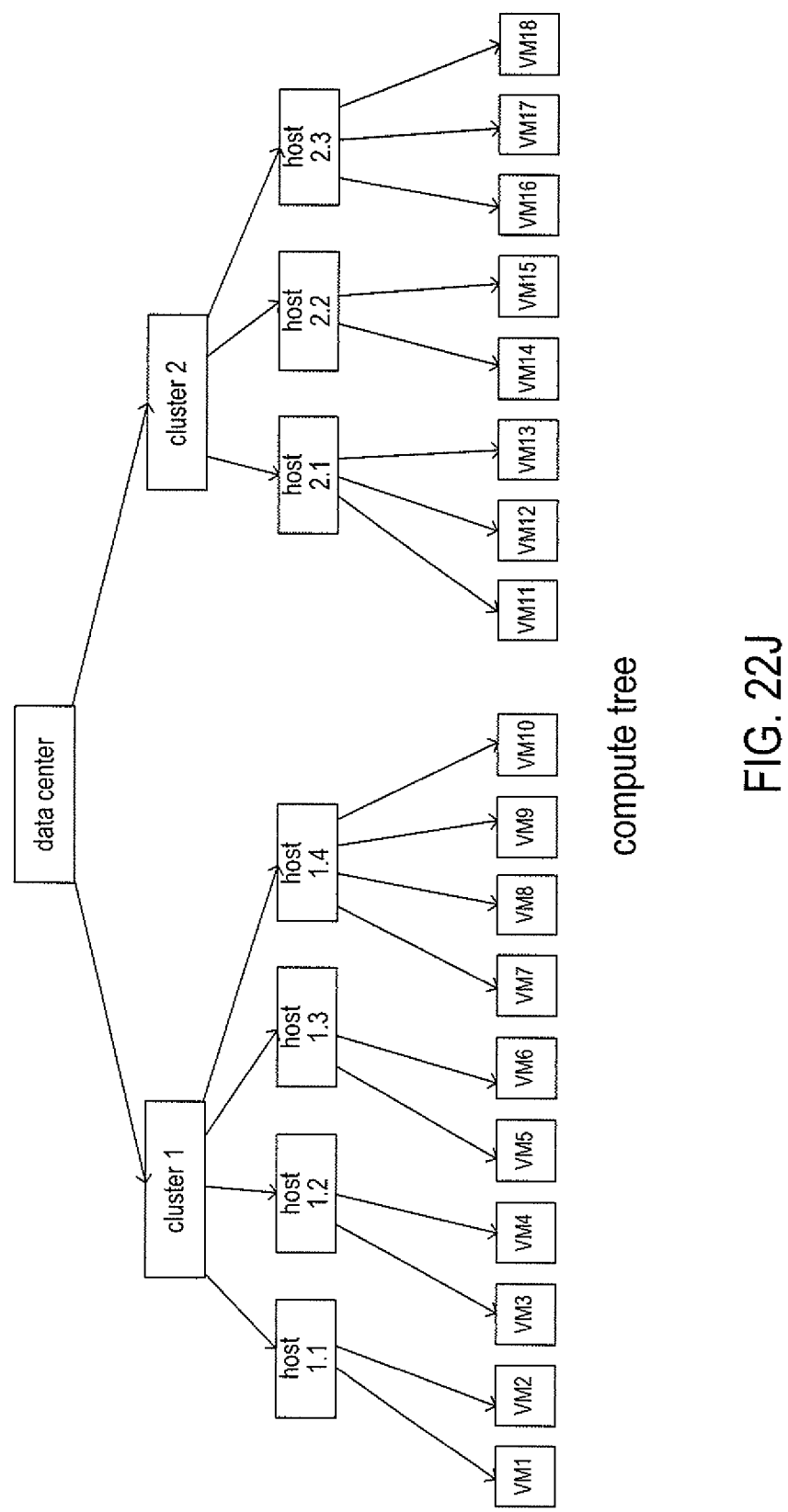
Figure 22K:
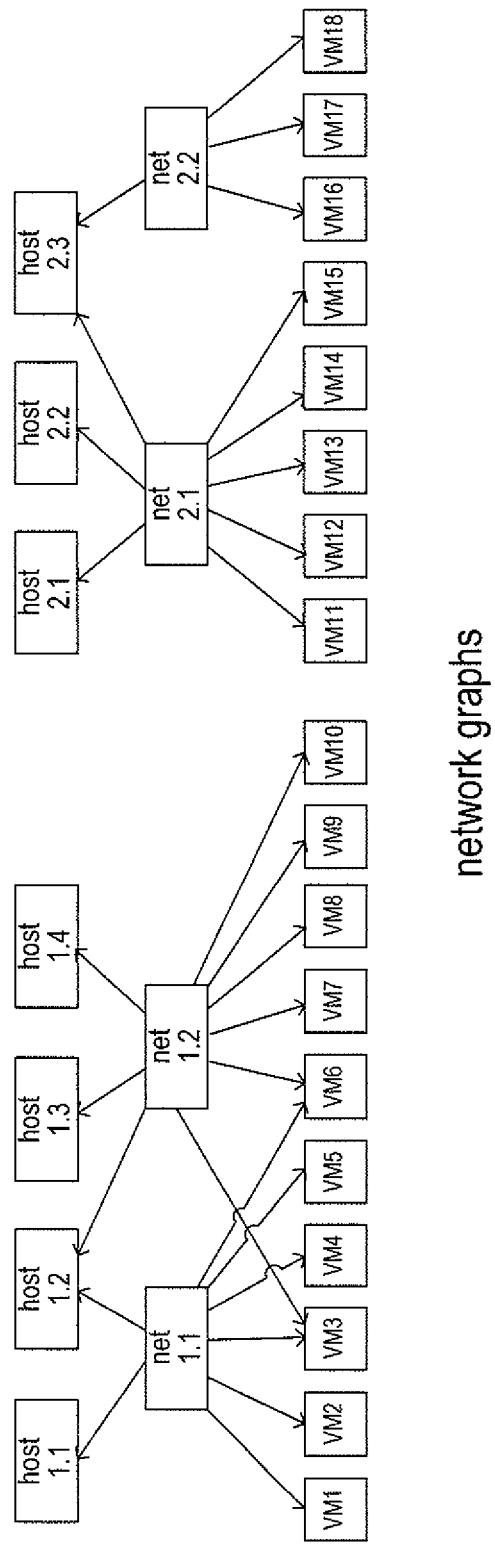
Figure 22L:
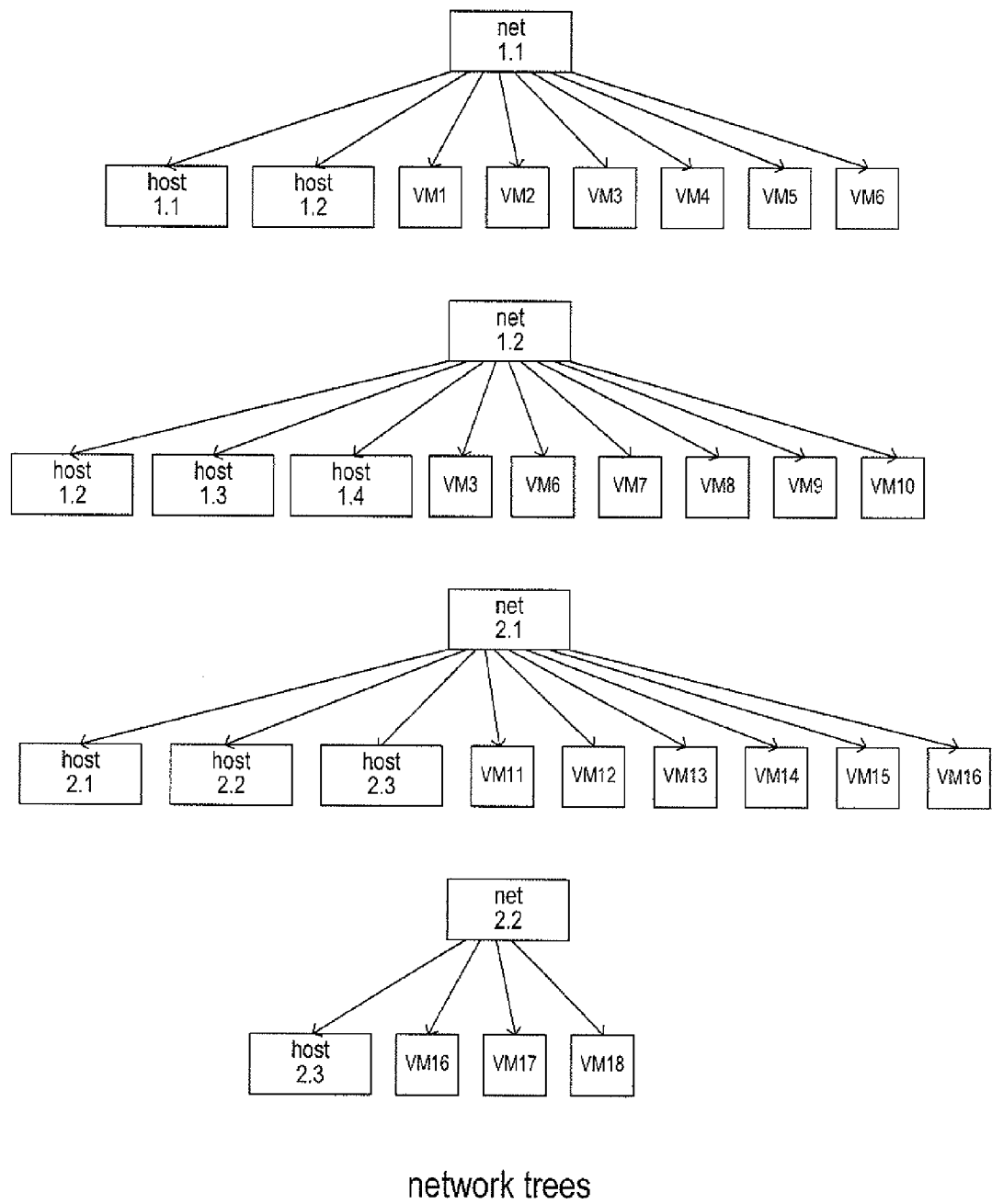
Figure 22M:
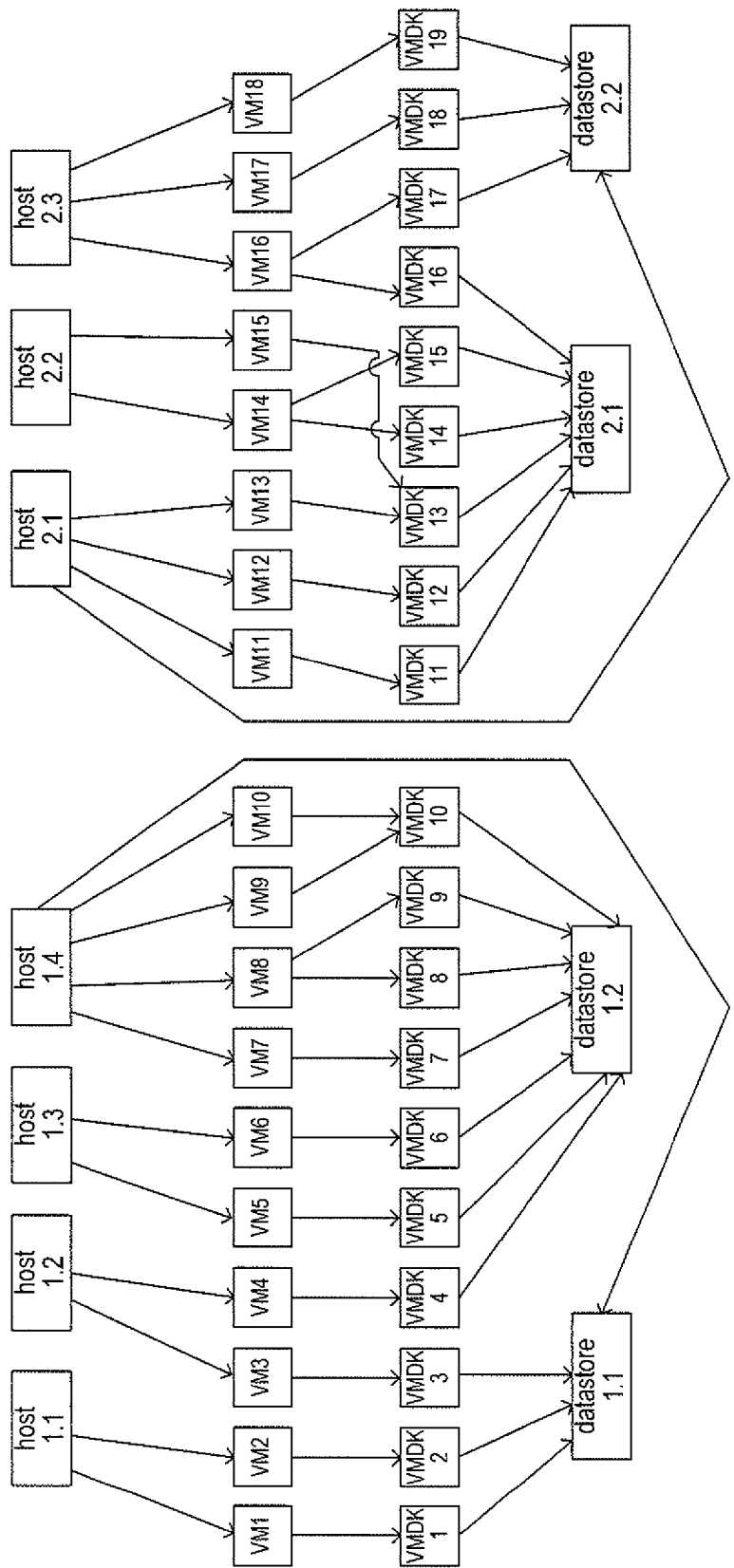
Figure 22N:
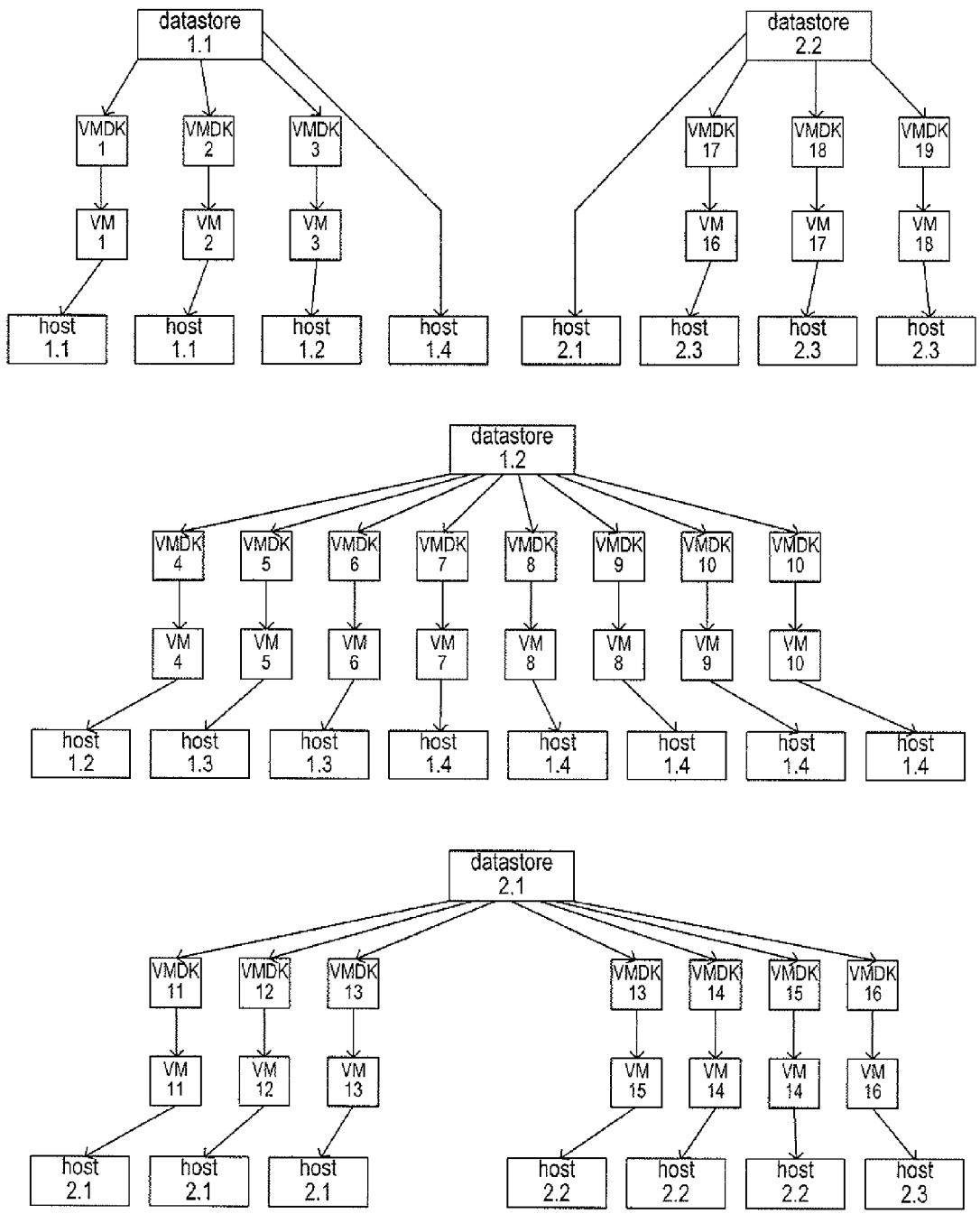

FIGS. 22A-N illustrate another type of query that a system administrator may wish to issue with respect to graphs stored in a graph database representing a data center. FIG. 22A shows a first graph representing a data center and FIG. 22B shows a second graph representing the data center. The first graph, shown in FIG. 22A, may be a representation generated for an original configuration of the data center and the graph shown in FIG. 22B may have been generated for the data center following a reconfiguration or re-initialization of the data center. The system administrator may wish to know whether or not the two graph-like representations of the data center are equivalent. In other words, a system administrator may wish to issue a query to determine whether or not the graph shown in FIG. 22A is equivalent to the graph shown in FIG. 22B. The two graphs are equivalent when the names of nodes may be reassigned, without changing the number of nodes, number of edges, or the connections of edges to nodes, in order to transform one graph into the other up to a threshold level of significance. In other words, strict isomorphism is not required for equivalence. It is apparent, by casual inspection, that the graph shown in FIG. 22A is different from the graph shown in FIG. 22B. For example, the first cluster, represented by node 2202 in the graph shown in FIG. 22A includes three host computers represented by nodes 2204-2206 while the first cluster, represented by node 2208 in the graph shown in FIG. 22B, includes four host computers represented by nodes 2210-2213. Thus, the two graphs appear to represent different data centers on first inspection. However, the system administrator may wish to know whether the graph shown in FIG. 22A is equivalent, or equivalent to, the graph shown in FIG. 22B, so that both graphs represent a common data-center topology or configuration and differ only in the names assigned to the various components represented by nodes.

The general computational task of comparing two graphs to determine whether or not the two graphs are isomorphic is a well-known problem in computer science that is computationally difficult. This problem is known to fall into the NP-Complete class of problems for which polynomial-time solutions have not been found. For example, one brute-force approach would be to try all possible alternative labelings of nodes within one graph in order to produce a relabeled graph equivalent to the other of the two graphs. This would involve evaluation and comparison of an enormous number of alternative labelings, and the increase in complexity of the problem is more rapid than exponential. The current document is directed to methods and systems that are computationally efficient and that determine whether or not two different graphs representing configurations of two different physical data centers or other computing systems or the configurations of a single data center or other computing system at two different points in time are equivalent. Two graphs are equivalent when, in one case, any differences in the graphs would not introduce incompatibilities or anomalies with respect to executing particular VMs and applications or, in other cases, would not impact any operational states, functionalities, or capacities deemed to be of importance. In other words, the term "equivalence" is not synonymous with the term "isomorphic," but a first graph that is equivalent to a second graph is either isomorphic with the second graph or does not differ from the second graph in any way that would violate a predetermined set of domain constraints. One computationally efficient method for determining whether or not two different graphs are equivalent involves generating multiple different sets of subgraphs from each of the two graphs, then transforming these sets of subgraphs into sets of trees, systematically labeling nodes within the sets of trees, and comparing the node labels in order to match trees from one graph to trees from the other graph. These steps are illustrated for the two graphs shown in FIGS. 22A-B in FIGS. 22C-N and FIGS. 23A-F.

FIGS. 22C-H illustrate initial pre-labeling steps carried out on the graph shown in FIG. 22A. First, as shown in FIG. 22C, redundant edges are identified and removed from the graph. For example, consider edge 2214 in FIG. 22A. Edge 2214 represents a storage relationship between host computer 2204 and datastore 2215. However, the fact that host computer 2204 accesses datastore 2215 can be alternatively determined by following a path of edges comprising edges 2216-2218, which represent the fact that VM1, represented by node 2219, executes on host 2204 and maintains state information in a VMDK file, represented by node 2220, that is located on datastore 2215. Removal of these direct host-to-data-store edges, as discussed below, does not result in subsequent addition of redundant nodes when subgraphs are extracted from the graph shown in FIG. 22C and transformed into tress. Edge 2221, which indicates that network 1.1 is accessed by host 1.1, is also redundant in view of the presence of edges 2216 and 2222 in the graph shown in FIG. 22A, indicating that host 1.1 hosts VM "VM1," which accesses network 1.1. However, removal of redundant edge 2221 in the graph shown in FIG. 22A would result in a need to add multiple, redundant nodes in one of the subgraphs extracted from the graph shown in FIG. 22C that represents network connectivity within the data center. Therefore redundant, edge 2221 is not removed because it would entail subsequent addition of redundant nodes and edges. Thus, the first step in processing of the graph shown in FIG. 22A, the result of which is the graph shown in FIG. 22C, involves a selective removal of redundant edges.

In a next step, three different sets of subgraphs are extracted from the graph shown in FIG. 22C. The extracted subgraphs which are cyclic, or non-tree-like, are transformed into acyclic trees.

FIG. 22D shows the single subgraph of a set of subgraphs extracted from the graph shown in FIG. 22C based on computational relationships within the graph shown in FIG. 22C. The single subgraph shown in FIG. 22D is a subgraph that includes only the computational edges, discussed above with reference to FIG. 20A, and the nodes interconnected by the computational edges. Because this subgraph is already acyclic, or tree-like, no further pre-labeling processing is carried out on the subgraph shown in FIG. 22D.

FIG. 22E shows a set of two subgraphs extracted from the graph shown in FIG. 22C by extracting those nodes interconnected by networking-relationship edges. Following extraction of the two subgraphs, the direction of the networking-relationship edges is reversed in preparation for transforming the extracted subgraphs into trees. For example, in FIG. 22C, edge 2221 points from node 2204 to node 2224 while, in FIG. 22E, equivalent edge 2225 points from node 2224 to node 2204. By reversing the direction of the edges, the subgraphs shown in FIG. 22E can be easily transformed into trees in which the nodes representing networks are root nodes.

FIG. 22F illustrates transformation of the two subgraphs in the set of subgraphs shown in FIG. 22E into four trees. This transformation is carried out by replicating nodes with multiple incoming edges so that each node is associated with only a single incoming edge. For example, in FIG. 22E, node 2206 is associated with incoming edges 2226 and 2227. In FIG. 22F, node 2206 has been replicated to produce nodes 2230 and 2232. Similarly, node 2234 in FIG. 22E is replicated to produce nodes 2235 and 2236 in FIG. 22F. By replicating nodes 2206 and 2234, subgraph 2238 in FIG. 22E is divided into trees 2240 and 2241 in FIG. 22F. In similar fashion, replication of nodes 2205, 2244, and 2246 in subgraph 2248 of FIG. 22E allows subgraph 2248 to be transformed into trees 2249 and 2250 shown in FIG. 22F. Note that, had redundant edges, such as edge 2221 in FIG. 22A, been removed, then the generation of trees shown in FIG. 22F would have involved adding a third level of host nodes below the VM nodes in the trees. This would have resulted in many redundant edges and nodes in the trees produced from the set of subgraphs shown in FIG. 22E.

A third set of subgraphs is produced from the graph shown in FIG. 22C by selecting nodes linked together by storage edges as well as hosts linked to VMs by compute edges. The set of subgraphs representing the storage relationships in the graph shown in FIG. 22C obtained by this method are shown in FIG. 22G. Node replication and redirection of edges are used to generate a set of trees, shown in FIG. 22H, from the subgraphs of the set of subgraphs shown in FIG. 22G. Edge redirection results in the data-store nodes being the root nodes for the trees and node replication allows four separate acyclic trees to be obtained from the two subgraphs shown in FIG. 22G.

FIGS. 22I-N illustrate the same pre-labeling steps and transformations carried out on the graph shown in FIG. 22B that are carried out on the graph shown in FIG. 22A in FIGS. 22C-H. FIG. 22I shows the graph of FIG. 22B following selective removal of redundant edges. FIG. 22J shows the set of subgraphs obtained by selecting nodes related by computational edges, FIG. 22K shows the set of subgraphs obtained by extracting nodes interconnected by networking edges, with FIG. 22L illustrating the trees obtained from the set of subgraphs shown in FIG. 22K, and FIG. 22M shows the subgraphs obtained by extracting nodes from the graph shown in FIG. 22I related by storage relationships, with FIG. 22N showing the trees generating from the set of subgraphs shown in FIG. 22M.

In general, the extraction of subgraphs is specified by a connections set that specifies the nodes and edges that are extracted from the original graphs, such as the graphs shown in Figures A and B. The connections set may, for example, indicate a number of one-to-many and many-to-many relations between pairs of nodes, with the specified nodes and edges corresponding to the relations extracted from the original graphs as one or more subgraphs.

Figure 23A:
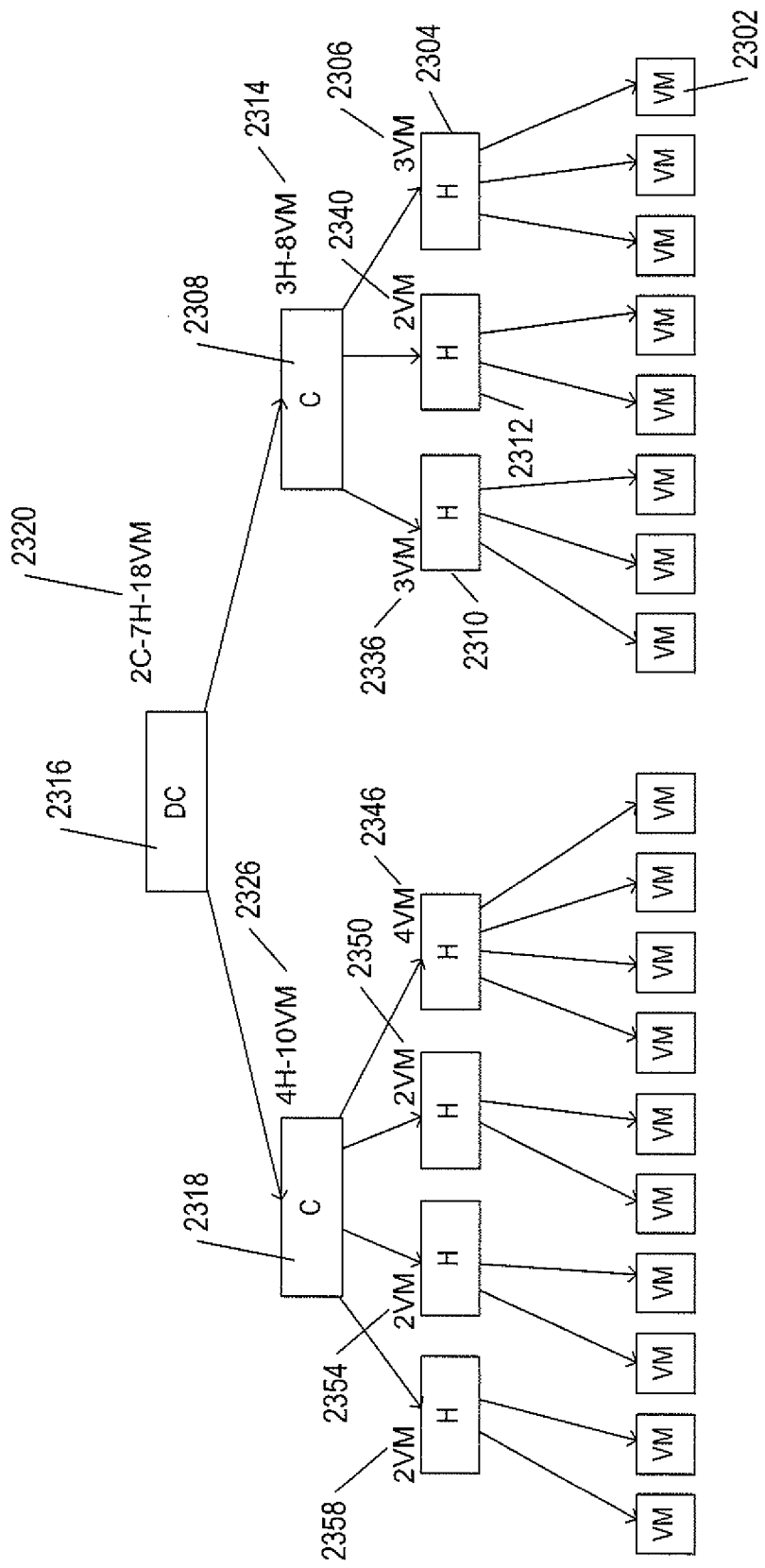
FIGS. 23A-F illustrate labeling and tree-set comparison operations.

Once the three sets of subgraphs have been extracted from each of the two original graphs that are being compared to determine whether or not the two original graphs are equivalent, and once all of the subgraphs in the sets of subgraphs have been transformed into trees, the trees are labeled and the sets of labeled trees are then compared to determine whether or not the original two graphs, shown in FIGS. 22A-B in the current example, are equivalent. FIGS. 23A-F illustrate labeling and tree-set comparison operations. FIG. 23A shows labeling of the single tree representing the computational relationships, shown in FIG. 22D, extracted from the original graph shown in FIG. 22A. The lowest-level VM nodes, such as VM node 2302, are unlabeled in FIG. 23A. Each of the next-highest-level nodes corresponding to host computers, such as node 2304, are associated with labels that describe the children of the next-lowest-level nodes. Because host-computer node 2304 has three VM-node children, including VM node 2302, the label associated with host-computer node 2304 is "3VM" 2306. Each cluster node, such as cluster node 2308, is associated with a label that describes the cluster node's progeny. Cluster node 2308 has three host-computer-node children 2310, 2312, and 2304. The three host-computer-node children of cluster node 2308 have a total of eight VM-node children. Thus, cluster node 2308 is associated with the label "3H-8VM" 2314 to indicate that cluster node 2308 has three host-computer-node children and eight VM-node grandchildren. Finally, data-center node 2316 has two cluster-node children 2308 and 2318, each of which has host-computer children and VM-grandchildren nodes. The data-center node 2316 is therefore associated with the label "2C-7H-18VM" 2320 to indicate that data-center node 2316 has two cluster-node children, seven host-computer-grandchildren nodes, and 18 VM-great-grandchildren nodes. Various different labeling conventions can be used, provided that they provide an ordered description of the types and numbers of the descendants of each node in a consistent fashion that allows nodes of two trees to be compared in the comparison operation discussed below.

Figure 23B:
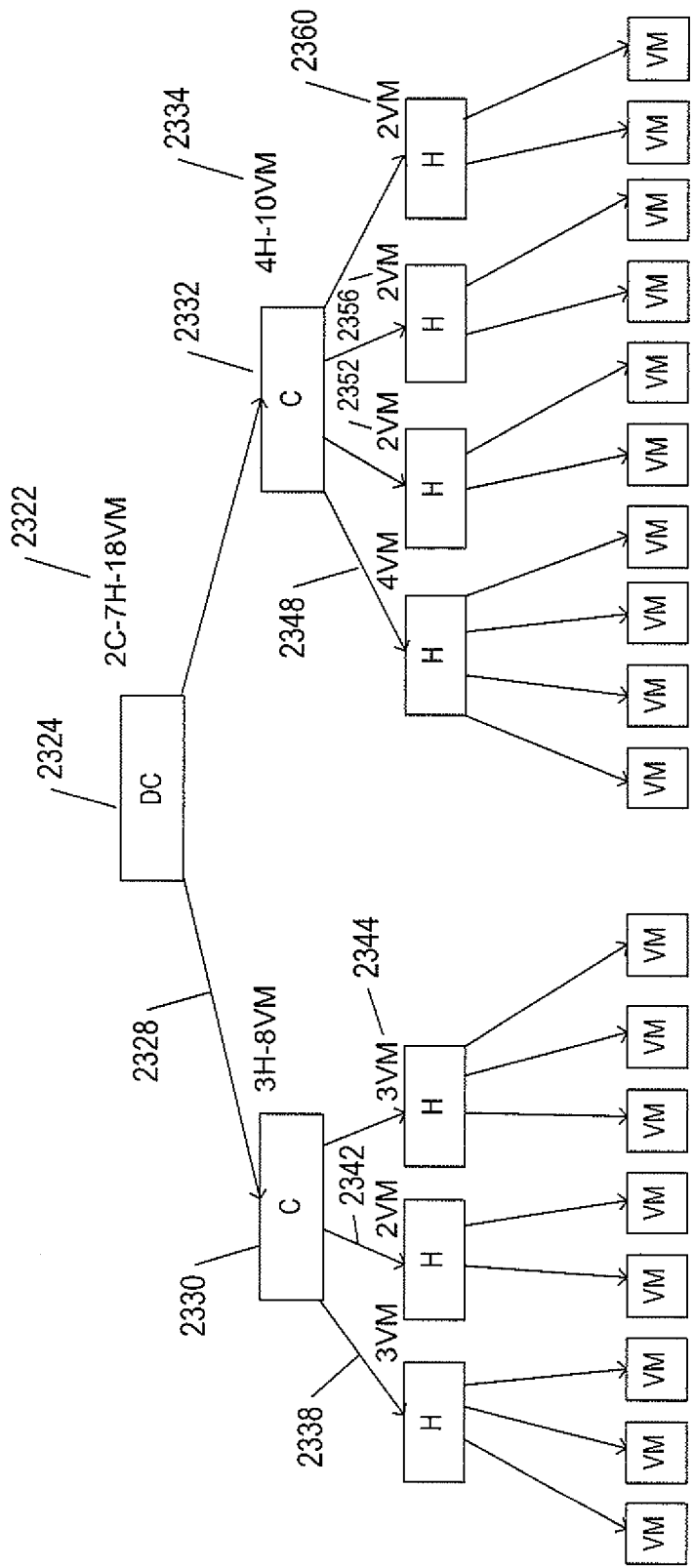

FIG. 23B shows the labels associated with nodes of the computational-relationship tree, shown in FIG. 22J, generated from the original graph shown in FIG. 22B. While the labeled tree shown in FIG. 23A appears to be different from the labeled tree shown in FIG. 23B, it turns out that a mapping can be developed to show that the two trees are topologically equivalent, based on the labels associated with the nodes and on the tree structure. In a first approach to tree comparison, the comparison of two trees begins with the data-center nodes of each tree. The label 2320 associated with the data-center node 2316 in FIG. 23A is identical to the label 2322 associated with the data-center node 2324 of FIG. 23B. When the top level of the two trees is equivalent, comparison resumes with the next-lowest level of the tree containing the cluster nodes. Although the label 2326 associated with cluster node 2318 in FIG. 23A is different from the label 2328 associated with cluster node 2330 in FIG. 23B, there is a cluster node 2332 in FIG. 23B with a label 2334 identical to label 2326 of cluster node 2318 in FIG. 23A. Assuming that these two nodes are equivalent, then the labels 2328 and 2314 associated with the other cluster nodes 2330 and 2308, respectively, in FIGS. 23B and A are then compared. Labels 2328 and 2314 are identical. Therefore, the two trees are deemed equivalent through the second level of nodes. Next, the third level of nodes is considered. Provided a mapping can be found between the labels associated with the third level of nodes in the tree shown in FIG. 23A and the labels associated with the third level of nodes in the tree shown in FIG. 23B, the trees are deemed equivalent through the third level of nodes. A possible mapping maps label 2336 in FIG. 23A to label 2338 in FIG. 23B, label 2340 in FIG. 23A to label 2342 in FIG. 23B, label 2306 in FIG. 23A to label 2344 in FIG. 23B, label 2346 in FIG. 23A to label 2348 in FIG. 23B, label 2350 in FIG. 23A to label 2352 in FIG. 23B, label 2354 in FIG. 23A to label 2356 in FIG. 23B, and label 2358 in FIG. 23A to label 2360 in FIG. 23B. A comparison at the lowest level of nodes is unnecessary. Thus, a comparison of the two trees shown in FIGS. 23A-B, based on the labels associated with nodes, reveals that the two trees are equivalent. In a second approach to tree comparison, a bottom-up tree comparison, starting with the leaf nodes, is used rather than the top-down tree comparison of the first approach. The two approaches are equivalent, but differ in what types of differences are first identified when the trees that are being compared differ from one another. For example, in the first approach, problems with clusters would be discovered prior to discovery of problems with hosts. By contrast, in the second approach, problems with hosts would be discovered prior to the discovery of problems with clusters.

Figure 23C:
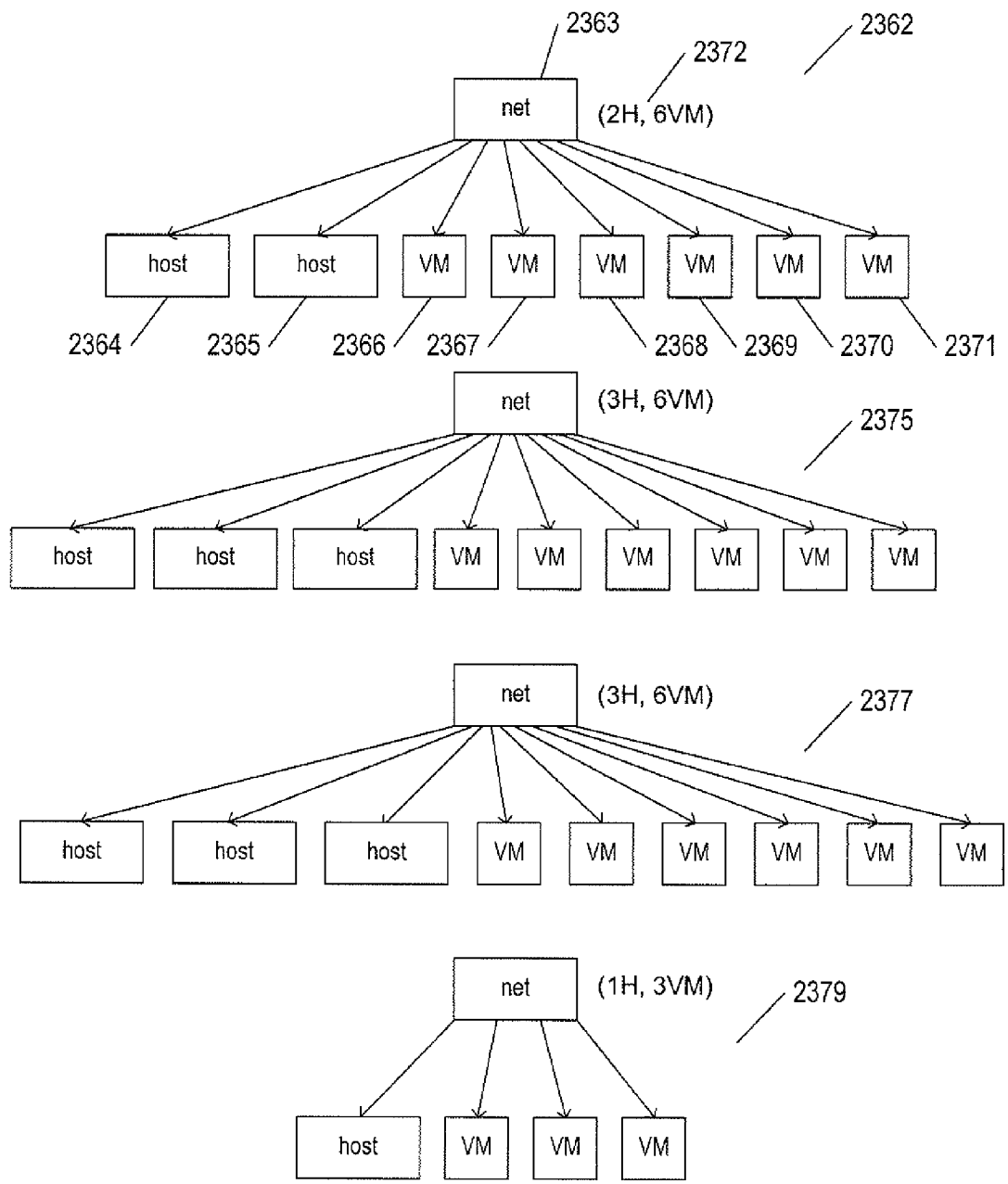
Figure 23D:
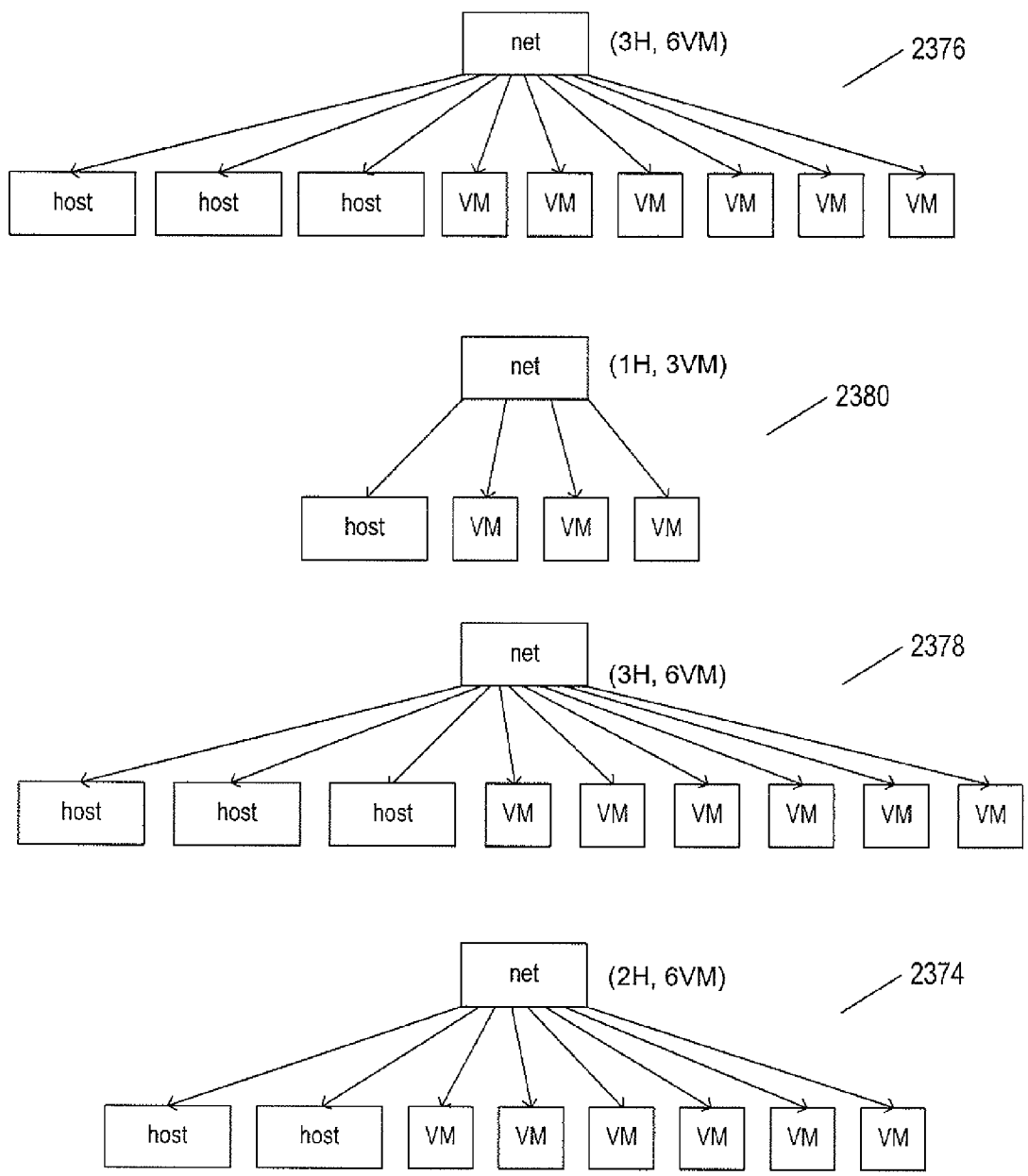

FIGS. 23C-D show the labeled tree subsets generated from original graphs shown in FIGS. 23A-B, respectively, based on the networking relationship. Because the children of the root nodes in each tree include two different types of nodes, the label associated with the root nodes is a parenthetical expression that includes an indication of the numbers of each different type of node. For example, in tree 2362 of FIG. 23C, the root node 2363 has two host-computer-children nodes 2364-2365 and six VM-children nodes 2366-2371. Therefore, the label 2372 associated with the root node 2363 of tree 2362 is "(2H, 6VM)," indicating that root node 2363 has two host-computer children and six VM-children nodes. Comparison of the two sets of trees shown in FIGS. 23C-D seeks to match each tree in the set of trees shown in FIG. 23C with an equivalent tree in the set of trees shown in FIG. 23D. Tree matching proceeds in the same fashion as the matching of the tree shown in FIGS. 23A-B, discussed above. However, in the case of the trees shown in FIGS. 23C-D, matching of trees involves comparing only the labels associated with the two root nodes of the trees, since the trees have only two levels of nodes. Thus, a mapping is desired between the trees of the set of trees shown in FIG. 23C and the trees of the set of trees shown in FIG. 23D. Tree 2362 in FIG. 23C matches tree 2374 in FIG. 23D. Tree 2375 in FIG. 23C matches tree 2376 in FIG. 23D. Tree 2377 in FIG. 23C matches tree 2378 in FIG. 23D. Finally, tree 2379 in FIG. 23C matches tree 2380 in FIG. 23D. Thus, the two sets of trees are equivalent.

Figure 23E:
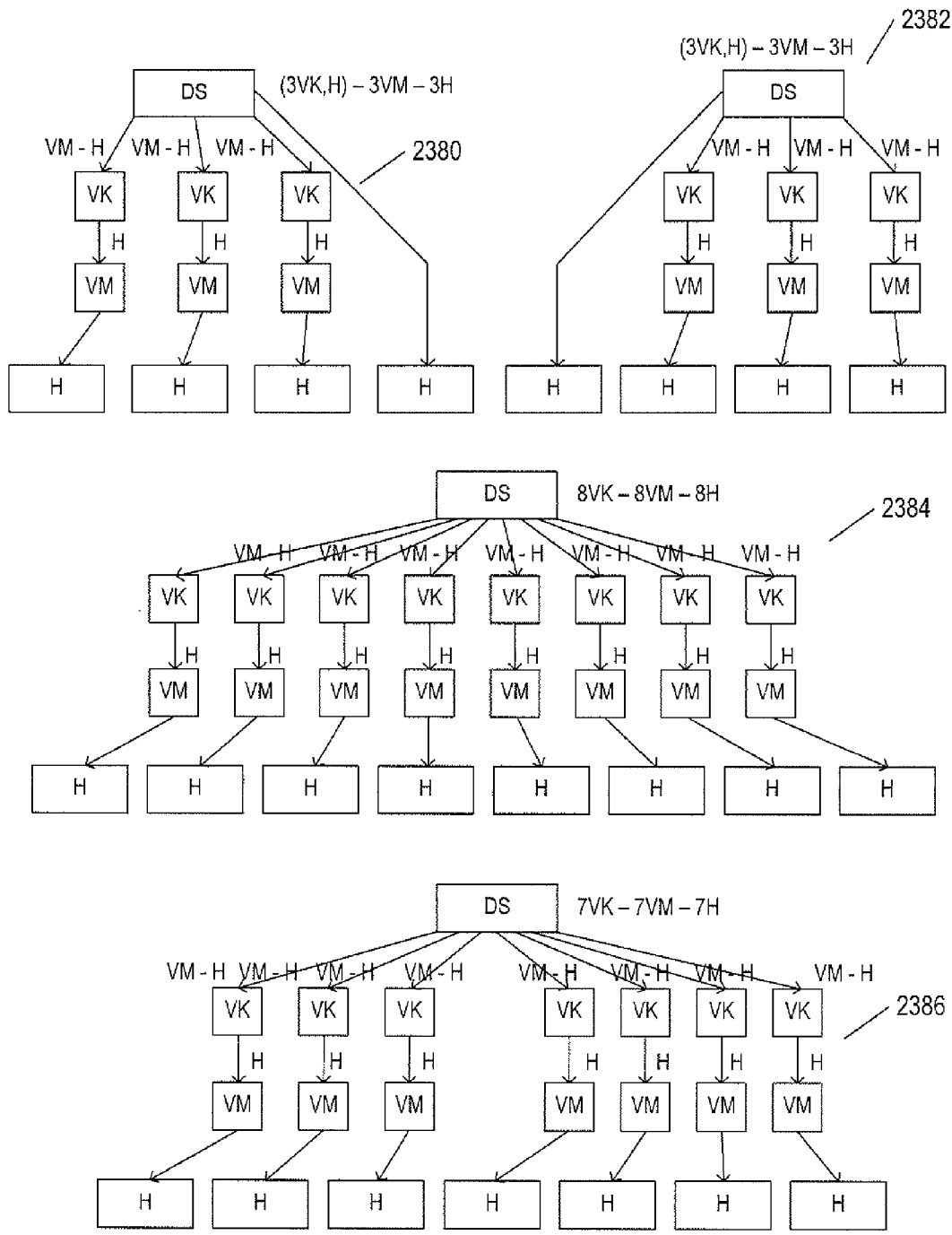
Figure 23F:
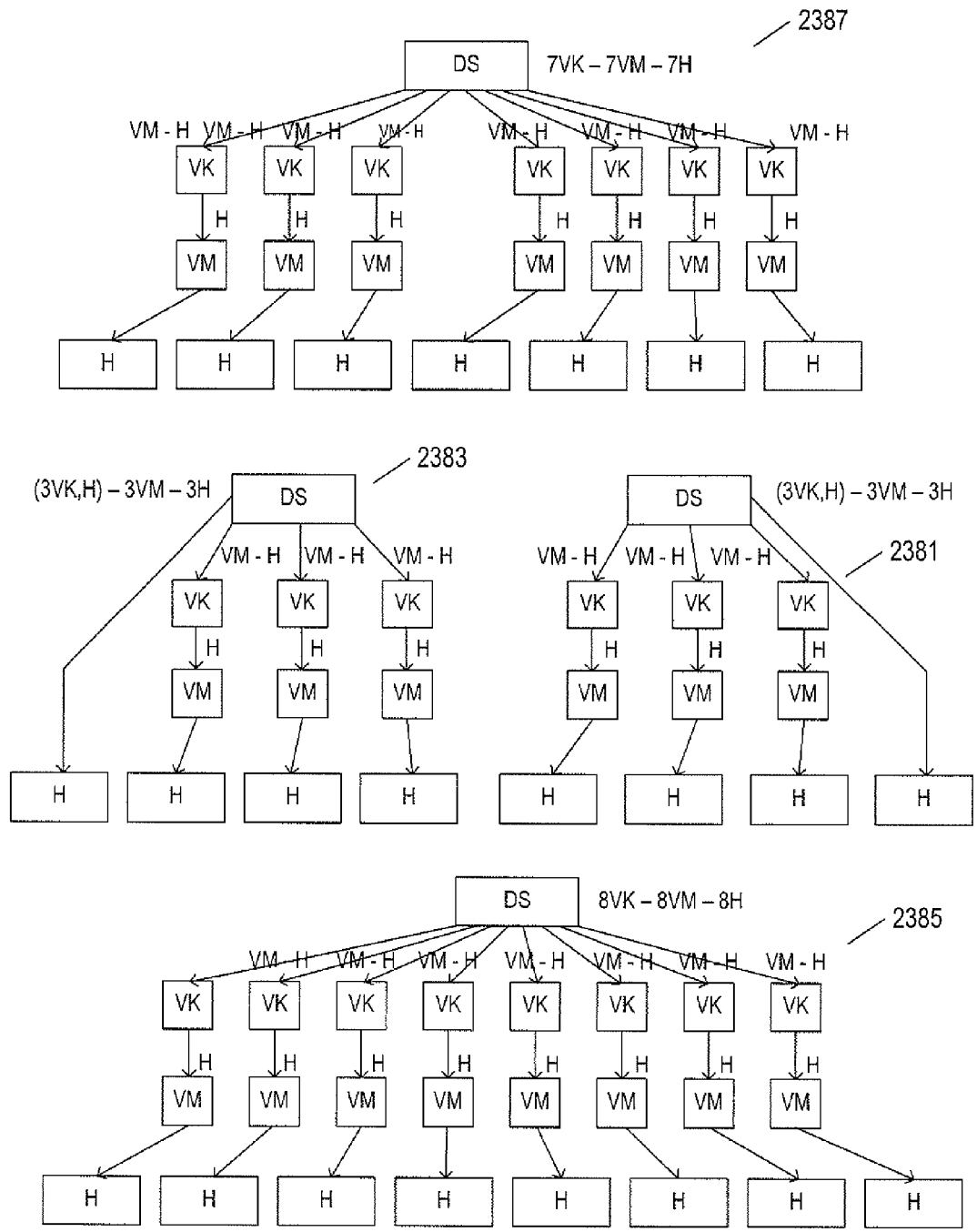

FIGS. 23E-F show the sets of labeled trees generated from the original graphs shown in FIGS. 23A-B, respectively, based on the storage relationship. As with the sets of trees shown in FIGS. 23C-D, a comparison of the two sets of trees shown in FIGS. 23E-F seeks to match each tree in the first set of trees shown in FIG. 23E with a corresponding, equivalent tree in the set of trees shown in FIG. 23F. The matching is carried out level-by-level, as discussed above with reference to FIGS. 23A-B. When this matching is carried out, it is easily determined that tree 2380 in FIG. 23E matches tree 2381 in FIG. 23F, tree 2382 in FIG. 23E matches tree 2383 in FIG. 23F, tree 2384 in FIG. 23E matches tree 2385 in FIG. 23F, and tree 2386 in FIG. 23E matches tree 2387 in FIG. 23F. In all cases, there is an exact mapping between the labels in each level of the pair of matching trees.

It should be noted that the tree-matching operation seeks only a mapping between the labels at each corresponding level of nodes above the leaf-node level within the two trees being compared. It is not necessary to manipulate the trees topologically or to consider matching of subtrees within the trees. Therefore, the tree-matching operation is computationally efficient, as is labeling of the nodes within each tree. In the case that each set of trees generated from the original graph shown in FIG. 23A is equivalent to a corresponding set of trees generated from the original graph shown in FIG. 23B, then the two graphs shown in FIG. 23A-B are equivalent. Thus, extraction of sets of subgraphs from the original graph based on edge-encoded relationships, transforming of the sets of subgraphs into sets of trees, labeling of the nodes within the trees of the subsets of trees, and label-based matching of the sets of trees is sufficient to determine whether or not the two graphs are equivalent. This collection of operations is far more efficient than brute-force approaches to determining whether or not the two original graphs are isomorphic. By including support for computationally efficiently determining whether or not two graphs representing system configurations are equivalent within a graph database included within system-administration facilities of a computer system, system administrators are provided with a powerful tool for determining whether or not two graph-like representations of a system are equivalent. As discussed above, this may allow a system administrator to evaluate whether or not a reconfiguration operation has successfully restored the configuration of a complex computer system, such as a distributed cloud-computing system.

It should also be noted that, depending on the connections sets used to specify subgraphs extracted from two original graphs that are being compared for equivalence, the comparison may determine whether or not subgraphs or portions of the original graphs are equivalent. In other words, whether or not the determination spans the entire original graphs or only portions of the original graphs depends on the coverage of the original graphs provided by the sets of subgraphs extracted from the original graphs according to the connections sets that define subgraph extraction.

Figure 24A:
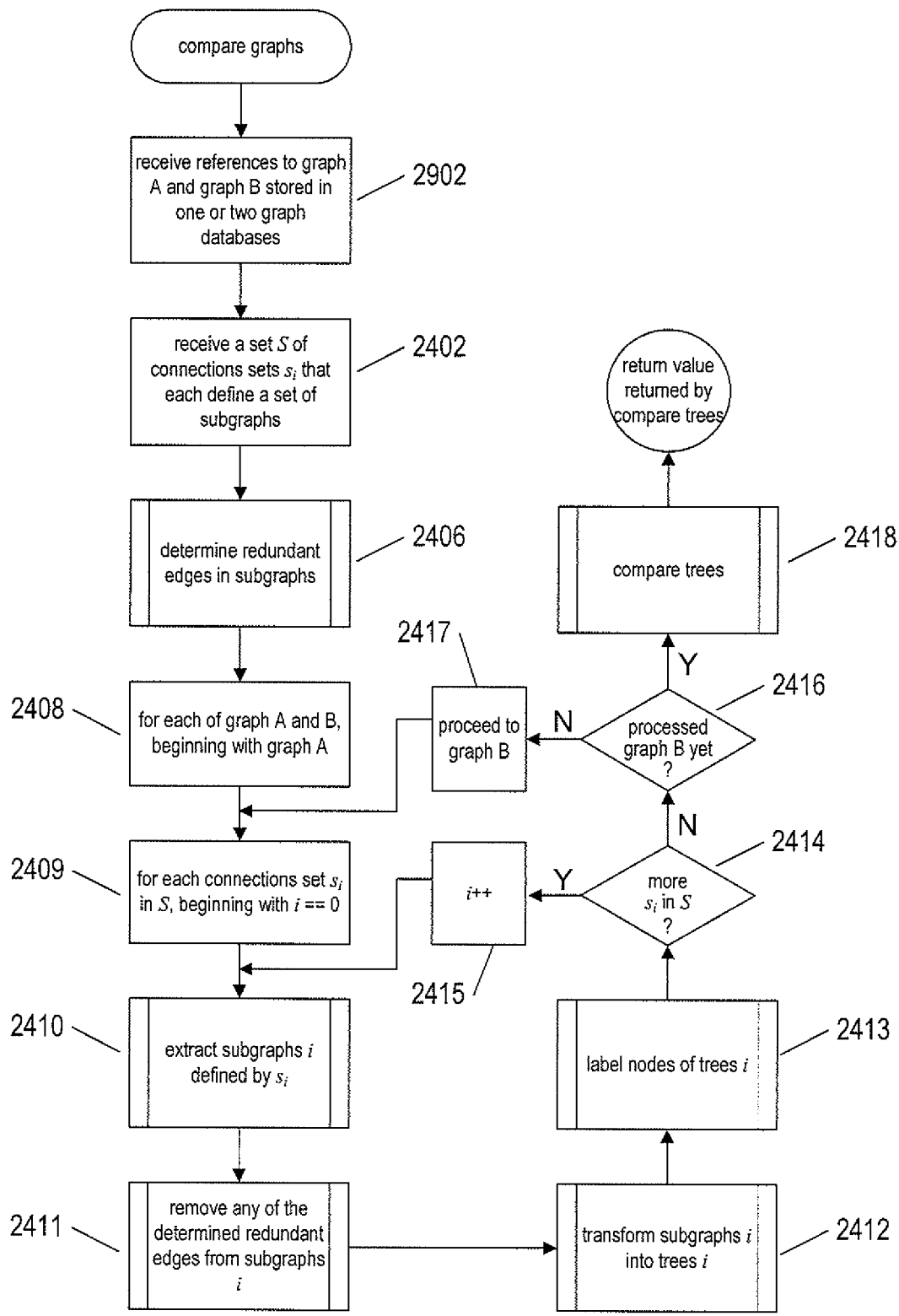
FIGS. 24A-H illustrate, using control-flow diagrams, the graph-comparison method discussed above with reference to FIGS. 22A-23F.

FIGS. 24A-H illustrate, using control-flow diagrams, the graph-comparison method discussed above with reference to FIGS. 22A-23F. FIG. 24A provides a control-flow diagram of the routine "compare graphs," which, in step 2402, receives references to two graphs A and B that are stored in one or more graph databases. The routine "compare graphs" returns a Boolean value indicating whether or not the two graphs A and B are equivalent. In step 2404, the routine "compare graphs" receives a set S of connection sets $s_i$ that each define a set of subgraphs that are extracted from input graphs A and B, such as the sets of subgraphs shown in FIGS. 22D, E, and G extracted from the original graph shown in FIG. 22A. The connection sets $s_i$ each contain, in the example discussed above with reference to FIGS. 22A-23F, a set of relationships between nodes that occur in the input trees A and B. For example, the subgraph shown in FIG. 22D extracted from the original graph shown in FIG. 23A is based on a connection set that specifies a one-to-many relationship between data centers and clusters, a one-to-many relationship between clusters and hosts, and a one-to-many relationship between hosts and VMs. Next, in step 2406, a routine is called to determine the redundant edges in each of the subgraphs, extraction of which is specified by the connection sets received in step 2404. For example, as discussed above with reference to FIG. 22C, the direct storage relationship between certain host computers and datastores are redundant and can be removed from the storage-relationship-based subgraphs without introducing redundant nodes and edges. In the outer for-loop of steps 2408-2417, each of the input graphs A and B is considered in each of two iterations of the outer for-loop. In each iteration of the inner for-loop of steps 2409-2415, each connection set $s_i$ in the received set S is considered. In step 2410, a routine is called to extract the subgraphs specified by the currently considered connection set. In step 2411, any of the edges identified as being redundant, in step 2406, are removed from the subgraphs extracted in step 2410. In step 2412, a routine is called to transform non-tree subgraphs of the extracted set of subgraphs into trees, as discussed above with reference to FIGS. 22E-F. Next, in step 2413, a routine is called to label each of the trees in the set of trees corresponding to the extracted subgraphs, as discussed above with reference to FIGS. 23A-B. When there are more connection sets in the receive set S to consider, as determined in step 2414, then the inner for-loop undertakes a next iteration. When the outer for-loop has iterated only once, as determined in step 2416, then the outer for-loop iterates a second time to consider the input graph B. Once all of the sets of trees have been generated and labeled, in the nested for-loops of steps 2408-2417, the routine "compare trees" is called, in step 2418, to compare the sets of labeled trees, as discussed above with reference to FIGS. 23A-F, in order to determine whether or not input trees A and B are isomorphic.

Figure 24B:
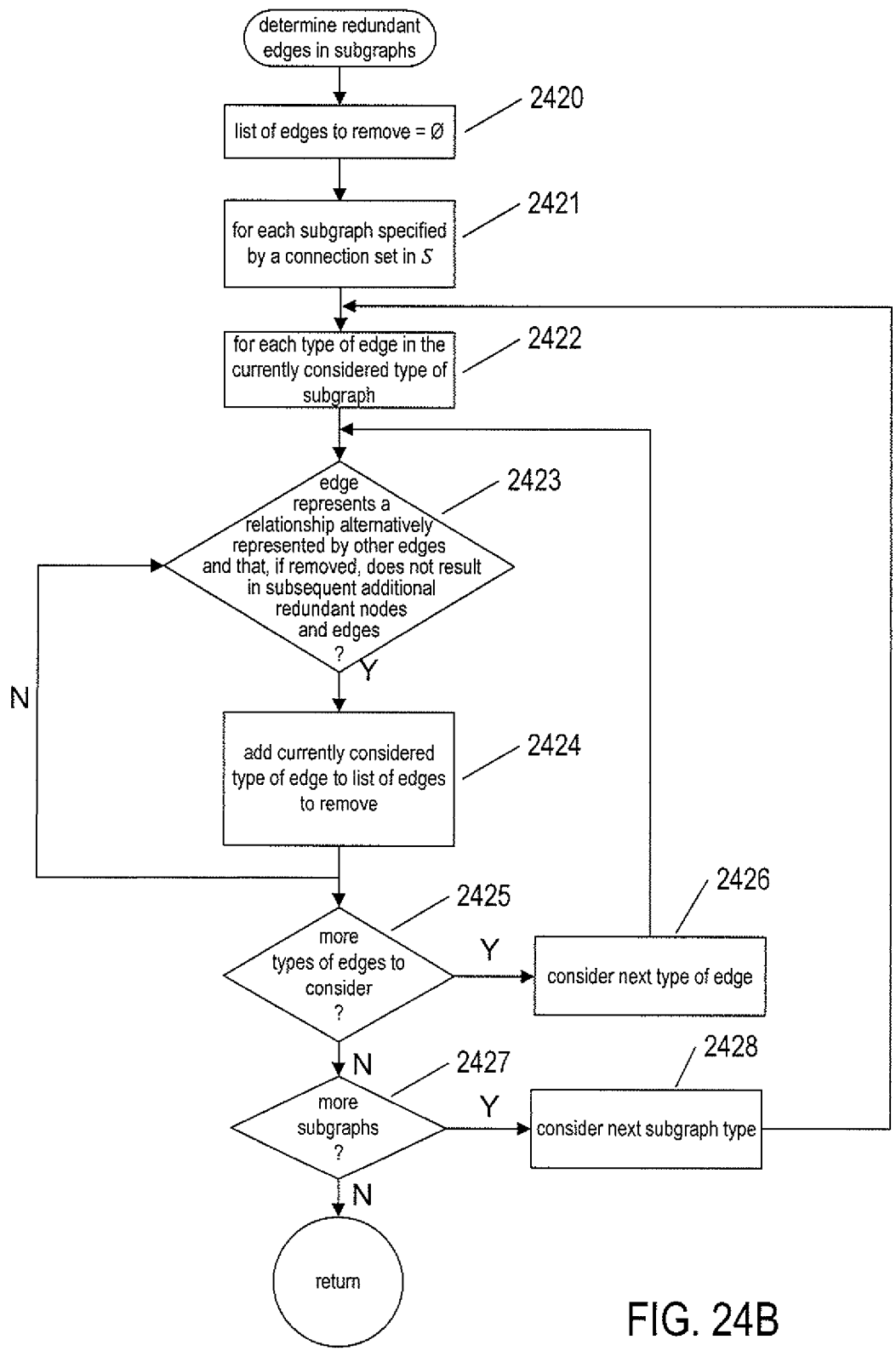

FIG. 24B provides a control-flow diagram for the routine "determine redundant edges and subgraphs" called in step 2406 of FIG. 24A. In step 2420, the routine initializes a list of edges to remove. The list of edges, in one implementation, is a list of edge-type/subgraph-type pairs that specifies types of edges to remove from each type of subgraph specified by the connect sets $s_i$ in the received set S. In the outer for-loop of steps 2421-2428, each type of subgraph specified by a connection set in the received set S is considered. In the inner for-loop of steps 2422-2426, each type of edge in the currently considered type of subgraph is considered. When the currently considered edge type represents a relationship that is alternatively represented by other edges in the currently considered type of subgraph and when removal of this type of edge does not result in subsequent addition of redundant nodes and/or edges when a subgraph of the subgraph type is transformed into a tree, then, in step 2424, the currently considered type of edge is added to the list of edges to remove and is also removed from further consideration in step 2423.

Figure 24C:
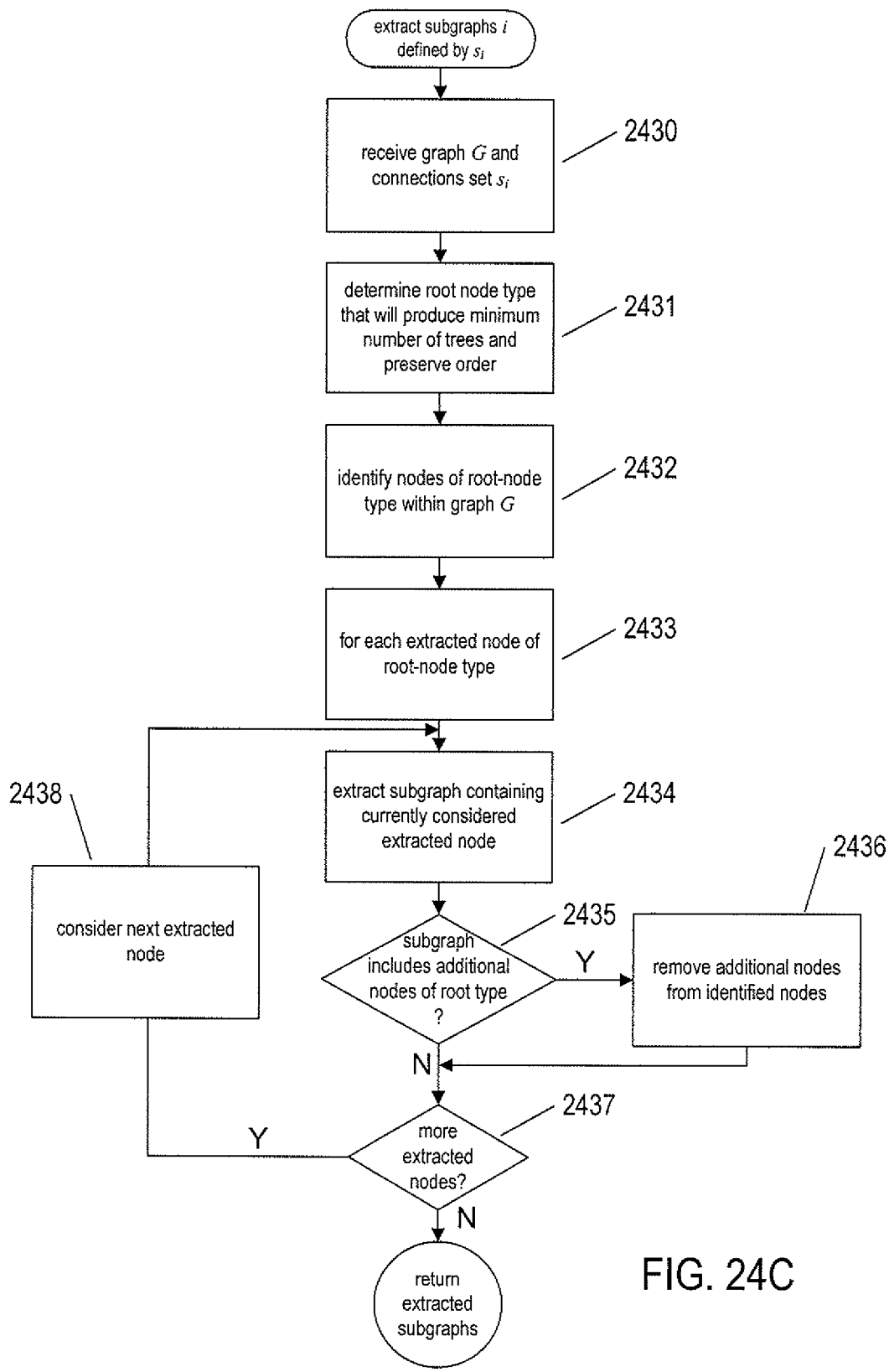

FIG. 24C provides a control-flow diagram for the routine "extract subgraphs if defined by $s_i$" called in step 2410 of FIG. 24A. In step 2430, the routine receives a graph G and a connections set $s_i$. In step 2431, the routine determines a root-node type for the subgraph specified by the connections set $s_i$. In certain implementations, a root-node type is selected to minimize the number of trees that are subsequently generated from the subgraphs corresponding to connection set $s_i$ as well as minimizing the number of additional nodes and edges needed to transform the subgraphs into trees. In step 2432, the routine identifies nodes of the root-node type within the received graph G. Then, in the for-loop of steps 2433-2438, each of the identified root nodes is considered. In step 2434, the currently considered root node is used as a basis for extracting a subgraph containing the currently considered root node from graph G. When the extracted subgraph contains additional nodes of the root-node type, as determined in step 2435, then, in step 2436, these additional nodes of the root-node type are removed from the identified root nodes so that they are not used for subgraph extraction in subsequent iterations of the for-loop of steps 2433-2438. As one example, FIG. 22E shows two subgraphs extracted from the original graph shown in FIG. 22A based on a connections set specifying networking-related relationships between network, host, and VM nodes.

Figure 24D:
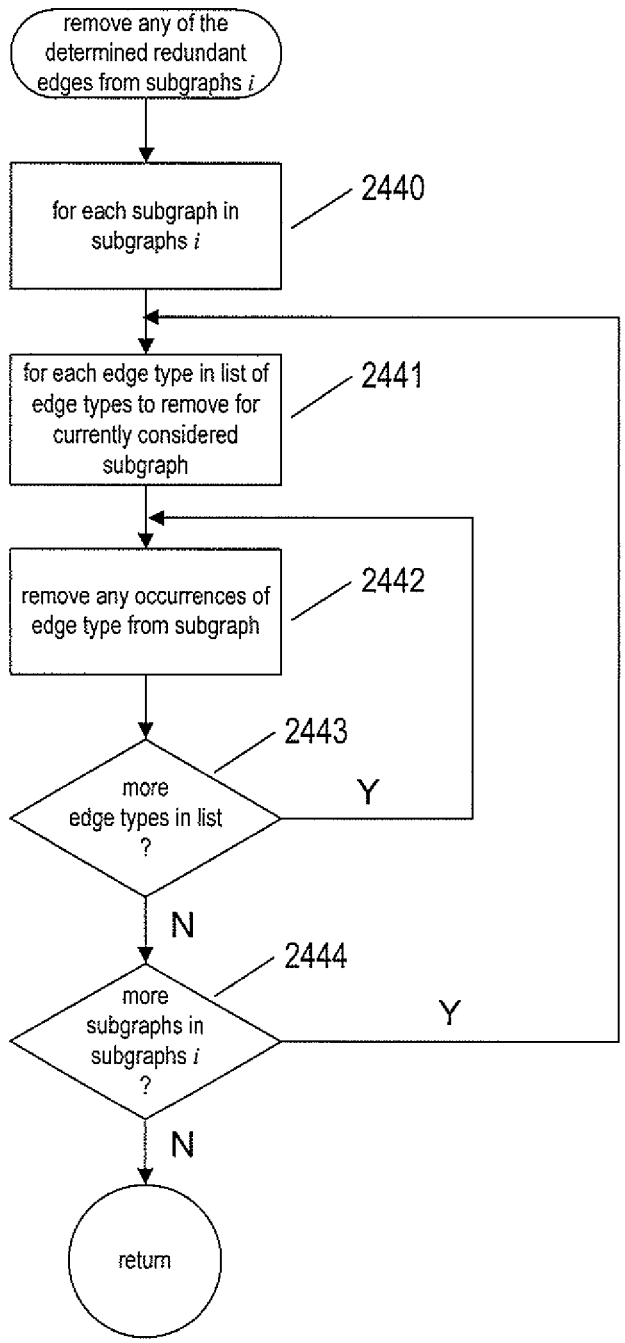

FIG. 24D provides a control-flow diagram for the routine "remove any of the determined redundant edges from subgraphs i" called in step 2411 of FIG. 24A. In the nested for-loops of steps 2440-2444, any occurrences of an edge type identified as removable from the currently considered subgraph are removed in step 2442.

Figure 24E:
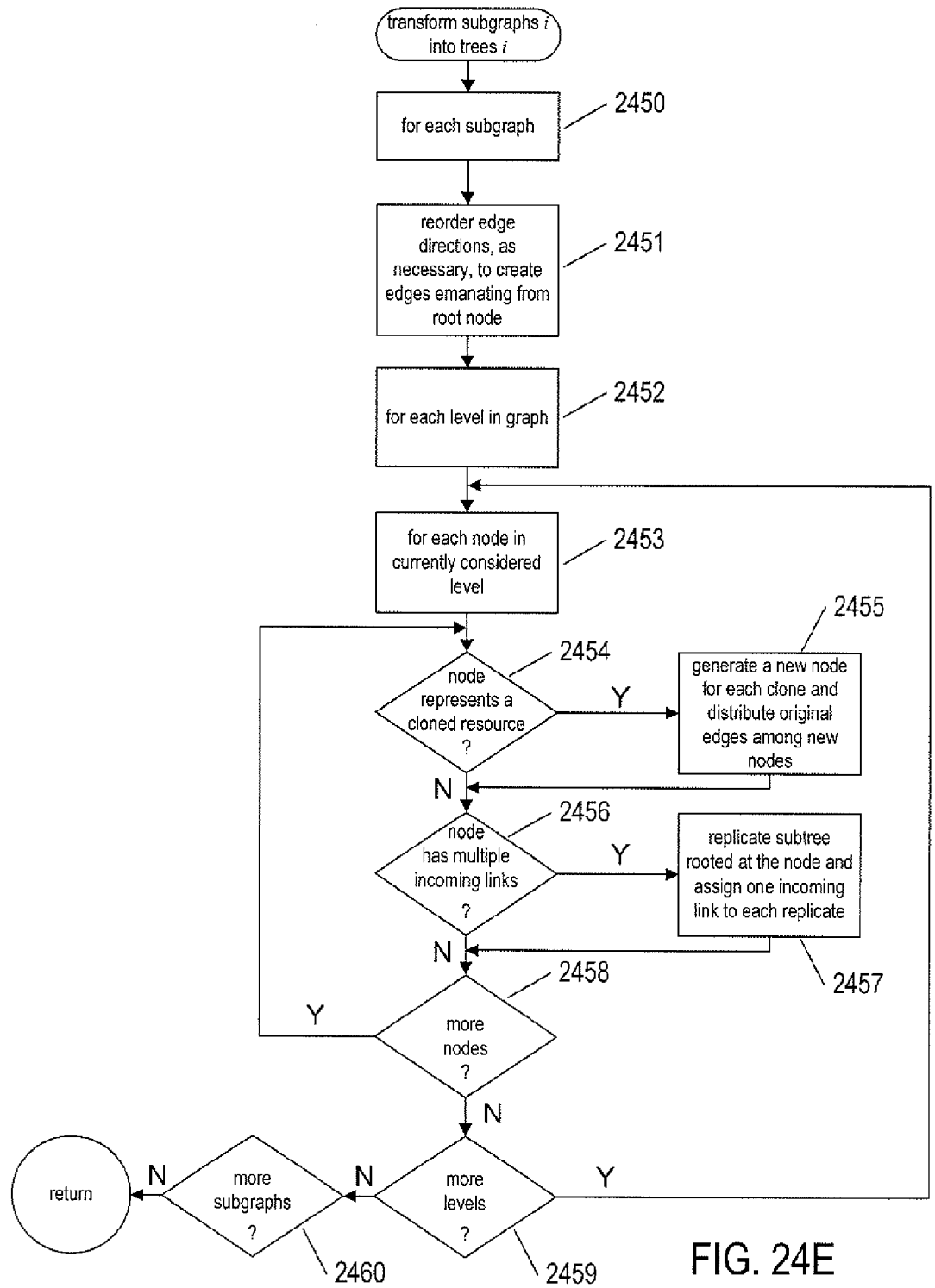

FIG. 24E provides a control-flow diagram for the routine "transform subgraphs i into tree i" called in step 2412 of FIG. 24A. In the outer for-loop of steps 2450-2460, each subgraph in a set of subgraphs generated based on a connections set is considered. In step 2451, edge directions are reordered, as necessary, to create edges emanating from the identified root node and in a consistent direction from all progeny of the root node. Then, in the inner for-loop of steps 2452-2459, each level in the subgraph is considered. In an innermost for-loop of steps 2453, 2458, each node in the currently considered level is considered. When the currently considered node represents a cloned resource, then, in step 2455, a new node is generated for each clone and interconnected into the subgraph with new edges. When the currently considered node has multiple incoming links, the subtree rooted at the node is replicated so that one identical subtree is linked to each of the multiple links originally incoming into the currently considered node. These operations are discussed above, with reference to FIGS. 22F and 22H.

Figure 24F:
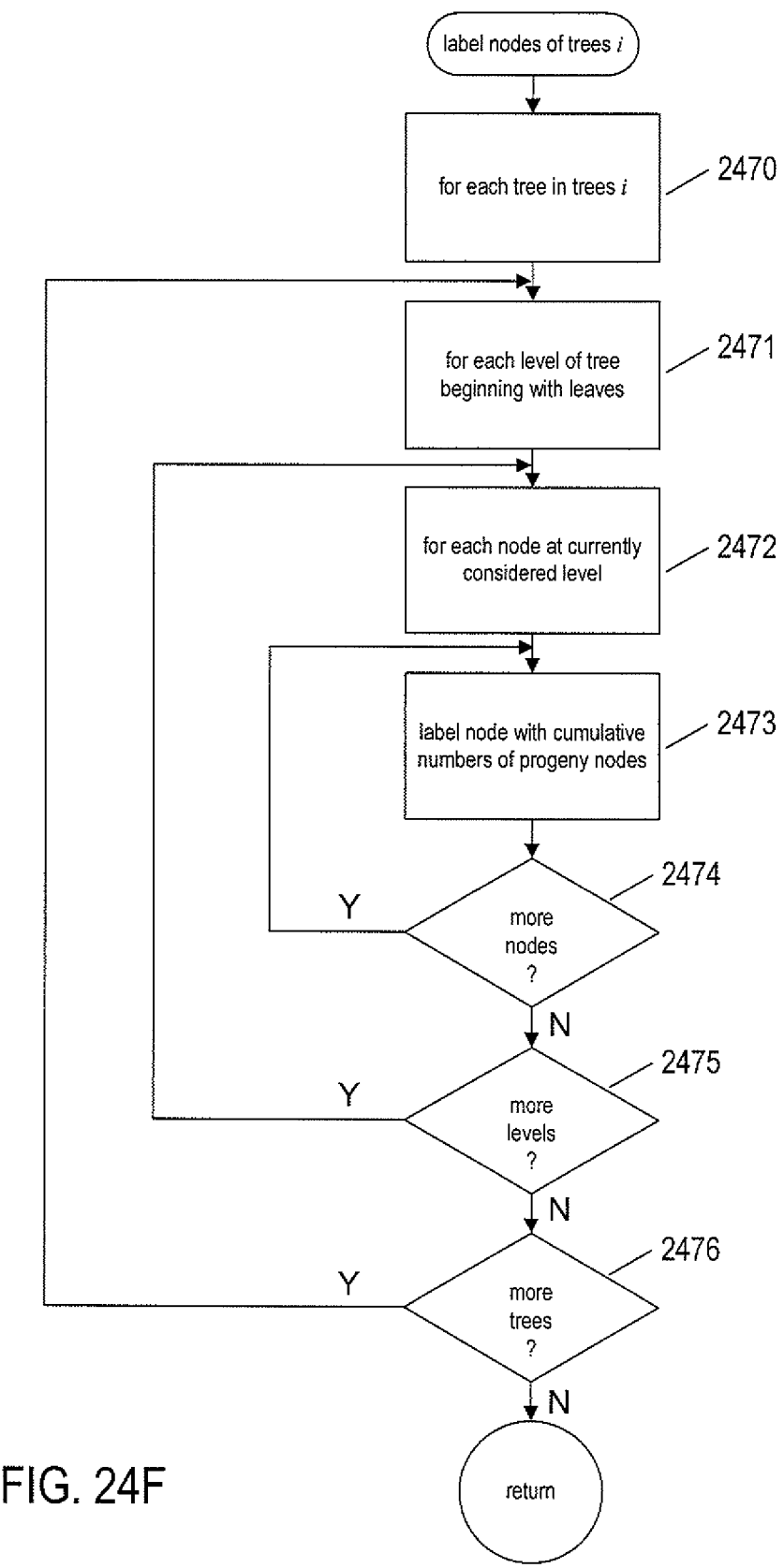

FIG. 24F provides a control-flow diagram for the routine "label nodes of trees i" called in step 2413 of FIG. 24A. In the three nested for-loops of steps 2470-2476, each node at each level within each tree of a set of trees is labeled with the cumulative numbers of progeny nodes, in step 2473, as discussed above with reference to FIGS. 23A-D. Of course, the leaf-node labels are trivial, the leaf nodes having no progeny. In this implementation, a simple leaf-node level may be associated with leaf nodes. In alternative implementations, the inner for-loop of steps 2471-2475 iterates over non-leaf-node levels and no labels are associated with leaf nodes.

Figure 24G:
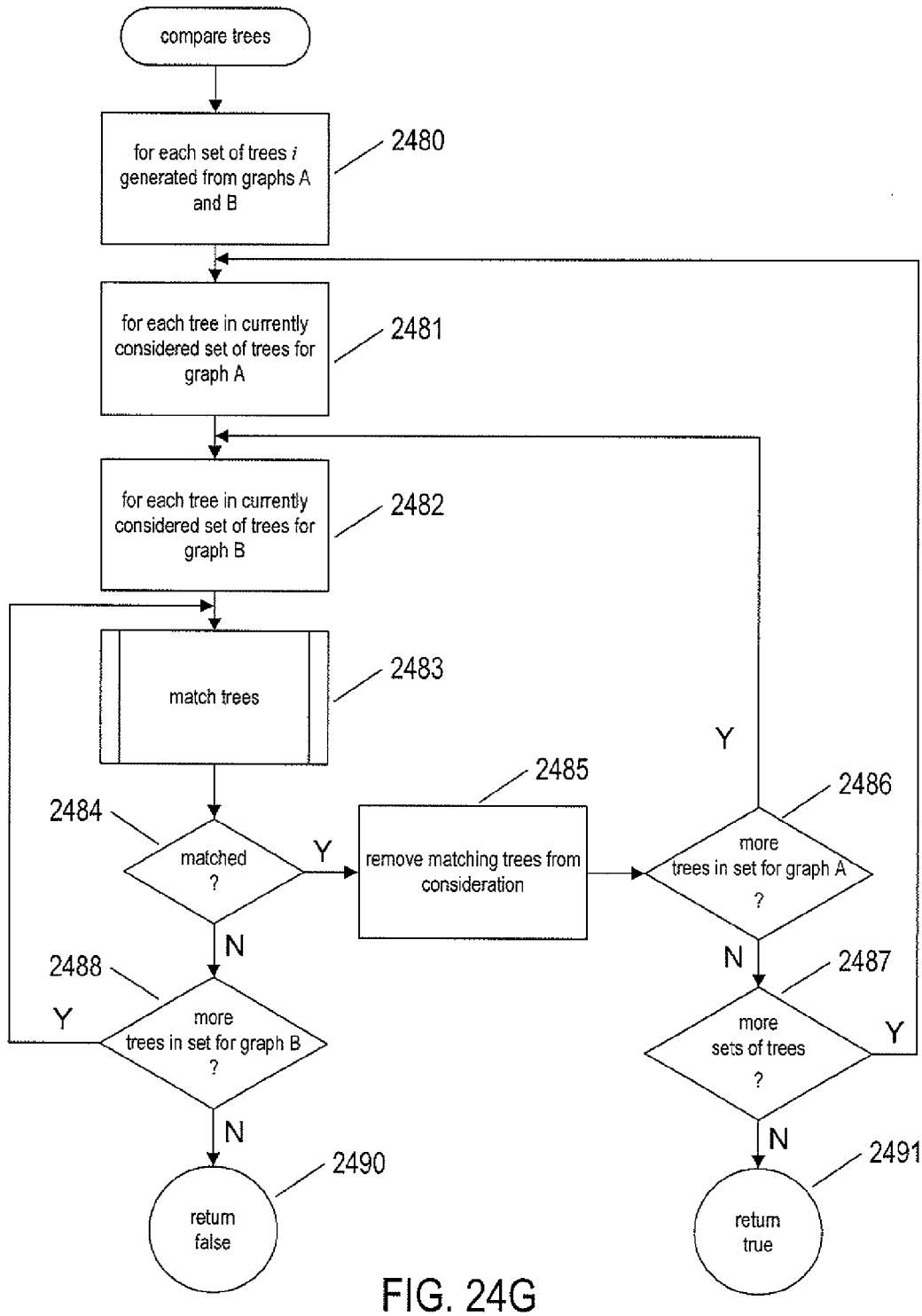

FIG. 24G provides a control-flow diagram for the routine "compare trees" called in step 2418 of FIG. 24A. In the outermost for-loop of steps 2480-2487, each set of trees generated from the input graphs is considered. In an inner for-loop of steps 2481-2486, each tree in a currently considered set of trees extracted from graph A is considered. In an inner for-loop of steps 2482-2488, the currently considered tree obtained from graph A is attempted to be matched to a corresponding tree in a corresponding set of trees obtained from graph B. When a match is found, as determined in step 2484, the matching trees are removed from consideration in step 2485. When no matching tree can be found in the set of trees obtained from graph B, as determined in step 2488, the value "false" is returned in step 2490. When all trees of all sets of trees generated from graph A are matched to corresponding trees obtained from graph B, the value "true" is returned in step 2491.

Figure 24H:
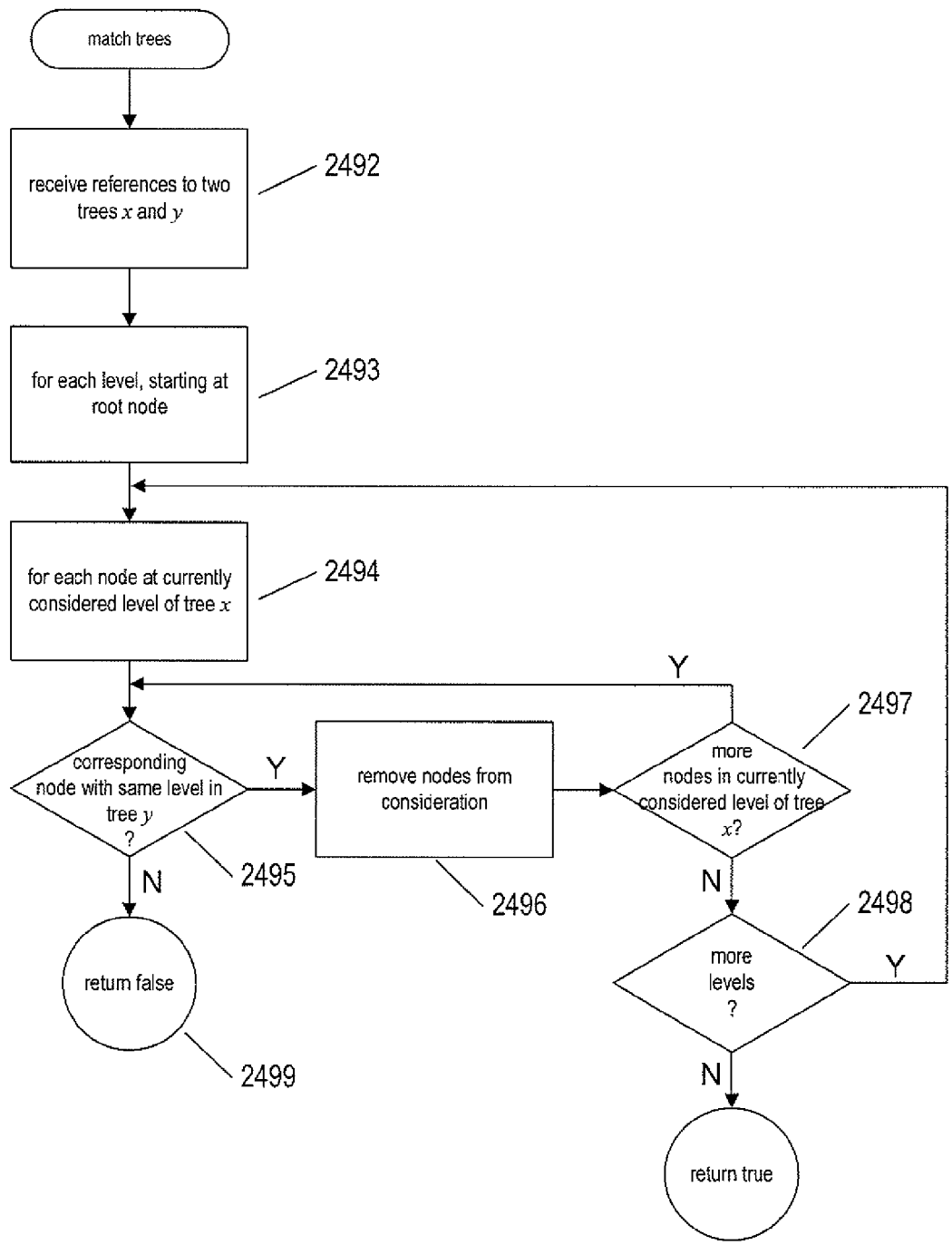

FIG. 24H provides a control-flow diagram for the routine "match trees" called in step 2483 of FIG. 24G. In step 2492, references to two trees x and y are received. In the outer for-loop of steps 2493-2498, each level of the two trees is considered. In the inner for-loop of steps 2484-2497, the nodes in the currently considered level of tree x are attempted to be matched to the corresponding nodes of the currently considered level of tree y. When a corresponding node in tree y cannot be found for a node of the currently level of tree x, the value "false" is returned in step 2499. Otherwise, the value of "true" is returned when a matching node in tree y can be found for each node in tree x. As discussed above with reference to FIGS. 23A-F, nodes match when they have identical labels. The currently disclosed methods for representing systems as graphs and for determining whether or not two such graphs are equivalent are included within a system-administration or system-management facility, such as the virtual data center management server discussed above with reference to FIG. 8. Such system-administration and system-management facilities are physical devices as are the control programs that control their operation, as discussed above. Thus, the currently described methods and systems are neither abstract nor sequences of computer instructions, but are instead methods carried out by physical devices to control physical machines.

In additional implementations, not only are trees generated from subgraphs extracted from two graphs compared in order to determine graph equivalence, but, when the graphs differ, the differences found during full, exhaustive comparison of the trees are accumulated in a differences file or set that can then be returned to a calling entity. The identified differences may be used for a variety of different purposes, including system reconfiguration, ordering and purchasing subsystems and subcomponents, capacity planning, and other such management and configuration tasks.

In still additional implementations, attributes associated with edges and nodes, in addition to edge and node types and topology, may be included in the comparison operations for determining the equivalence of two different configuration graphs. Selected node and edge attributes may be, for example, incorporated into labels assigned to nodes during the tree-labeling process so that these attributes are considered during tree comparisons. The comparison operations may allow for range comparisons and rule-based comparisons to allow for more complex types of comparisons between attribute values.

Although the present invention has been described in terms of particular embodiments, it is not intended that the invention be limited to these embodiments. Modifications within the spirit of the invention will be apparent to those skilled in the art. For example, any of many different possible implementations of a graph-database-based system-administration facility that supports graph-equivalence queries can be obtained by varying any of many different implementation and design parameters, including modular organization, control structures, data structures, programming language, and hardware platform. A variety of different labeling conventions may be employed, with a constraint that consistent labeling is used for corresponding sets of trees generated from each of two graphs that are compared in order to determine whether or not they are equivalent. The order of various of the steps discussed above with reference to FIGS. 22A-24H may be varied, in different implementations. Specification of subgraphs via connections sets may vary, with connections sets including a variety of different types of rules, relationships, or specifications that specify the types of subgraphs extracted from graphs representing system configurations and states.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An administration-and-management component of a computer system comprising:
   one or more processors;
   one or more memories;
   one or more graph databases; and
   computer instructions stored in the one or more memories that, when executed by one or more of the one or more processors, control the computer-system administration-and-management component, on behalf of a calling computational entity, to
      store a first graph and a second graph that each represents a computer system in one or more of the one or more graph databases, each graph comprising a set of nodes and a set of edges, each node associated with two or more attribute values, each edge connecting two nodes, and each edge associated with two or more attribute values;
      determine whether or not the first and second graphs are equivalent by
         extracting two or more sets of subgraphs from each of the first and second graphs, each set of subgraphs extracted from the first graph corresponding to a complementary set of subgraphs extracted from the second graph, each subgraph extracted from a graph by selecting edges from the graph having one or more common values for each of one or more attributes associated with the edges and selecting nodes from the graph interconnected by the selected edges,
         transforming the subgraphs in the sets of subgraphs into trees within corresponding sets of trees,
         labeling nodes of the trees in the corresponding sets of trees,
         comparing labels at each level of trees selected from the sets of trees to generate a return value stored in one of the one or more memories, and
         returning the generated return value to the calling computational entity.

2. The administration-and-management component of claim 1 wherein each of the first and second graphs comprises:
   a set of nodes that represent computer system components and subsystems; and
   a set of edges that represent relationships between pairs of nodes.

3. The administration-and-management component of claim 2 wherein the nodes and edges are associated with attribute/attribute-value pairs.

4. The administration-and-management component of claim 1 wherein extracting a first set of subgraphs from the first graph and a complementary second set of subgraphs from the second graph further comprises:
   receiving a connections set that specifies types of edges to extract, along with types of nodes connected by the edges;

determining a root-node type for the subgraphs of the first and second sets;

for each of the first and second graphs,
for each unextracted node of the determined root-node type within the graph, extracting the as yet unextracted node and a subgraph containing edges of the specified types of edges connected directly or indirectly to the extracted node.

5. The administration-and-management component of claim 4 wherein the connections set includes specifications of one or more relationships, selected from among one-to-many and many-to-many relationships, between types of nodes of the first and second graphs.

6. The administration-and-management component of claim 1 wherein transforming a subgraph in a set of subgraphs into one or more trees within a corresponding set of trees comprises:

removing edge of a type included in a set of selected redundant edge types from the subgraph; and for each node in the subgraph with multiple incoming edges, duplicating the node and its progeny to remove a cycle within the subgraph.

7. The administration-and-management component of claim 1 wherein labeling nodes of a tree comprises:

for each level of nodes in the tree, starting with a level of nodes directly above the leaf nodes,
for each node in the level of the tree,
assigning a label to the node that describes the quantity and type of progeny nodes of the node.

8. The administration-and-management component of claim 7 wherein the label assigned to a node includes, for each level of progeny nodes below the node and for each type of node at the level, an indication of a number of nodes at the level associated with an indication of a node type.

9. The administration-and-management component of claim 7 wherein the label assigned to a node includes one or more attribute values selected from attribute values associated with the node and with edges outgoing from, and incoming to, the node.

10. The administration-and-management component of claim 1 wherein comparing labels at each level of trees selected from the sets of trees further includes:

for each set of trees transformed from a set of subgraphs extracted from the first graph,
when, for a tree in the set of trees, a matching tree cannot be identified in the set of trees transformed from a complementary set of subgraphs extracted from the second graph by comparing labels at each level of the tree and the matching tree above a leaf-node level, generating a return value indicating that the first and second graphs are not equivalent; and
when, for each tree in each set of trees transformed from a set of subgraphs extracted from the first graph, a matching tree is identified in a corresponding set of trees transformed from a complementary set of subgraphs extracted from the second graph, generating a return value indicating that the first and second graphs are equivalent.

11. The administration-and-management component of claim 10 wherein a tree in a first set of trees matches a tree in a corresponding second set of trees when, at each level of the trees above the leaf-node level, a unique, equivalent node is identified at the level in the second tree for each node at the level in the first tree.

12. The administration-and-management component of claim 11 wherein a first node is equivalent to a second node when a label associated with the first node is equivalent to the label associated with the second node.

13. The administration-and-management component of claim 1 wherein, in addition to generating a return value stored in one of the one or more memories, comparing labels at each level of trees selected from the sets of trees also generates a set of differences between the first and second graphs.

14. A method, carried out by a computer system having one or more processors, one or more memories, one or more graph databases, and computer instructions stored in the one or more memories that, when executed by one or more of the one or more processors, control the computer system to determine whether a first graph is equivalent to a second graph by:

storing the first graph and the second graph in one or more of the one or more graph databases, each graph comprising a set of nodes and a set of edges, each node associated with two or more attribute values, each edge connecting two nodes, and each edge associated with two or more attribute values, and determining whether or not the first and second graphs are equivalent by
extracting two or more sets of subgraphs from each of the first and second graphs, each set of subgraphs extracted from the first graph corresponding to a complementary set of subgraphs extracted from the second graph, each subgraph extracted from a graph by selecting edges from the graph having one or more common values for each of one or more attributes associated with the edges and selecting nodes from the graph interconnected by the selected edges,
transforming the subgraphs in the sets of subgraphs into trees within corresponding sets of trees,
labeling nodes of the trees in the corresponding sets of trees, and
comparing node labels of trees selected from the sets of trees to generate a return value stored in one of the one or more memories that indicates whether or not the first and second graphs are equivalent.

15. The method of claim 14 wherein each of the first and second graphs comprises:

a set of nodes associated with attribute/attribute-value pairs; and s set of edges associated with attribute/attribute-value pairs.

16. The method of claim 14 wherein extracting a first set of subgraphs from the first graph and a complementary second set of subgraphs from the second graph further comprises:

receiving a connections set that specifies types of edges to extract, along with types of nodes connected by the edges;

determining a root-node type for the subgraphs of the first and second sets;

for each of the first and second graphs,
for each unextracted node of the determined root-node type within the graph, extracting the as yet unextracted node and a subgraph containing edges of the specified types of edges connected directly or indirectly to the extracted node.

17. The method of claim 16 wherein the connections set includes specifications of one or more relationships, selected from among one-to-many and many-to-many relationships, between types of nodes of the first and second graphs.

18. The method of claim 14 wherein transforming a subgraph in a set of subgraphs into one or more trees within a corresponding set of trees comprises:
removing any edges of a type included in a set of selected redundant edge types from the subgraph; and
for each node in the subgraph with multiple incoming edges, duplicating the node and its progeny to remove a cycle within the subgraph.

19. The method of claim 14 wherein labeling nodes of a tree comprises:
for each level of modes in the tree, starting with the a level of nodes directly above the leaf nodes,
for each node in a currently considered level of the tree, assigning a label to the node that describes the quantity and type of progeny nodes of the node.

20. The method of claim 19 wherein the label assigned to a node includes, for each level of progeny nodes below the node and for each type of node at the level, an indication of a number of nodes at the level associated with an indication of a node type.

21. The method of claim 14 wherein comparing labels at each level of trees selected from the sets of trees further includes:
for each set of trees transformed from a set of subgraphs extracted from the first graph,
when, for a tree in the set of trees, a matching tree cannot be identified in the set of trees transformed from a complementary set of subgraphs extracted from the second graph by comparing labels at each level of the tree and matching tree, generating a return value indicating that the first and second graphs are not equivalent; and
when, for each tree in each set of trees transformed from a set of subgraphs extracted from the first graph, a matching tree is identified in a corresponding set of trees transformed from a complementary set of subgraphs extracted from the second graph, generating a return value indicating that the first and second graphs are equivalent.

22. The method of claim 21 wherein a tree in a first set of trees matches a tree in a corresponding second set of trees when, at each level of the trees above the leaf-node level, a unique, equivalent node is identified at the level in the second tree for each node at the level in the first tree.

23. The method of claim 22 wherein a first node is equivalent to a second node when a label associated with the first node is equivalent to the label associated with the second node.

24. Computer instructions stored on a physical data-storage device that, when executed by one or more processors of a computer system having the one or more processors, one or more memories, and one or more graph databases, control the computer system to determine whether a first graph is equivalent to a second graph by:
storing the first graph and the second graph in one or more of the one or more graph databases, each graph comprising a set of nodes and a set of edges, each node associated with two or more attribute values, each edge connecting two nodes, and each edge associated with two or more attribute values, and
determining whether or not the first and second graphs are equivalent by
extracting two or more sets of subgraphs from each of the first and second graphs, each set of subgraphs extracted from the first graph corresponding to a complementary set of subgraphs extracted from the second graph, each subgraph extracted from a graph by selecting edges from the graph having one or more common values for each of one or more attributes associated with the edges and selecting nodes from the graph interconnected by the selected edges,
transforming the subgraphs in the sets of subgraphs into trees within corresponding sets of trees,
labeling nodes of the trees in the corresponding sets of trees, and
comparing node labels of trees selected from the sets of trees to generate a return value stored in one of the one or more memories that indicates whether or not the first and second graphs are equivalent.

* * * * *